(12) United States Patent
Haddock et al.

(10) Patent No.: US 10,443,896 B2
(45) Date of Patent: Oct. 15, 2019

(54) TRAPEZOIDAL RIB MOUNTING BRACKET WITH FLEXIBLE LEGS

(71) Applicant: RMH Tech LLC, Colorado Springs, CO (US)

(72) Inventors: Dustin M. M. Haddock, Colorado Springs, CO (US); Robert M. M. Haddock, Colorado Springs, CO (US); Nikolaus J. Holley, Colorado Springs, CO (US)

(73) Assignee: RMH Tech LLC, Colorado Springs, CO (US)

( * ) Notice: Subject to any disclaimer, the term of this patent is extended or adjusted under 35 U.S.C. 154(b) by 0 days.

(21) Appl. No.: 15/663,081

(22) Filed: Jul. 28, 2017

(65) Prior Publication Data

US 2018/0031279 A1 Feb. 1, 2018

Related U.S. Application Data

(60) Provisional application No. 62/368,831, filed on Jul. 29, 2016.

(51) Int. Cl.
| | |
|---|---|
| *F24S 25/636* | (2018.01) |
| *F24S 25/615* | (2018.01) |
| *F24S 25/61* | (2018.01) |
| *F24S 25/00* | (2018.01) |
| *F24S 25/60* | (2018.01) |

(52) U.S. Cl.
CPC ........... *F24S 25/636* (2018.05); *F24S 25/615* (2018.05); *F24S 25/60* (2018.05); *F24S 25/61* (2018.05); *F24S 2025/018* (2018.05); *F24S 2025/021* (2018.05); *Y02B 10/20* (2013.01); *Y02E 10/47* (2013.01)

(58) Field of Classification Search
CPC .............................. E04D 13/10; E04D 13/103
See application file for complete search history.

(56) References Cited

U.S. PATENT DOCUMENTS

| | | | |
|---|---|---|---|
| 42,992 | A | 5/1864 | Howe |
| 97,316 | A | 11/1869 | Rogers |
| (Continued) | | | |

FOREIGN PATENT DOCUMENTS

| | | |
|---|---|---|
| AT | 13076 | 8/1903 |
| AT | 26329 | 11/1906 |
| (Continued) | | |

OTHER PUBLICATIONS

"Aluminun" (Wikipedia) Jul. 3, 2016 (Jul. 3, 2016). accessed Oct. 3, 2017 (Oct. 3, 2017). available at <https://en.wikipedia.org/w1ki/Aluminlum>, entire document.

(Continued)

*Primary Examiner* — Amy J. Sterling
(74) *Attorney, Agent, or Firm* — Sheridan Ross P.C.

(57) ABSTRACT

A mounting bracket (320) for trapezoidal rib profiles is disclosed. This mounting bracket (320) includes an upper section (330) and a lower section (350). A first leg (352*a*) in a second leg (352*b*) extend from a lower portion of the upper section (330) in diverging relation to one another. Each of these legs (352*a*, 352*b*) is deflectable through a certain range of motion to accommodate installation of the mounting bracket (320) on a variety of different trapezoidal rib profiles.

32 Claims, 28 Drawing Sheets

(56) References Cited

U.S. PATENT DOCUMENTS

| | | |
|---|---|---|
| 106,580 A | 8/1870 | Hathorn |
| 189,431 A | 4/1877 | Creighton |
| 250,580 A | 12/1881 | Rogers |
| 332,413 A | 12/1885 | List |
| 386,316 A | 7/1888 | Hawthorne |
| 405,605 A | 6/1889 | Sagendorph |
| 407,772 A | 7/1889 | Curtis et al. |
| 446,217 A | 2/1891 | Dickelman |
| 459,876 A | 9/1891 | Powers |
| 472,014 A | 3/1892 | Densmore |
| 473,512 A | 4/1892 | Laird |
| 491,173 A | 2/1893 | Hayward |
| 507,776 A | 10/1893 | Berger et al. |
| 529,774 A | 11/1894 | Baird |
| 602,983 A | 4/1898 | Folsom |
| 756,884 A | 4/1904 | Parry |
| 831,445 A | 9/1906 | Kosmatka |
| 884,850 A | 4/1908 | Peter |
| 927,522 A | 7/1909 | Gery |
| 933,784 A | 9/1909 | Peter |
| 939,516 A | 11/1909 | Laird |
| 1,054,091 A | 2/1913 | Darnall |
| 1,085,474 A | 1/1914 | Peterson |
| 1,136,460 A | 4/1915 | Wright |
| 1,230,363 A | 6/1917 | Baird |
| 1,330,309 A | 2/1920 | Dixon |
| 1,399,461 A | 12/1921 | Childs |
| 1,463,065 A | 7/1923 | Sieger |
| 1,465,042 A | 8/1923 | Hruska |
| 1,511,529 A | 10/1924 | Standlee |
| 1,735,927 A | 11/1929 | Shaffer |
| 1,735,937 A | 11/1929 | Shaffer |
| 1,893,481 A | 1/1933 | Adams |
| 2,079,768 A | 5/1937 | Levow |
| 2,150,497 A | 3/1939 | Fernberg |
| 2,183,844 A | 12/1939 | Murphy |
| 2,192,720 A | 3/1940 | Tapman |
| 2,201,320 A | 5/1940 | Place |
| 2,250,401 A | 7/1941 | Sylvester |
| 2,274,010 A | 2/1942 | Stellin |
| 2,340,692 A | 2/1944 | Ridd |
| 2,429,833 A | 10/1947 | Luce |
| 2,443,362 A | 6/1948 | Tinnerman |
| 2,448,752 A | 9/1948 | Wagner |
| 2,457,250 A | 12/1948 | Macomber |
| 2,472,586 A | 6/1949 | Harvey |
| 2,504,776 A | 4/1950 | Woodfield et al. |
| 2,525,217 A | 10/1950 | Glitsch |
| 2,574,007 A | 11/1951 | Anderson |
| 2,658,247 A | 11/1953 | Heuer |
| 2,714,037 A | 7/1955 | Singer et al. |
| 2,730,381 A | 1/1956 | Curtiss |
| 2,740,027 A | 3/1956 | Budd et al. |
| 2,810,173 A | 10/1957 | Bearden |
| 2,875,805 A | 3/1959 | Flora |
| 3,039,161 A | 6/1962 | Gagnon |
| 3,064,772 A | 11/1962 | Clay |
| 3,095,672 A | 7/1963 | Di Tullio |
| 3,136,206 A | 6/1964 | Adams |
| 3,221,467 A | 12/1965 | Henkels |
| 3,242,620 A | 3/1966 | Kaiser |
| 3,288,409 A | 11/1966 | Bethea, Jr. |
| 3,296,750 A | 1/1967 | Zaleski |
| 3,298,653 A | 1/1967 | Omholt |
| 3,307,235 A | 3/1967 | Hennings |
| 3,318,057 A | 5/1967 | Norsworth |
| 3,333,799 A | 8/1967 | Peterson |
| 3,335,995 A | 8/1967 | Pickles |
| 3,363,864 A | 1/1968 | Olgreen |
| 3,394,524 A | 7/1968 | Howarth |
| 3,425,127 A | 2/1969 | Long |
| 3,482,369 A | 12/1969 | Burke |
| 3,495,363 A | 2/1970 | Johnson |
| 3,496,691 A | 2/1970 | Seaburg et al. |
| 3,503,244 A | 3/1970 | Joslin |
| 3,523,709 A | 8/1970 | Heggy et al. |
| 3,527,619 A | 9/1970 | Miley |
| 3,572,623 A | 3/1971 | Lapp |
| 3,590,543 A | 7/1971 | Heirich |
| 3,656,747 A | 4/1972 | Revell, Jr. et al. |
| 3,667,182 A | 6/1972 | Stemler |
| 3,667,185 A | 6/1972 | Maurer |
| 3,719,919 A | 3/1973 | Tibolla |
| 3,753,326 A | 8/1973 | Kaufman, Sr. |
| 3,778,537 A | 12/1973 | Miller |
| 3,792,560 A | 2/1974 | Naylor |
| 3,809,799 A | 5/1974 | Taylor |
| 3,817,270 A | 6/1974 | Ehrens et al. |
| 3,824,664 A | 7/1974 | Seeff |
| 3,845,601 A | 11/1974 | Kostecky |
| 3,861,098 A | 1/1975 | Schaub |
| 3,904,161 A | 9/1975 | Scott |
| 3,914,001 A | 10/1975 | Nelson et al. |
| 3,921,253 A | 11/1975 | Nelson |
| 3,960,352 A | 6/1976 | Plattner et al. |
| 3,986,746 A | 10/1976 | Chartier |
| 4,001,474 A | 1/1977 | Hereth |
| 4,007,574 A | 2/1977 | Riddell |
| 4,018,538 A | 4/1977 | Smyrni et al. |
| 4,051,289 A | 9/1977 | Adamson |
| 4,130,970 A | 12/1978 | Cable |
| 4,141,182 A | 2/1979 | McMullen |
| 4,162,595 A | 7/1979 | Ramos et al. |
| 4,162,755 A | 7/1979 | Bott |
| 4,189,891 A | 2/1980 | Johnson et al. |
| 4,200,107 A | 4/1980 | Reid |
| 4,203,646 A | 5/1980 | Desso et al. |
| 4,223,053 A | 9/1980 | Brogan |
| 4,261,338 A | 4/1981 | McAlister |
| 4,261,384 A | 4/1981 | Dahlbring |
| 4,270,721 A | 6/1981 | Mainor, Jr. |
| 4,307,976 A | 12/1981 | Butler |
| 4,321,416 A | 3/1982 | Tennant |
| 4,351,140 A | 9/1982 | Simpson |
| 4,366,656 A | 1/1983 | Simpson |
| 4,393,859 A | 7/1983 | Marossy et al. |
| 4,449,335 A | 5/1984 | Fahey |
| 4,456,321 A | 6/1984 | Jones et al. |
| 4,461,514 A | 7/1984 | Schwarz |
| 4,467,582 A | 8/1984 | Hague |
| 4,475,776 A | 10/1984 | Teramachi |
| 4,546,586 A | 10/1985 | Knudson |
| 4,567,706 A | 2/1986 | Wendt |
| 4,570,405 A | 2/1986 | Knudson |
| 4,593,877 A | 6/1986 | van der Wyk |
| 4,601,600 A | 7/1986 | Karlsson |
| 4,656,794 A | 4/1987 | Thevenin et al. |
| 4,674,252 A | 6/1987 | Nicholas et al. |
| 4,682,454 A | 7/1987 | Simpson |
| 4,686,809 A | 8/1987 | Skelton |
| 4,701,586 A | 10/1987 | Hagberg |
| 4,704,058 A | 11/1987 | Crunwell |
| 4,773,791 A | 9/1988 | Hartkorn |
| 4,799,444 A | 1/1989 | Lisowski |
| 4,805,364 A | 2/1989 | Smolik |
| 4,809,476 A | 3/1989 | Satchell |
| 4,810,573 A | 3/1989 | Harriett |
| 4,835,927 A | 6/1989 | Michlovic |
| 4,840,529 A | 6/1989 | Phillips |
| 4,848,858 A | 7/1989 | Suzuki |
| 4,854,096 A | 8/1989 | Smolik |
| 4,878,331 A | 11/1989 | Taylor |
| 4,895,338 A | 1/1990 | Froutzis |
| 4,905,444 A | 3/1990 | Semaan |
| 4,909,011 A | 3/1990 | Freeman et al. |
| 4,949,929 A | 8/1990 | Kesselman et al. |
| 4,970,833 A | 11/1990 | Porter |
| 4,987,699 A | 1/1991 | Gold |
| 4,991,368 A | 2/1991 | Amstutz |
| 5,019,111 A | 5/1991 | Dempsey et al. |
| 5,036,949 A | 8/1991 | Crocker et al. |
| 5,039,352 A | 8/1991 | Mueller |
| 5,092,939 A | 3/1992 | Nath et al. |
| 5,094,435 A | 3/1992 | Depperman |

(56) References Cited

U.S. PATENT DOCUMENTS

| | | |
|---|---|---|
| 5,118,571 A | 6/1992 | Petersen |
| 5,119,612 A | 6/1992 | Taylor et al. |
| 5,125,608 A | 6/1992 | McMaster et al. |
| 5,127,205 A | 7/1992 | Eidson |
| 5,138,820 A | 8/1992 | Pearce |
| 5,140,793 A | 8/1992 | Knudson |
| 5,152,107 A | 10/1992 | Strickert |
| 5,164,020 A | 11/1992 | Wagner et al. |
| 5,176,462 A | 1/1993 | Chen |
| 5,187,911 A | 2/1993 | Cotter |
| 5,213,300 A | 5/1993 | Rees |
| 5,222,340 A | 6/1993 | Bellem |
| 5,224,427 A | 7/1993 | Riches et al. |
| 5,228,248 A | 7/1993 | Haddock |
| 5,251,993 A | 10/1993 | Sigourney |
| 5,268,038 A | 12/1993 | Riermeier et al. |
| 5,271,194 A | 12/1993 | Drew |
| 5,277,006 A | 1/1994 | Ruster |
| 5,282,340 A | 2/1994 | Cline et al. |
| 5,287,670 A | 2/1994 | Funaki |
| 5,307,601 A | 5/1994 | McCracken |
| 5,313,752 A | 5/1994 | Hatzinikolas |
| D347,701 S | 6/1994 | McCracken |
| 5,352,154 A | 10/1994 | Rotter et al. |
| 5,356,519 A | 10/1994 | Grabscheid et al. |
| 5,356,705 A | 10/1994 | Kelch et al. |
| D351,989 S | 11/1994 | Cline et al. |
| 5,363,624 A | 11/1994 | Cotter |
| 5,379,567 A | 1/1995 | Vahey |
| 5,390,453 A | 2/1995 | Untiedt |
| 5,392,574 A | 2/1995 | Sayers |
| 5,408,797 A | 4/1995 | Bellem |
| 5,409,549 A | 4/1995 | Mori |
| 5,413,063 A | 5/1995 | King |
| 5,413,397 A | 5/1995 | Gold |
| 5,417,028 A | 5/1995 | Meyer |
| 5,425,209 A | 6/1995 | Funaki |
| 5,426,906 A | 6/1995 | McCracken |
| 5,439,307 A | 8/1995 | Steinhilber |
| 5,453,027 A | 9/1995 | Buell et al. |
| D364,338 S | 11/1995 | Cline |
| 5,479,752 A | 1/1996 | Menegoli |
| 5,482,234 A | 1/1996 | Lyon |
| 5,483,772 A | 1/1996 | Haddock |
| 5,483,782 A | 1/1996 | Hall |
| 5,491,931 A | 2/1996 | Haddock |
| 5,497,591 A | 3/1996 | Nelson |
| 5,522,185 A | 6/1996 | Cline |
| 5,533,839 A | 7/1996 | Shimada |
| D372,421 S | 8/1996 | Cline |
| 5,557,903 A | 9/1996 | Haddock |
| 5,571,338 A | 11/1996 | Kadonome et al. |
| 5,596,859 A | 1/1997 | Horton et al. |
| 5,598,785 A | 2/1997 | Zaguroli, Jr. |
| D378,343 S | 3/1997 | Macor |
| 5,609,326 A | 3/1997 | Stearns et al. |
| 5,613,328 A | 3/1997 | Alley |
| 5,640,812 A | 6/1997 | Crowley et al. |
| 5,647,178 A | 7/1997 | Cline |
| 5,660,008 A | 8/1997 | Bevilacqua |
| D387,443 S | 12/1997 | Blankenbiller |
| 5,694,721 A | 12/1997 | Haddock |
| 5,697,197 A | 12/1997 | Simpson |
| 5,715,640 A | 2/1998 | Haddock |
| 5,732,513 A | 3/1998 | Alley |
| 5,743,063 A | 4/1998 | Boozer |
| 5,743,497 A | 4/1998 | Michael |
| 5,746,029 A | 5/1998 | Ullman |
| 5,755,824 A | 5/1998 | Blechschmidt et al. |
| 5,765,310 A | 6/1998 | Gold |
| 5,765,329 A | 6/1998 | Huang |
| 5,787,653 A | 8/1998 | Sakai et al. |
| 5,794,386 A | 8/1998 | Klein |
| 5,809,703 A | 9/1998 | Kelly |
| 5,826,379 A | 10/1998 | Curry |
| 5,826,390 A | 10/1998 | Sacks |
| 5,828,008 A | 10/1998 | Lockwood et al. |
| 5,842,318 A | 12/1998 | Bass et al. |
| 5,890,340 A | 4/1999 | Kafarowski |
| 5,901,507 A | 5/1999 | Smeja et al. |
| 5,941,931 A | 8/1999 | Ricks |
| 5,942,046 A | 8/1999 | Kahlfuss et al. |
| 5,970,586 A | 10/1999 | Demel et al. |
| 5,983,588 A | 11/1999 | Haddock |
| 5,994,640 A | 11/1999 | Bansemir et al. |
| 6,029,415 A | 2/2000 | Culpepper et al. |
| 6,073,410 A | 6/2000 | Schimpf et al. |
| 6,073,920 A | 6/2000 | Colley |
| 6,079,678 A | 6/2000 | Schott et al. |
| 6,088,979 A | 7/2000 | Neal |
| 6,095,462 A | 8/2000 | Morgan |
| 6,099,203 A | 8/2000 | Landes |
| 6,105,317 A | 8/2000 | Tomiuchi et al. |
| 6,106,310 A | 8/2000 | Davis et al. |
| 6,111,189 A | 8/2000 | Garvison et al. |
| 6,119,317 A | 9/2000 | Pfister |
| 6,132,070 A | 10/2000 | Vosika et al. |
| 6,158,180 A | 12/2000 | Edwards |
| 6,182,403 B1 | 2/2001 | Mimura et al. |
| 6,206,991 B1 | 3/2001 | Starr |
| 6,237,297 B1 | 5/2001 | Paroly |
| 6,253,496 B1 | 7/2001 | Gilchrist |
| 6,256,934 B1 | 7/2001 | Alley |
| 6,269,596 B1 | 8/2001 | Ohtsuka et al. |
| 6,276,285 B1 | 8/2001 | Ruch |
| 6,336,616 B1 | 1/2002 | Lin |
| 6,360,491 B1 | 3/2002 | Ullman |
| 6,364,262 B1 | 4/2002 | Gibson et al. |
| 6,364,374 B1 | 4/2002 | Noone et al. |
| 6,370,828 B1 | 4/2002 | Genschorek |
| 6,382,569 B1 | 5/2002 | Schattner et al. |
| 6,385,914 B2 | 5/2002 | Alley |
| 6,393,796 B1 | 5/2002 | Goettl et al. |
| 6,453,623 B1 | 9/2002 | Nelson et al. |
| 6,470,629 B1 | 10/2002 | Haddock |
| 6,497,080 B1 | 12/2002 | Malcolm |
| 6,499,259 B1 | 12/2002 | Hockman |
| 6,508,442 B1 | 1/2003 | Dolez |
| 6,521,821 B2 | 2/2003 | Makita et al. |
| 6,536,729 B1 | 3/2003 | Haddock |
| 6,576,830 B2 | 6/2003 | Nagao et al. |
| 6,602,016 B2 | 8/2003 | Eckart et al. |
| 6,622,441 B2 | 9/2003 | Miller |
| 6,637,671 B2 | 10/2003 | Alley |
| 6,655,633 B1 | 12/2003 | Chapman, Jr. |
| 6,665,991 B2 | 12/2003 | Hasan |
| 6,688,047 B1 | 2/2004 | McNichol |
| D487,595 S | 3/2004 | Sherman |
| 6,715,256 B1 * | 4/2004 | Fischer ............... E04D 3/362 52/537 |
| 6,718,718 B2 | 4/2004 | Haddock |
| 6,725,623 B1 | 4/2004 | Riddell et al. |
| 6,732,982 B1 | 5/2004 | Messinger |
| 6,751,919 B2 | 6/2004 | Calixto |
| D495,595 S | 9/2004 | Dressler |
| D496,738 S | 9/2004 | Sherman |
| 6,799,742 B2 | 10/2004 | Nakamura et al. |
| 6,834,466 B2 | 12/2004 | Trevorrow et al. |
| 6,918,217 B2 | 7/2005 | Jakob-Bamberg et al. |
| 6,918,727 B2 | 7/2005 | Huang |
| 6,922,948 B2 | 8/2005 | Smeja et al. |
| 6,967,278 B2 | 11/2005 | Hatsukaiwa et al. |
| 7,012,188 B2 | 3/2006 | Erling |
| 7,013,612 B2 | 3/2006 | Haddock |
| 7,063,763 B2 | 6/2006 | Chapman, Jr. |
| 7,100,338 B2 | 9/2006 | Haddock |
| 7,104,020 B2 | 9/2006 | Suttle |
| 7,127,852 B1 | 10/2006 | Dressler |
| 7,191,794 B2 | 3/2007 | Hodges |
| 7,195,513 B1 | 3/2007 | Gherardini |
| 7,219,863 B1 | 5/2007 | Collett, II |
| 7,240,770 B2 | 7/2007 | Mullins et al. |
| 7,260,918 B2 | 8/2007 | Liebendorfer |
| 7,281,695 B2 | 10/2007 | Jordan |

(56) References Cited

U.S. PATENT DOCUMENTS

| | | |
|---|---|---|
| 7,386,922 B1 | 6/2008 | Taylor et al. |
| 7,431,252 B2 | 10/2008 | Birli et al. |
| 7,435,134 B2 | 10/2008 | Lenox |
| 7,451,573 B2 | 11/2008 | Orszulak et al. |
| 7,458,555 B2 | 12/2008 | Mastropaolo et al. |
| 7,459,196 B2 | 12/2008 | Sturm |
| 7,469,511 B2 | 12/2008 | Wobber |
| 7,493,730 B2 | 2/2009 | Fennell, Jr. |
| 7,513,080 B1 | 4/2009 | Showalter |
| 7,516,580 B2 | 4/2009 | Fennell, Jr. |
| 7,578,711 B2 | 8/2009 | Robinson |
| 7,600,349 B2 | 10/2009 | Liebendorfer |
| 7,658,356 B1 | 2/2010 | Nehls |
| 7,686,625 B1 | 3/2010 | Dyer et al. |
| 7,703,256 B2 | 4/2010 | Haddock |
| 7,707,800 B2 | 5/2010 | Kannisto |
| 7,731,138 B2 | 6/2010 | Wiesner et al. |
| 7,758,011 B2 | 7/2010 | Haddock |
| 7,766,292 B2 | 8/2010 | Liebendorfer |
| 7,780,472 B2 | 8/2010 | Lenox |
| 7,788,874 B2 | 9/2010 | Miller |
| 7,788,879 B2 | 9/2010 | Brandes et al. |
| 7,824,191 B1 | 11/2010 | Browder |
| 7,827,920 B2 | 11/2010 | Beck et al. |
| 7,845,127 B2 | 12/2010 | Brescia |
| 7,847,181 B2 | 12/2010 | Brescia |
| 7,861,480 B2 | 1/2011 | Wendelburg et al. |
| 7,874,117 B1 | 1/2011 | Simpson |
| 7,891,618 B2 | 2/2011 | Carnevali |
| 7,915,519 B2 | 3/2011 | Kobayashi |
| 7,926,777 B2 | 4/2011 | Koesema, Jr. |
| 7,954,287 B2 | 6/2011 | Bravo et al. |
| 8,011,153 B2 | 9/2011 | Orchard |
| 8,066,200 B2 | 11/2011 | Hepner et al. |
| 8,092,129 B2 | 1/2012 | Wiley et al. |
| 8,096,503 B2 | 1/2012 | Verweyen |
| 8,109,048 B2 | 2/2012 | West |
| 8,146,299 B2 | 4/2012 | Stearns et al. |
| 8,151,522 B2 | 4/2012 | Stearns et al. |
| 8,153,700 B2 | 4/2012 | Stearns et al. |
| D658,977 S | 5/2012 | Riddell et al. |
| 8,226,061 B2 | 7/2012 | Nehls |
| 8,272,172 B2 | 9/2012 | Li |
| 8,294,026 B2 | 10/2012 | Wang et al. |
| 8,312,678 B1 | 11/2012 | Haddock |
| 8,316,590 B2 | 11/2012 | Cusson |
| 8,316,621 B2 | 11/2012 | Safari Kermanshahi et al. |
| 8,344,239 B2 | 1/2013 | Plaisted |
| 8,347,572 B2 | 1/2013 | Piedmont |
| 8,375,654 B1 | 2/2013 | West et al. |
| 8,387,319 B1 | 3/2013 | Gilles-Gagnon et al. |
| 8,407,895 B2 | 4/2013 | Hartelius et al. |
| 8,430,372 B2 | 4/2013 | Haddock |
| 8,448,405 B2 | 5/2013 | Schaefer et al. |
| 8,453,986 B2 | 6/2013 | Schnitzer |
| 8,458,967 B2 | 6/2013 | Kalkanoglu et al. |
| 8,495,997 B1 | 7/2013 | Laubach |
| 8,505,254 B2 | 8/2013 | Welter et al. |
| 8,528,888 B2 | 9/2013 | Header |
| 8,584,424 B2 | 11/2013 | Smith |
| 8,627,617 B2 | 1/2014 | Haddock et al. |
| D699,176 S | 2/2014 | Salomon et al. |
| 8,640,402 B1 | 2/2014 | Bilge |
| 8,656,649 B2 | 2/2014 | Haddock |
| 8,701,354 B2 | 4/2014 | Stearns et al. |
| 8,752,338 B2 | 6/2014 | Schaefer et al. |
| 8,756,870 B2 | 6/2014 | Teller et al. |
| 8,782,983 B2 | 7/2014 | Stearns |
| 8,826,618 B2 | 9/2014 | Stearns |
| 8,829,330 B2 | 9/2014 | Meyer et al. |
| 8,839,573 B2 | 9/2014 | Cusson et al. |
| 8,844,234 B2 | 9/2014 | Haddock et al. |
| 8,888,431 B2 | 11/2014 | Haney |
| 8,894,424 B2 | 11/2014 | DuPont |
| 8,910,928 B2 | 12/2014 | Header |
| 8,925,263 B2 | 1/2015 | Haddock et al. |
| 8,966,833 B2 | 3/2015 | Ally |
| 9,003,728 B2 | 4/2015 | Asci |
| 9,011,034 B2 | 4/2015 | Liu |
| 9,065,191 B2 | 6/2015 | Martin et al. |
| 9,085,900 B2 | 7/2015 | Haddock |
| 9,086,185 B2 | 7/2015 | Haddock |
| 9,127,451 B1 | 9/2015 | Boor |
| 9,134,044 B2 | 9/2015 | Stearns et al. |
| 9,147,785 B2 | 9/2015 | Haddock et al. |
| D740,113 S | 10/2015 | Olenick |
| 9,200,456 B2 | 12/2015 | Murphy |
| 9,222,263 B2 | 12/2015 | Haddock |
| 9,306,490 B2 | 4/2016 | Haddock et al. |
| 9,447,988 B2 | 9/2016 | Stearns et al. |
| 9,530,916 B2 | 12/2016 | Haddock et al. |
| 9,534,390 B2 * | 1/2017 | Pendley ............... E04D 13/031 |
| 9,608,559 B2 | 3/2017 | Haddock et al. |
| 9,611,652 B2 | 4/2017 | Haddock et al. |
| 9,647,433 B2 | 5/2017 | Meine |
| 9,722,532 B2 | 8/2017 | Almy |
| 9,732,512 B2 | 8/2017 | Haddock |
| 9,920,958 B2 | 3/2018 | Haddock et al. |
| 9,926,706 B2 | 3/2018 | Hockman |
| 1,005,385 A1 | 8/2018 | Haddock |
| 1,005,433 A1 | 8/2018 | Haddock et al. |
| 1,007,756 A1 | 9/2018 | Haddock et al. |
| 1,010,368 A1 | 10/2018 | Haddock et al. |
| 1,010,698 A1 | 10/2018 | Haddock et al. |
| 2002/0026765 A1 | 3/2002 | Vahey |
| 2002/0088196 A1 | 7/2002 | Haddock |
| 2003/0015637 A1 | 1/2003 | Liebendorfer |
| 2003/0062078 A1 | 4/2003 | Mimura |
| 2003/0070368 A1 | 4/2003 | Shingleton |
| 2003/0131551 A1 | 7/2003 | Mollinger et al. |
| 2003/0146346 A1 | 8/2003 | Chapman, Jr. |
| 2003/0173460 A1 | 9/2003 | Chapman, Jr. |
| 2003/0201009 A1 | 10/2003 | Nakajima et al. |
| 2004/0035065 A1 | 2/2004 | Orszulak et al. |
| 2004/0055233 A1 | 3/2004 | Showalter |
| 2004/0164208 A1 | 8/2004 | Nielson et al. |
| 2004/0231949 A1 | 11/2004 | Le et al. |
| 2004/0237465 A1 | 12/2004 | Refond |
| 2005/0102958 A1 | 5/2005 | Anderson |
| 2005/0115176 A1 | 6/2005 | Russell |
| 2005/0210769 A1 | 9/2005 | Harvey |
| 2005/0257434 A1 | 11/2005 | Hockman |
| 2006/0075691 A1 | 4/2006 | Verkamlp |
| 2006/0174571 A1 | 8/2006 | Panasik et al. |
| 2006/0174931 A1 | 8/2006 | Mapes et al. |
| 2006/0254192 A1 | 11/2006 | Fennell, Jr. |
| 2007/0131273 A1 | 6/2007 | Kobayashi |
| 2007/0199590 A1 | 8/2007 | Tanaka et al. |
| 2007/0241238 A1 | 10/2007 | Neace |
| 2007/0246039 A1 | 10/2007 | Brazier et al. |
| 2007/0248434 A1 | 10/2007 | Wiley et al. |
| 2007/0289229 A1 | 12/2007 | Aldo |
| 2007/0289233 A1 | 12/2007 | Haddock |
| 2008/0035140 A1 | 2/2008 | Placer et al. |
| 2008/0041011 A1 | 2/2008 | Kannisto |
| 2008/0190047 A1 | 8/2008 | Allen |
| 2008/0236520 A1 | 10/2008 | Maehara et al. |
| 2008/0265232 A1 | 10/2008 | Terrels et al. |
| 2008/0302407 A1 | 12/2008 | Kobayashi |
| 2009/0000220 A1 | 1/2009 | Lenox |
| 2009/0007520 A1 | 1/2009 | Navon |
| 2009/0194098 A1 | 8/2009 | Placer |
| 2009/0230205 A1 | 9/2009 | Hepner et al. |
| 2009/0320826 A1 | 12/2009 | Kufner |
| 2010/0058701 A1 | 3/2010 | Yao et al. |
| 2010/0154784 A1 | 6/2010 | King et al. |
| 2010/0162641 A1 | 7/2010 | Reyal et al. |
| 2010/0171016 A1 | 7/2010 | Haddock |
| 2010/0175738 A1 | 7/2010 | Huss et al. |
| 2010/0193651 A1 | 8/2010 | Railsback et al. |
| 2010/0206303 A1 | 8/2010 | Thorne |
| 2010/0212720 A1 | 8/2010 | Meyer et al. |
| 2010/0276558 A1 | 11/2010 | Faust et al. |
| 2010/0293874 A1 | 11/2010 | Liebendorfer |

(56) References Cited

U.S. PATENT DOCUMENTS

| | | |
|---|---|---|
| 2011/0078892 A1 | 4/2011 | Hartelius et al. |
| 2011/0120047 A1 | 5/2011 | Stearns et al. |
| 2011/0154750 A1 | 6/2011 | Welter et al. |
| 2011/0174360 A1 | 7/2011 | Plaisted et al. |
| 2011/0209745 A1 | 9/2011 | Korman |
| 2011/0214365 A1 | 9/2011 | Aftanas |
| 2011/0214388 A1 | 9/2011 | London |
| 2011/0239546 A1 | 10/2011 | Tsuzuki et al. |
| 2011/0260027 A1 | 10/2011 | Farnham, Jr. |
| 2011/0271611 A1 | 11/2011 | Maracci et al. |
| 2011/0272545 A1 | 11/2011 | Liu |
| 2011/0314752 A1 | 12/2011 | Meier |
| 2012/0073630 A1 | 3/2012 | Wu |
| 2012/0079781 A1 | 4/2012 | Koller |
| 2012/0085041 A1 | 4/2012 | Place |
| 2012/0102853 A1 | 5/2012 | Rizzo |
| 2012/0153108 A1 | 6/2012 | Schneider |
| 2012/0167364 A1 | 7/2012 | Koch et al. |
| 2012/0192519 A1 | 8/2012 | Ray |
| 2012/0193310 A1 | 8/2012 | Fluhrer et al. |
| 2012/0244729 A1 | 9/2012 | Rivera et al. |
| 2012/0248271 A1 | 10/2012 | Zeilenga |
| 2012/0267490 A1 | 10/2012 | Haddock et al. |
| 2012/0298188 A1 | 11/2012 | West et al. |
| 2012/0299233 A1 | 11/2012 | Header |
| 2012/0325761 A1 | 12/2012 | Kubsch et al. |
| 2013/0048056 A1 | 2/2013 | Kilgore et al. |
| 2013/0168525 A1 | 7/2013 | Haddock |
| 2013/0263917 A1 | 10/2013 | Hamamura |
| 2013/0313043 A1 | 11/2013 | Lallier |
| 2013/0340358 A1 | 12/2013 | Danning |
| 2014/0003861 A1 | 1/2014 | Cheung |
| 2014/0041202 A1 | 2/2014 | Schnitzer et al. |
| 2014/0069048 A1 | 3/2014 | Ally |
| 2014/0096462 A1 | 4/2014 | Haddock |
| 2014/0179133 A1 | 6/2014 | Redel |
| 2014/0283467 A1 | 9/2014 | Chabas et al. |
| 2015/0060620 A1 | 3/2015 | Smeja |
| 2015/0107168 A1 | 4/2015 | Kobayashi |
| 2015/0200620 A1 | 7/2015 | Haddock et al. |
| 2016/0025262 A1 | 1/2016 | Stearns et al. |
| 2016/0111998 A1 | 4/2016 | Schmid |
| 2017/0067258 A1 | 3/2017 | Stearns et al. |
| 2018/0119423 A1 | 5/2018 | Haddock |
| 2018/0128295 A1 | 5/2018 | Haddock |

FOREIGN PATENT DOCUMENTS

| | | |
|---|---|---|
| AT | 298762 | 5/1972 |
| AU | 2005201707 | 11/2006 |
| AU | 2009101276 | 1/2010 |
| AU | 2009245849 | 6/2010 |
| CH | 204783 | 5/1939 |
| CH | 388590 | 2/1965 |
| CH | 469159 | 2/1969 |
| CH | 671063 | 7/1989 |
| CN | 202025767 | 11/2011 |
| DE | 298762 | 4/1916 |
| DE | 941690 | 4/1956 |
| DE | 2126082 | 12/1972 |
| DE | 2523087 | 11/1976 |
| DE | 2556095 | 6/1977 |
| DE | 3326223 | 4/1984 |
| DE | 3617225 | 11/1987 |
| DE | 3723020 | 1/1989 |
| DE | 3728831 | 1/1989 |
| DE | 9112788 | 12/1991 |
| DE | 4115240 | 10/1992 |
| DE | 10056177 | 5/2002 |
| DE | 10062697 | 7/2002 |
| DE | 10344202 | 4/2004 |
| DE | 202005006951 | 8/2005 |
| DE | 102005002828 | 8/2006 |
| DE | 202006015336 | 12/2006 |
| DE | 202007002252 | 4/2007 |
| DE | 202007018367 | 7/2008 |
| DE | 102007036206 | 2/2009 |
| DE | 202009010984 | 12/2009 |
| DE | 102008032985 | 1/2010 |
| EP | 0481905 | 4/1992 |
| EP | 0952272 | 10/1999 |
| EP | 1126098 | 8/2001 |
| EP | 1447494 | 8/2004 |
| EP | 1804008 | 7/2007 |
| EP | 2105971 | 9/2009 |
| EP | 2327942 | 6/2011 |
| EP | 2375185 | 10/2011 |
| FR | 469159 | 7/1914 |
| FR | 1215468 | 4/1960 |
| FR | 2468209 | 4/1981 |
| FR | 2515236 | 4/1983 |
| FR | 2638772 | 5/1990 |
| FR | 2793827 | 11/2000 |
| FR | 2997169 | 4/2014 |
| GB | 2364077 | 1/2002 |
| GB | 2430946 | 4/2007 |
| GB | 2465484 | 5/2010 |
| GB | 2476104 | 6/2011 |
| JP | S56-158486 | 12/1981 |
| JP | H03-166452 | 7/1991 |
| JP | H04-73367 | 3/1992 |
| JP | H04-366294 | 12/1992 |
| JP | H05-346055 | 12/1993 |
| JP | H09-256562 | 9/1997 |
| JP | 2000-234423 | 8/2000 |
| JP | 2000-303638 | 10/2000 |
| JP | 2001-303724 | 10/2001 |
| JP | 2002-146978 | 5/2002 |
| JP | 2003-096986 | 4/2003 |
| JP | 2003-155803 | 5/2003 |
| JP | 2004-060358 | 2/2004 |
| JP | 2004-068270 | 3/2004 |
| JP | 2004-092134 | 3/2004 |
| JP | 2004-124583 | 4/2004 |
| JP | 2004-156326 | 6/2004 |
| JP | 2004-264009 | 9/2004 |
| JP | 2004-278145 | 10/2004 |
| JP | 2005-171623 | 6/2005 |
| JP | 2006-097291 | 4/2006 |
| JP | 2011-069130 | 4/2011 |
| JP | 2011-236611 | 11/2011 |
| KR | 100957530 | 5/2010 |
| WO | WO 96/30606 | 10/1996 |
| WO | WO 97/08399 | 3/1997 |
| WO | WO 99/55982 | 11/1999 |
| WO | WO 03/098126 | 11/2003 |
| WO | WO 2008/021714 | 2/2008 |
| WO | WO 2010/140878 | 12/2010 |
| WO | WO 2011/019460 | 2/2011 |
| WO | WO 2012/014203 | 2/2012 |
| WO | WO 2012/017711 | 2/2012 |
| WO | WO 2012/048056 | 4/2012 |
| WO | WO 2013/009375 | 1/2013 |

OTHER PUBLICATIONS

ClampFit-H Product Sheet, Nov. 2015, pp. 1-2, Schletter GmbH, Kirchdorf, Germany.

"ADJ Heavy Duty Lighting C-clamp," Sweetwater, 2011, 3 pages [retrieved online from: http://web.archive.org/web/20111112045516/http://www.sweetwater.com/store/detail/CClamp/].

Ideematec Tracking & Mounting Systems [online], Apr. 2008, [retrieved Mar. 6, 2012], Retrieved from http://www.ideematec.de.

"Kee Walk—Roof Top Walkway," Simplified Safety, 2011, 3 pages [retrieved online from: https://web.archive.org/web/20120207115154/http://simplifiedsafety.com/solutions/keewalk-rooftop-walkway/].

"KeeLine® The Safety Solution for Horizontal Life Lines," Kee Safety, Ltd. 2012, 2 pages [retrieved online from: https://web.archive.org/web/20120305120830/http://keesafety.co.uk/products/kee_line].

"Miller Fusion Roof Anchor Post," Miller Fall Protection, 2011, 3 pages [retrieved online from: https://web.archive.org/web/

(56) References Cited

OTHER PUBLICATIONS

20111211154954/www.millerfallprotection.com/fall-protection-products/roofing-products/miller-fusion-roof-anchor-post].

"New 'Alzone 360 system'", Arrid, 2008, 34 pages [retrieved online from: https://web.archive.org/web/20120317120735/www.arrid.com.au/?act=racking_parts].

"Oil Canning—Solutions," Pac-Clad, 2001, 2 pages [retrieved online from: pac-clad.com/aiapresentation/sld021.htm].

"Oil Canning," Metal Construction Association, 2003, Technical Bulletin #95-1060, 2 pages.

"REES-Snow Retention Systems," Weerbewind, 2010, 3 pages [retrieved online from: https://web.archive.org/web/20100310075027/www.rees-oberstdorf.de/en/products/snow-retention-system.html].

"Solar mount. System," Schletter GmbH, 2012, 1 page [retrieved online from: https://web.archive.org/web/20120316154604/www.schletter.de/152-1-Solar-mounting-systems.html].

Gallo "Oil-Canning," Metal Roofing Alliance, Ask-the-experts forum, Jun. 7, 2005, 4 pages [retrieved online from: www.metalroofingalliance.net/v2/forums/printview.cfm?action=mboard.members/viewmessages&ForumTopicID=4921&ForumCategoryID=1].

Haddock "History and Materials," Metalmag, Metal roofing from A (Aluminum) to Z (Zinc)—Part I, Sep./Oct. 2001, 4 pages.

Haddock "Metallic Coatings for Carbon Steel," Metalmag, Metal roofing from a (Aluminum) to Z (Zinc)—Part II, Nov./Dec. 2001, 8 pages.

\* cited by examiner

TRAPEZOIDAL RIB MOUNTING BRACKET WITH FLEXIBLE LEGS

CROSS-REFERENCE TO RELATED APPLICATIONS

This patent application claims the benefit of U.S. Provisional Patent Application Ser. No. 62/368,831, entitled "TRAPEZOIDAL RIB MOUNTING BRACKET WITH FLEXIBLE LEGS," filed on Jul. 29, 2016, and the entire disclosure of which is hereby incorporated by reference.

FIELD OF THE INVENTION

The present invention generally relates to installing structures on a building surface and, more particularly, to a mounting bracket for use with trapezoidal rib panels.

BACKGROUND

Metal panels are being increasingly used to define building surfaces such as roofs and sidewalls. One type of metal panel is a standing seam panel, where the edges of adjacent standing seam panels of the building surface are interconnected in a manner that defines a standing seam. Standing seam panels are expensive compared to other metal panels, and building surfaces defined by metal panels may be more costly than other types of building surface constructions.

It is often desirable to install various types of structures on building surfaces, such as heating, air conditioning, and ventilation equipment. Installing structures on standing seam panel building surfaces in a manner that punctures the building surface at one or more locations is undesirable in a number of respects. One is simply the desire to avoid puncturing what is a relatively expensive building surface. Another is that puncturing a metal panel building surface can present leakage and corrosion issues.

Photovoltaic or solar cells have existed for some time, and have been installed on various building roofs. A photovoltaic cell is typically incorporated into a perimeter frame of an appropriate material (e.g., aluminum) to define a photovoltaic module or solar cell module. Multiple photovoltaic modules may be installed in one or more rows (e.g., a string) on a roofing surface to define an array.

FIG. 1 illustrates one prior art approach that has been utilized to mount a solar cell module to a standing seam. A mounting assembly 10 includes a mounting device 74, a bolt 14, and a clamping member 142. Generally, the mounting device 74 includes a slot 90 that receives at least an upper portion of a standing seam 42. A seam fastener 106 is directed through the mounting device 74 and into the slot 90 to forcibly retain the standing seam 42 therein. This then mounts the mounting device 74 to the standing seam 42.

A threaded shaft 22 of the bolt 14 from the mounting assembly 10 passes through an unthreaded hole in a base 154 of a clamping member 142, and into a threaded hole 98 on an upper surface 78 of the mounting device 74. This then mounts the clamping member 142 to the mounting device 74. The clamping member 142 is used to interconnect a pair of different solar cell module frames 62 with the mounting assembly 10. In this regard, the clamping member 142 includes a pair of clamping legs 146, where each clamping leg 146 includes an engagement section 152 that is spaced from the upper surface 78 of the mounting device 74. The bolt 14 may be threaded into the mounting device 74 to engage a head 18 of the bolt with the base 154 of the clamping member 142. Increasing the degree of threaded engagement between the bolt 14 and the mounting device 74 causes the engagement sections 152 of the clamping legs 146 to engage the corresponding solar cell module frame 62 and force the same against the upper surface 78 of the mounting device 74.

SUMMARY

The present invention is generally directed to a mounting bracket for trapezoidal rib profiles. This mounting bracket includes a pair of legs that are disposed on opposite sides of a trapezoidal rib in the installed configuration. Each of these legs is flexible through at least a certain range of motion to allow the mounting bracket to be installed on a number of different trapezoidal rib profiles (having a different configuration and/or size for the individual trapezoidal ribs). This mounting bracket may be described herein with regard to an x-y-z coordinate system, where: 1) the "z" dimension corresponds with the longitudinal or length dimension for the mounting bracket, and that will typically coincide with the pitch of a roofing surface when the mounting bracket is in an installed configuration; 2) the "x" dimension corresponds with a lateral dimension for the mounting bracket, with the above-noted pair of legs being spaced from one another in the lateral or "x" dimension; and 3) the "y" dimension corresponds with a height dimension for the mounting bracket, or the "vertical extent" of the mounting bracket when disposed in an upright position on a horizontal supporting surface (including where free ends of the above-noted legs are disposed on such a horizontal supporting surface and where an upper wall of the mounting bracket would then be vertically spaced from the free ends of these legs).

A first aspect of the present invention is embodied by mounting bracket for trapezoidal rib panels that includes an upper section, a lower section, a rib receptacle, and first and second open bracket ends. The upper section includes an upper wall, which in turn may include a predefined mounting aperture (e.g., an unthreaded hole; an unthreaded mounting slot that extends in the length or "z" dimension for the mounting bracket). The lower section adjoins and extends below the upper section when the mounting bracket is disposed in an upright configuration. This lower section includes first and second legs that each extend away (downwardly when the mounting bracket is in an upright position) from the upper section in diverging relation to one another. The first leg is flexibly deflectable at least 2° relative to the second leg (and in at least one direction) to change the spacing between the first and second legs, while the second leg is also flexibly deflectable at least 2° relative to the first leg (and in at least one direction) to change the spacing between the first and second legs. The first and second open bracket ends are spaced from one another along the length or "z" dimension for the mounting bracket, and the rib receptacle extends between the first and second open bracket ends and also extends between the first and second legs.

A number of feature refinements and additional features are separately applicable to the first aspect of the present invention. These feature refinements and additional features may be used individually or in any combination in relation to the first aspect. The mounting bracket may be formed from any appropriate material or combination of materials. One embodiment has the mounting bracket being of one-piece construction (e.g., multiple components are not separately attached to define the mounting bracket; the mounting bracket does not include any joints between adjacent portions thereof). One embodiment has the mounting bracket being in the form of an extrusion.

The first leg may be flexibly deflectable up to about 5° relative to the second leg (and in at least one direction) to change the spacing between the first and second legs. The second leg may be flexibly deflectable at least 5° relative to the first leg (and in at least one direction) to change the spacing between the first and second legs. One embodiment has each of the first and second legs being flexibly deflectable through a range of motion of 2°-5° in at least one direction.

The deflection of first and second legs may be characterized relative to first and second positions, respectively. From the same first position and for one embodiment: 1) the first leg may be flexibly deflectable at least 2° away from the second leg; and 2) the first leg may also be flexibly deflectable at least 2° toward the second leg. From the same second position and for one embodiment: 1) the second leg may be flexibly deflectable at least 2° away from the first leg; and 2) the second leg may also be flexibly deflectable at least 2° toward the first leg. One embodiment has the first leg being flexibly deflectable up to about 5° from a first position in a direction that is away from the second leg, and the first leg also being flexibly deflectable up to about 5° from this same first position in a direction that is toward the second leg (e.g., the first leg may flexibly deflect through a range of motion from 2° to 5° in each of two different directions that are opposite of one another for an embodiment of the present invention). One embodiment has the second leg being flexibly deflectable up to about 5° from a second position in a direction that is away from the first leg, and the second leg also being flexibly deflectable up to about 5° from this same second position in a direction that is toward the first leg (e.g., the second leg may flexibly deflect through a range of motion from 2° to 5° in each of two different directions that are opposite of one another for an embodiment of the present invention).

The above-noted first and second positions for the first and second legs, respectively, are subject to a number of characterizations. One is that the first position is an unbiased position for the first leg and that the second position is an unbiased position for the second leg. Another is that the first position is a neutral position for the first leg and the second position is a neutral position for the second leg. Yet another is that the first position corresponds to the position for the first leg when it is not subjected to an external force, and that the second position corresponds to the position for the second leg when it is not subjected to an external force. The "flexible deflection" of the first and second legs may be characterized as an elastic deflection relative to the upper section of the mounting bracket. Based upon such an elastic deflection, once the associated force is removed the first leg should attempt to return at least toward its first position (including being able to reach the first position), and once the associated force is removed the second leg should attempt to return at least toward its second position (including being able to reach the second position).

The flexured movement of the first and second legs to accommodate installation of the mounting bracket on different trapezoidal rib profiles is subject to a number of characterizations. One is that the first leg flexes at least generally about a first reference axis (e.g., via a pivotal or pivotal-like motion), and the second leg flexes at least generally about a second reference axis that is parallel to this first reference axis (e.g., via a pivotal or pivotal-like motion), where the first and second reference axes are parallel to the length or "z" dimension for the mounting bracket and where the first and second reference axes are spaced from one another in the lateral or "x" dimension for the mounting bracket. The first reference axis and the second reference axis may be disposed at a common elevation when the mounting bracket is in an upright position on a horizontal supporting surface. The first leg may also be characterized as flexing at least generally about an intersection between the first leg and the upper section of the mounting bracket, while the second leg may be characterized as flexing at least generally about an intersection between the second leg and the upper section of the mounting bracket.

The upper section of the mounting bracket may include multiple sections. A first section for the upper section may include the upper wall and may be of a first width (measured in the lateral or "x" dimension for the mounting bracket). A second section for the upper section may be positioned somewhere below the first section (when the mounting bracket is in an upright position on a horizontal supporting surface), may be of a second width (measured in the lateral or "x" dimension for the mounting bracket) that is larger than the first width, may be defined by a pair of sidewalls that are disposed in parallel relation (that are spaced in the lateral or "x" dimension for the mounting bracket), may have a height (measured in the "y" dimension for the mounting bracket) of at least about 0.75", or any combination thereof. A receptacle may be located somewhere between the upper wall and the noted second section (in the "y" dimension for the mounting bracket), where this receptacle is at least partially separated from the second section (e.g., by a least one rib offsetting member—discussed below) and accommodates receipt of a nut, bolt head, or the like. Having the noted second section with a height of at least 0.75" (in the "y" dimension for the mounting bracket) provides a suitable space for wire management (e.g., such that PV module wire, cables or the like may be directed completely through the second section (from one open bracket end to the opposite open bracket end) for the case of a photovoltaic module installation). Such a second section for the upper section may also be used to dispose one or more photovoltaic modules in a desired spacing to an underlying roofing surface.

The mounting bracket may include at least one rib offsetting member and which may be characterized as being part of a lowermost end of the upper section for the mounting bracket (when disposed in an upright position on a horizontal supporting surface). Such a rib offsetting member(s) may be disposed on an upper rib wall of a trapezoidal rib when the mounting bracket is an installed configuration, for instance to maintain the upper wall of the mounting bracket in spaced relation to such an upper rib wall. Although there could be a small space between the rib offsetting member(s) for the mounting bracket and the upper rib wall in the installed configuration, no other portion of the mounting bracket will be disposed in such a space.

A single rib offsetting member could extend from one side of the upper section of the mounting bracket to an opposite side of the upper section, where these sides are spaced in the lateral or "x" dimension for the mounting bracket. The mounting bracket could utilize a pair of rib offsetting members, where one rib offsetting member would extend inwardly from one side of the mounting bracket, where another (separate) rib offsetting member would extend inwardly from the opposite side of the mounting bracket, and where the free ends of these two rib offsetting members would be in spaced relation to one another in the lateral or "x" dimension for the mounting bracket.

The first leg may intersect or merge with a rib offsetting member of the mounting bracket. The second leg may intersect or merge with a rib offsetting member of the mounting bracket as well. The intersection between the first leg and a rib offsetting member of the mounting bracket may define a first acute angle (i.e., less than 90°) on an exterior of the mounting bracket. The intersection between the second leg and a rib offsetting member of the mounting bracket may define a second acute angle (i.e., less than 90°) on an exterior of the mounting bracket. The first and second acute angles may be of a common magnitude.

The first and second legs could merge or intersect with a common rib offsetting member (e.g., a rib offsetting member that extends from one side of the mounting bracket to its opposite side, where these sides are spaced in the lateral or "x" dimension for the mounting bracket). The first leg could intersect or merge with a first rib offsetting member, while the second leg could intersect or merge with a second rib offsetting member that is spaced from the first rib offsetting member, including where the first and second rib offsetting members are spaced in the lateral or "x" dimension for the mounting bracket.

The mounting bracket may be configured such that: 1) a first part of a rib offsetting member for the mounting bracket extends from its intersection with the first leg to a first sidewall of the mounting bracket, including where this first part extends away relative to a first side of a first reference plane in proceeding from its intersection with the first leg to the first sidewall and where this first reference plane is disposed between the first and second legs and occupies both the ""z" and "y" dimensions for the mounting bracket (e.g., such a first reference plane only appears as an edge in an end view of the mounting bracket); and 2) a second part of a rib offsetting member for the mounting bracket extends from its intersection with the second leg to a second sidewall of the mounting bracket, including where this second part extends away relative to an opposite, second side of the first reference plane in proceeding from its intersection with the second leg to the second sidewall, where these first and second sidewalls would be spaced in the lateral or "x" dimension for the mounting bracket.

The mounting bracket may include a first exterior notch on a first side of the mounting bracket and a second exterior notch on a second side of the mounting bracket, including where these first and second sides of the mounting bracket are spaced in the lateral or "x" dimension for the mounting bracket. The first exterior notch may be defined by the intersection of the first leg with a rib offsetting member for the mounting bracket. The second exterior notch may be defined by the intersection of the second leg with a rib offsetting member for the mounting bracket.

The first exterior notch and the second exterior notch may be characterized as being at least generally V-shaped. The first exterior notch may be characterized as having a first closed notch end and a first open notch end, and the spacing between which defines a depth for the first exterior notch. Two first walls extend from the first closed notch end to the first open notch end in diverging relation to one another. Similarly, the second exterior notch may be characterized as having a second closed notch end and a second open notch end, and the spacing between which defines a depth for the second exterior notch. Two second walls extend from the second closed notch end to the second open notch end in diverging relation to one another. A first reference plane is disposed between the first and second legs and occupies both the "z" and "y" dimensions for the mounting bracket (e.g., such that the first reference plane only appears as an edge in an end view of the mounting bracket). Each of the noted first walls for the first exterior notch extend away relative to a first side of the reference plane in proceeding from the first closed notch end to the first open notch end. Each of the noted second walls for the second exterior notch extend away relative to an opposite, second side of the first reference plane in proceeding from the second closed notch end to the second open notch end.

An entirety of the upper wall may be in the form of a single flat surface, including where a perimeter of this single flat surface defines a surface area of at least about 2.5 in.$^2$ and/or including where the upper wall defines the uppermost extreme for the mounting bracket in an installed configuration. Such an upper wall accommodates using the mounting bracket to structurally interconnect various types of attachments to a roofing surface, more specifically to a trapezoidal rib of such a roofing surface. For instance, the mounting bracket may be installed on a trapezoidal rib such that the first leg of the mounting bracket is positioned alongside a first side of the trapezoidal rib, such that the second leg of the mounting bracket is positioned alongside a second side of the trapezoidal rib, and such of the upper wall the mounting bracket is spaced from an upper rib wall of the trapezoidal rib, where the first and second sides of the trapezoidal rib are spaced from one another and where each of these first and second sides of the trapezoidal rib extend downwardly from the upper rib wall. At least one first fastener may extend through the first leg of the mounting bracket, through the first side of the trapezoidal rib, and terminate in a hollow interior of the trapezoidal rib. At least one second fastener may extend through the second leg of the mounting bracket, through the second side of the trapezoidal rib, and terminate in the hollow interior of the trapezoidal rib. The first fastener(s) and second fastener(s) secure the mounting bracket to the trapezoidal rib. An attachment fastener may extend at least into the upper wall of the mounting bracket to secure an attachment relative to the mounting bracket. Such an attachment may be in the form of single photovoltaic module, a pair of photovoltaic modules, or any other appropriate structure.

A second aspect is directed to a method of installing a mounting bracket on a building surface defined by a plurality of trapezoidal rib panels. The mounting bracket includes an upper section having an upper wall, along with a lower section that adjoins and extends from the upper section. The upper wall may include a predefined mounting aperture (e.g., an unthreaded hole; an unthreaded mounting slot that extends in the length or "z" dimension for the mounting bracket). The lower section includes first and second legs that extend from the upper section in diverging relation to one another. The first and second legs are flexed away from first and second positions, respectively, as part of the installation of the mounting bracket on a trapezoidal rib. The first leg of the mounting bracket is positioned alongside a first side of a trapezoidal rib, while the second leg of the mounting bracket is positioned alongside a second side of the same trapezoidal rib. At least one first fastener is directed through the first leg of the mounting bracket and through the first side of the trapezoidal rib. At least one second fastener is directed through the second leg of the mounting bracket and through the second side of the trapezoidal rib.

A number of feature refinements and additional features are separately applicable to the second aspect of the present invention. These feature refinements and additional features may be used individually or in any combination in relation to the second aspect. The mounting bracket of the first aspect may be installed on a trapezoidal rib in accordance with the second aspect.

The first and second legs each may be flexed away from one another to increase the spacing therebetween for attachment to a trapezoidal rib. Conversely, the first and second legs each may be flexed toward one another to decrease the spacing therebetween for attachment to a trapezoidal rib. The flexing of the first and second legs may utilize an elastic deformation of the mounting bracket. As such, the first leg may be characterized as elastically deflecting as part of the installation of the mounting bracket on a trapezoidal rib, and the second leg may be characterized as elastically deflecting as part of the installation of the mounting bracket on a trapezoidal rib.

In one embodiment, an installer exerts a force on the upper wall of the mounting bracket to advance the mounting bracket relative to an underlying trapezoidal rib. The application of this force and the engagement of each of the first and second legs with opposing sides of the trapezoidal rib causes the first and second legs to flexibly deflect at least generally away from one another to increase the spacing therebetween. With the mounting bracket being in a desired position relative to the underlying trapezoidal rib (which may require continued application of a force on the upper wall of the mounting bracket by an installer; e.g., such that at least one rib offsetting member of the mounting bracket is positioned on or in close proximity to an upper rib wall of the trapezoidal rib), one or more first fasteners may be directed through the first leg and the first side of the trapezoidal rib and one or more second fasteners may be directed through the second leg and the second side of the trapezoidal rib. As such, at least part of the flexing of the first and second legs may occur prior to separately fastening the first and second legs to corresponding sides of the trapezoidal rib.

In one embodiment, an installer positions the mounting bracket on a trapezoidal rib (e.g., such that at least one rib offsetting member of the mounting bracket is positioned on or in close proximity to an upper rib wall of the trapezoidal rib). The first leg could be flexed toward the corresponding first side of the trapezoidal rib by an installer such that at least one first fastener may be directed through the first leg and the first side of the trapezoidal rib. The second leg could be flexed toward the corresponding second side of the trapezoidal rib by an installer such that at least one second fastener may be directed through the second leg and the second side of the trapezoidal rib. As such, at least part of the flexing of the first leg may occur prior to fastening the first leg to the first side of the trapezoidal rib and at least part of the flexing of the second leg occurs prior to fastening the second leg to the second side of the trapezoidal rib.

In one embodiment, an installer positions the mounting bracket on a trapezoidal rib (e.g., such that at least one rib offsetting member of the mounting bracket is positioned on or in close proximity to an upper rib wall of the trapezoidal rib). The first leg could be positioned alongside the corresponding first side of the trapezoidal rib (without flexing the first leg relative to the upper section of the mounting bracket) such that at least one first fastener may be directed through the first leg and the first side of the trapezoidal rib. Thereafter, the second leg could be flexed toward the corresponding second side of the trapezoidal rib by an installer such that at least one second fastener may be directed through the second leg and the second side of the trapezoidal rib. As the first leg has already been attached to the first side of the trapezoidal rib, the same force that flexes the second leg toward the first leg (for positioning alongside the second side of the trapezoidal rib) will also cause the first leg to flex as well (e.g., relative to the upper section of the mounting bracket). As such, at least part of the flexing of the first and second legs occurs prior to both of the first and second legs being attached to their corresponding sides of the trapezoidal rib.

Any feature of any other various aspects of the present invention that is intended to be limited to a "singular" context or the like will be clearly set forth herein by terms such as "only," "single," "limited to," or the like. Merely introducing a feature in accordance with commonly accepted antecedent basis practice does not limit the corresponding feature to the singular. Moreover, any failure to use phrases such as "at least one" also does not limit the corresponding feature to the singular. Use of the phrase "at least generally" or the like in relation to a particular feature encompasses the corresponding characteristic and insubstantial variations thereof. Finally, a reference of a feature in conjunction with the phrase "in one embodiment" does not limit the use of the feature to a single embodiment.

Various aspects of the present invention are also addressed by the following paragraphs and in the noted combinations:

1. A mounting bracket for trapezoidal rib panels, comprising:
    an upper section comprising an upper wall;
    a lower section adjoining and extending below said upper section, wherein said lower section comprises first and second legs that each extend downwardly from said upper section in diverging relation to one another, wherein from a first position said first leg is flexibly deflectable at least 2° away from said second leg and is flexibly deflectable at least 2° toward said second leg, and wherein from a second position said second leg is flexibly deflectable at least 2° away from said first leg and is flexibly deflectable at least 2° toward said first leg;
    a rib receptacle; and
    first and second open bracket ends that are spaced from one another along a length dimension of said mounting bracket, wherein said rib receptacle extends between said first and second legs and also extends between said first and second open bracket ends.
2. The mounting bracket of Paragraph 1, wherein said first position is an unbiased position for said first leg and said second position is an unbiased position for said second leg.
3. The mounting bracket of any of Paragraphs 1-2, wherein said first position is a neutral position for said first leg and said second position is a neutral position for said second leg.
4. The mounting bracket of any of Paragraphs 1-3, wherein said first position is a position for said first leg when not subjected to an external force and said second position is a position for said second leg when not subjected to an external force.
5. The mounting bracket of any of Paragraphs 1-4, wherein said first leg moves at least toward said first position in the absence of an external force to said first leg and said second leg moves at least toward said second position in the absence of an external force to said second leg.
6. The mounting bracket of any of Paragraphs 1-5, wherein said first leg and said second leg each elastically deflect relative to said upper section.

7. The mounting bracket of any of Paragraphs 1-6, wherein from said first position said first leg is flexibly deflectable up to about 5° away from said second leg and is flexibly deflectable up to about 5° toward said second leg, and wherein from said second position said second leg is flexibly deflectable up to about 5° away from said first leg and is flexibly deflectable up to about 5° toward said first leg.

8. The mounting bracket of any of Paragraphs 1-7, wherein said first leg is flexibly deflectable at least generally about a first reference axis that coincides with said length dimension of said mounting bracket, and wherein said second leg is flexibly deflectable at least generally about a second reference axis that is parallel to said first reference axis.

9. The mounting bracket of Paragraph 8, wherein said first reference axis and said second reference axis are disposed at a common elevation when said mounting bracket is in an upright position on a horizontal supporting surface.

10. The mounting bracket of Paragraph 8, wherein said first reference axis and said second reference axis are disposed within a reference plane that is parallel to said upper wall.

11. The mounting bracket of any of Paragraphs 1-7, wherein said first leg is flexibly deflectable about an intersection between said first leg and said upper section, and wherein said second leg is flexibly deflectable about an intersection between said second leg and said upper section.

12. The mounting bracket of any of Paragraphs 1-11, wherein each of said first leg and said second leg are disposed at a common acute angle relative to first and second reference planes, respectively, that are parallel to one another, wherein each of said first and second reference planes extend in a height dimension for said mounting bracket when said mounting bracket is in an upright position on a horizontal supporting surface.

13. The mounting bracket of any of Paragraphs 1-11, wherein a reference plane bisects said mounting bracket in a lateral dimension of said mounting bracket, wherein said first leg is positioned on a first side of said reference plane, wherein said second leg is positioned on a second side of said reference plane that is opposite of said first side, and wherein said first and second legs are oriented at a common angle relative to said reference plane.

14. The mounting bracket of any of Paragraphs 1-13, wherein said upper section of said mounting bracket comprises first and second sections, wherein said first section comprises said upper wall and is of a first width, wherein said second section is positioned below said first section when said mounting bracket is in an upright position on a horizontal supporting surface and comprises a second width that is greater than said first width, and wherein a lower end of said second section comprises at least one rib offsetting member.

15. The mounting bracket of Paragraph 14, wherein when said mounting bracket is positioned on a trapezoidal rib: 1) said at least one rib offsetting member engages an upper rib wall of the trapezoidal rib to offset said upper wall of said mounting bracket from the upper rib wall of the trapezoidal rib; 2) said upper wall is an uppermost extreme of said mounting bracket; 3) said first leg is disposed adjacent to a first side of the trapezoidal rib; and 4) said second leg is disposed adjacent to a second side of the trapezoidal rib that is opposite of the first side.

16. The mounting bracket of any of Paragraphs 14-15, wherein said first section further comprises a receptacle disposed below said upper wall.

17. The mounting bracket of any of Paragraphs 14-16, wherein said second section of said upper section comprises a pair of sidewalls that are spaced from one another in parallel relation.

18. The mounting bracket of any of Paragraphs 14-17, wherein said at least one rib offsetting member comprises first and second rib offsetting members that are spaced from one another, wherein said first leg extends from said first rib offsetting member, and wherein said second leg extends from said second rib offsetting member.

19. The mounting bracket of Paragraph 18, wherein said first rib offsetting member extends past an intersection with said first leg in the direction of said second rib offsetting member and terminates prior to reaching said second rib offsetting member, wherein said second rib offsetting member extends past an intersection with said second leg in the direction of said first rib offsetting member and terminates prior to reaching said first rib offsetting member, and wherein an open space extends between said first and second rib offsetting members.

20. The mounting bracket of any of Paragraphs 1-13, wherein said upper section of said mounting bracket further comprises first and second sidewalls and at least one rib offsetting member, wherein said first and second sidewalls are located between said upper wall and said at least one rib offsetting member in a vertical dimension when said mounting bracket is in an upright position on a horizontal supporting surface, wherein said first and second sidewalls are disposed in parallel relation and are separated by a spacing that is greater than a width of said upper section, and wherein each of said first and second legs extend from said at least one rib offsetting member.

21. The mounting bracket of any of Paragraphs 1-20, wherein a first portion of a lower end of said upper section merges with said first leg at a first location, wherein a second portion of said lower end of said upper section merges with said second leg at a second location, wherein a first acute angle exists between said first leg and said first portion of said lower end of said upper section, and wherein a second acute angle exists between said second leg and said second portion of said lower end of said upper section.

22. The mounting bracket of Paragraph 21, wherein said first and second acute angles are of a common magnitude.

23. The mounting bracket of any of Paragraphs 1-22, wherein said first and second side legs are oriented as the mirror image of one another.

24. The mounting bracket of any of Paragraphs 1-13 and 21-23, further comprising a first rib offsetting member and a second rib offsetting member that are separated by an open space.

25. The mounting bracket of any of Paragraphs 1-24, wherein said mounting bracket is of one-piece construction.

26. The mounting bracket of any of Paragraphs 1-25, wherein an entirety of said upper wall is in the form of a single flat surface that incorporates a mounting aperture.
27. The mounting bracket of Paragraph 26, wherein said single flat surface of said upper wall has a perimeter that defines an area of at least 2.5 in.$^2$.
28. The mounting bracket of any of Paragraphs 1-25, wherein said upper wall defines an uppermost extreme of said mounting bracket when positioned on a trapezoidal rib, wherein an entirety of said upper wall is in the form of a single flat surface that incorporates a mounting aperture, and wherein said single flat surface has a perimeter that defines an area of at least 2.5 in.$^2$.
29. The mounting bracket of any of Paragraphs 1-28, wherein said mounting bracket comprises a wire management space that is open, wherein a vertical extent of said wire management space is at least about 0.75" when said mounting bracket is disposed in an upright position on a horizontal supporting surface.
30. The mounting bracket of any of Paragraphs 1-29, further comprising a first exterior notch on a first side of said mounting bracket, and a second exterior notch on a second side of said mounting bracket, wherein said first and second sides are opposite one another, and wherein said first and second exterior notches are opposite of one another.
31. The mounting bracket of Paragraph 30, wherein said first exterior notch comprises two first walls that extend from a first closed notch end of said first exterior notch to a first open notch end of said first exterior notch in diverging relation to one another, wherein said second exterior notch comprises two second walls that extend from a second closed notch end of said second exterior notch to a second open notch end of said second exterior notch in diverging relation to one another, wherein a first reference plane is vertically oriented when said mounting bracket is in an upright position on a horizontal supporting surface, is disposed between said first and second exterior notches, and appears as an edge in an end view of said mounting bracket, wherein each of said first walls extend away relative to a first side of said first reference plane in proceeding from said first closed notch end of said first exterior notch to said first open notch end of said first exterior notch, and wherein each of said second walls extend away relative to a second side of said first reference plane in proceeding from said second closed notch end of said second exterior notch to said second open notch end of said second exterior notch.
32. An attachment assembly comprising the mounting bracket of any of Paragraphs 1-31, and further comprising:
    a trapezoidal rib, wherein said mounting bracket is positioned on said trapezoidal rib such that said first leg of said mounting bracket is positioned alongside a first side of said trapezoidal rib, such that said second leg of said mounting bracket is positioned alongside a second side of said trapezoidal rib, and such that said upper wall of said mounting bracket is spaced from an upper rib wall of said trapezoidal rib;
    an attachment;
    an attachment fastener that extends at least into said upper wall of said mounting bracket, wherein said attachment is secured relative to said mounting bracket by said attachment fastener;
    at least one first fastener that extends through said first leg of said mounting bracket, through said first side of said trapezoidal rib, and that terminates in a hollow interior of said trapezoidal rib; and
    at least one second fastener that extends through said second leg of said mounting bracket, through said second side of said trapezoidal rib, and that terminates in said hollow interior of said trapezoidal rib.
33. The attachment assembly of Paragraph 32, wherein no fastener extends through said upper wall of said mounting bracket and through said upper rib wall of said trapezoidal rib.
34. A photovoltaic system, comprising:
    a mounting assembly comprising:
    the mounting bracket of any of Paragraphs 1-31;
    a mounting plate positioned on said upper wall of said mounting bracket;
    a clamping member engageable with a first photovoltaic module when positioned on said mounting plate; and
    a clamp fastener that extends through said clamping member, then through said mounting plate, and then at least into said upper wall of said mounting bracket.
35. The photovoltaic system of Paragraph 35, further comprising:
    a trapezoidal rib, wherein said mounting bracket is positioned on said trapezoidal rib such that said first leg of said mounting bracket is positioned alongside a first side of said trapezoidal rib, such that said second leg of said mounting bracket is positioned alongside a second side of said trapezoidal rib, and such that said upper wall of said mounting bracket is spaced from an upper rib wall of said trapezoidal rib;
    at least one first fastener that extends through said first leg of said mounting bracket, through said first side of said trapezoidal rib, and that terminates in a hollow interior of said trapezoidal rib;
    at least one second fastener that extends through said second leg of said mounting bracket, through said second side of said trapezoidal rib, and that terminates in said hollow interior of said trapezoidal rib; and
    a first photovoltaic module positioned on said upper surface of said mounting plate of said mounting assembly, wherein said clamping member of said mounting assembly engages said first photovoltaic module.
36. The photovoltaic system of any of Paragraphs 34-35, wherein said mounting bracket comprises a wire management space that is open, wherein a vertical extent of said wire management space is at least about 0.75" when said mounting bracket is disposed in an upright position on a horizontal supporting surface, and wherein said photovoltaic system further comprises a plurality of photovoltaic module electrical wires or cables that extend through said wire management space of said mounting bracket along said length dimension of said mounting bracket.
37. A method of installing a mounting bracket on a building surface comprising a plurality of trapezoidal rib panels, wherein said mounting bracket comprises an upper section comprising an upper wall, wherein said upper wall comprises a mounting aperture, wherein said mounting bracket further comprises a lower section adjoining and extending from said upper section, wherein said lower section comprises first and second legs that each extend downwardly from said upper section in diverging relation to one another, said method comprising the steps of:
flexing said first and second legs away from first and second positions, respectively, and either toward one another or away from one another;
positioning said first leg of said mounting bracket alongside a first side of a trapezoidal rib;
positioning said second leg of said mounting bracket alongside a second side of said trapezoidal rib;
disposing said upper wall of said mounting bracket in spaced relation to an upper end of said trapezoidal rib;
directing at least one first fastener through said first leg of said mounting bracket and through said first side of said trapezoidal rib; and
directing at least one second fastener through said second leg of said mounting bracket and through said second side of said trapezoidal rib.

38. The method of Paragraph 37, wherein said flexing step comprises increasing a spacing between said first and second legs prior to or during positioning of said mounting bracket on said trapezoidal rib.

39. The method of Paragraph 38, wherein an orientation of said first leg of said mounting bracket at least substantially matches an orientation of said first side of said trapezoidal rib after said flexing step and prior to said directing at least one first fastener step, and wherein an orientation of said second leg of said mounting bracket at least substantially matches an orientation of said second side of said trapezoidal rib after said flexing step and prior to said directing at least one second fastener step.

40. The method of Paragraph 37, wherein said flexing step comprises decreasing a spacing between said first and second legs.

41. The method of Paragraph 40, wherein an orientation of said first leg of said mounting bracket at least substantially matches an orientation of said first side of said trapezoidal rib at some point in time after said flexing step, and wherein an orientation of said second leg of said mounting bracket at least substantially matches an orientation of said second side of said trapezoidal rib at some point in time after said flexing step.

42. The method of any of Paragraphs 37-41, wherein said flexing step comprises elastically deflecting each of said first and second legs relative said upper section.

43. The method of any of Paragraphs 37, 38, and 40, wherein an orientation of said first leg of said mounting bracket at least substantially matches an orientation of said first side of said trapezoidal rib at least after said directing at least one first fastener step, and wherein an orientation of said second leg of said mounting bracket at least substantially matches an orientation of said second side of said trapezoidal rib at least after said directing at least one second fastener step.

DETAILED DESCRIPTION

Figure 1:
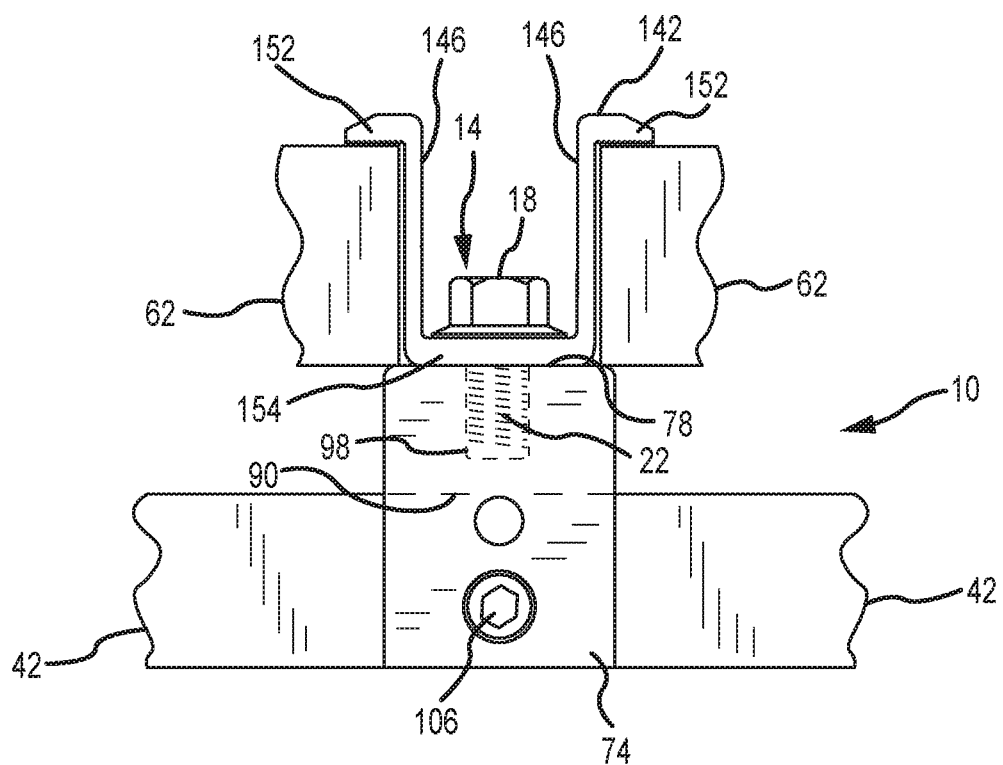
FIG. 1 is a side view of a prior art mounting assembly for interconnecting solar cell modules with a standing seam roof.
Figure 2:
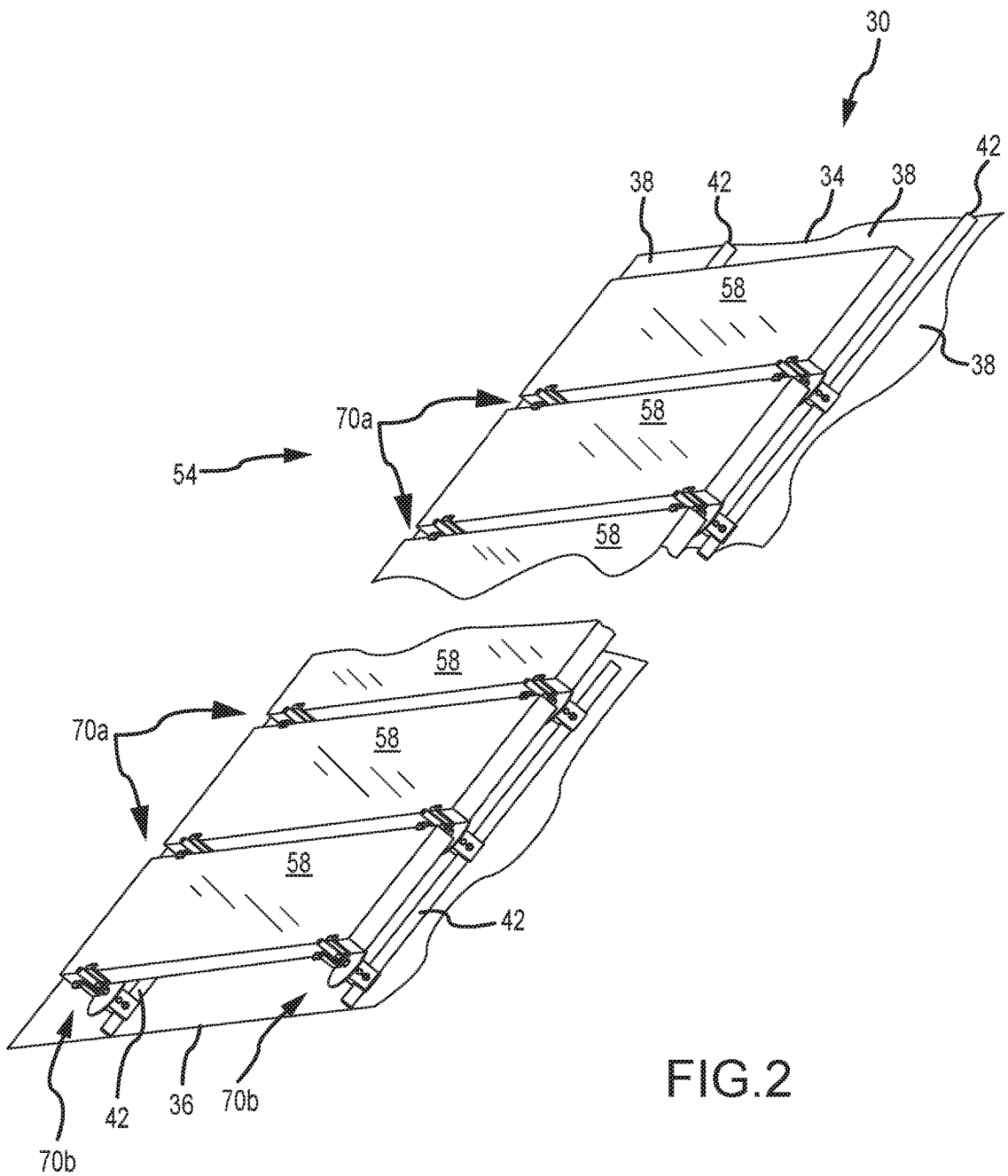
FIG. 2 is a perspective view of a plurality of solar cell modules installed on a standing seam building surface using a plurality of adjustable mounting assemblies.

FIG. 2 illustrates an assembly 30 in the form of a building surface 34, a photovoltaic or solar cell array 54 defined by a plurality of photovoltaic modules or solar cell modules 58 (only schematically shown in FIG. 2), and a plurality of mounting assemblies 70a, 70b. The building surface 34 is defined by interconnecting a plurality of panels 38. Although the panels 38 may be formed from any appropriate material or combination of materials, typically they are in the form of metal panels 38. In any case, each adjacent pair of panels 38 is interconnected in a manner so as to define a standing seam 42 (only schematically shown in FIG. 2). A base 46 is disposed between the opposing edges of each panel 38 (e.g., FIG. 3). The entirety of the base 46 may be flat or planar. However, one or more small structures may be formed/shaped into the base 46 of one or more panels 38 of the building surface 34 to address oil canning. These structures are commonly referred to as crests, minor ribs, intermediate ribs, pencil ribs, striations, fluting, or flutes.

Figure 3:
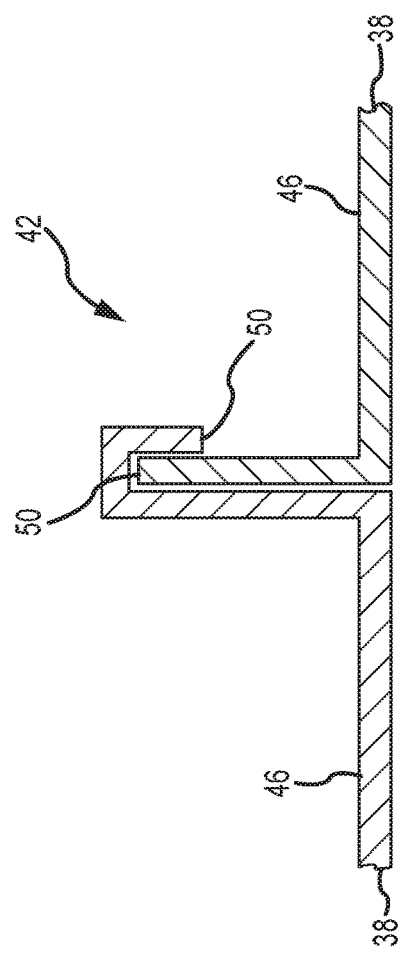
FIG. 3 is a cross-sectional schematic of a representative standing seam defined by interconnecting a pair of panels.

A cross-sectional schematic of one of the standing seams 42 is illustrated in FIG. 3. There it can be seen that a pair of interconnected panels 38 define a standing seam 42. Generally, an edge or edge section 50 of one panel 38 is "nested" with the opposing edge or edge section 50 of the adjacent panel 38 to define a standing seam 42. Typically each the two opposing edges 50 of a given panel 38 will be of a different configuration. That way, one edge 50 (one configuration) of one panel 38 will be able to "nest" with one edge 50 (another configuration) of the adjacent panel 38. Various configurations may be employed for the edges 50 of the panels 38, and which may provide different configurations/profiles for the corresponding standing seam 42.

Figure 4:
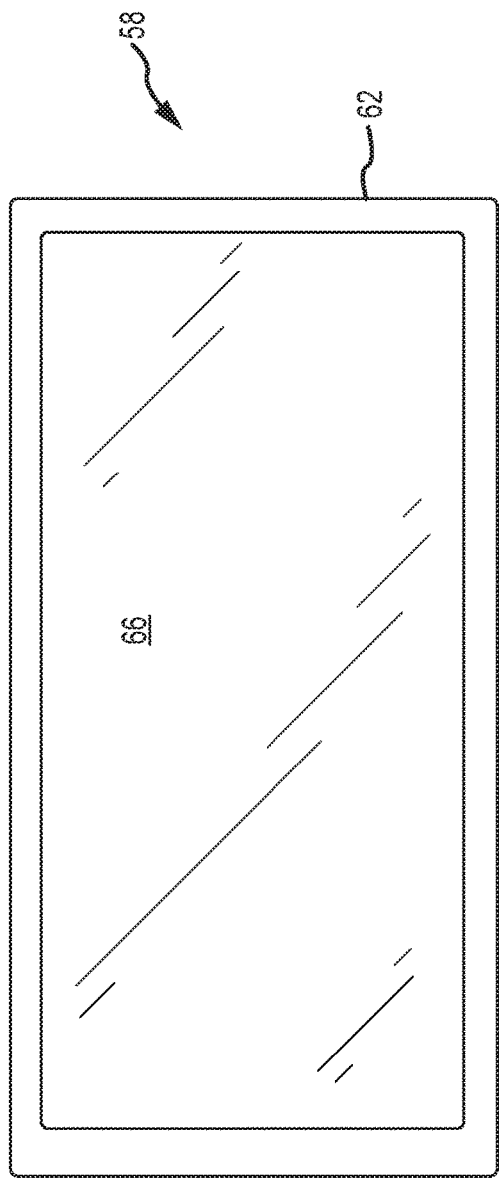
FIG. 4 is a top view of one of the solar cell modules illustrated in FIG. 2.

A more detailed view of one of the photovoltaic modules or solar cell modules 58 from FIG. 2 is presented in FIG. 4. Each solar cell module 58 includes a frame 62 that is disposed about the corresponding solar cell 66. The frame 62 may be of any appropriate size, shape, configuration, and/or type, and may be formed from any appropriate material or combination of materials. In the illustrated embodiment, the frame 62 is of a rectangular profile, and may be formed from an appropriate metal or metal alloy (e.g., aluminum). Similarly, the photovoltaic cell or solar cell 66 may be of any appropriate size, shape, configuration and/or type to convert light into electricity. Typically the solar cell 66 will be in the form of a substrate having a stack of a plurality of layers. Any number of solar cell modules 58 may be used for the solar cell array 54 of FIG. 2, and multiple solar cell modules 58 may be disposed in any appropriate arrangement.

Figure 5:
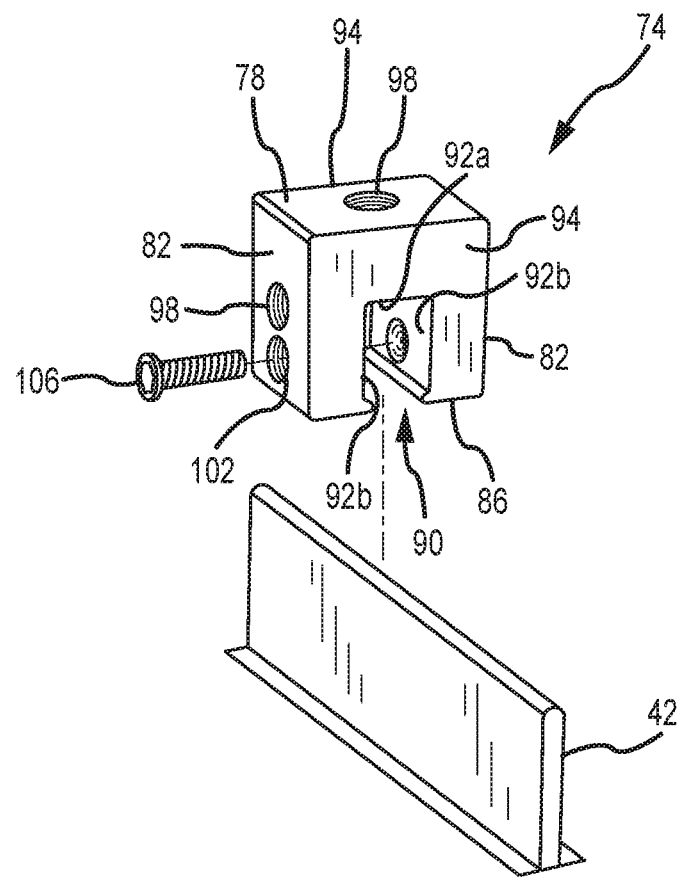
FIG. 5 is a perspective view of one of the mounting devices that is installed on a standing steam in FIG. 2.

The mounting assemblies 70a, 70b that are used to install the solar cell array 54 onto the building surface 34 in FIG. 2 utilize a mounting device 74 that may be of any appropriate size, shape, configuration, and/or type. One configuration of a mounting device that may be installed on a standing seam 42 is illustrated in FIG. 5 and is identified by reference numeral 74. This mounting device 74 includes an upper surface 78 and an oppositely disposed bottom surface 86, a pair of oppositely disposed side surfaces 82, and a pair of oppositely disposed ends 94. The upper surface 78 includes a threaded hole 98, as does at least one of the side surfaces 82, while the bottom surface 86 includes a slot 90 that extends between the two ends 94 of the mounting device 74.

The slot 90 on the bottom surface 86 of the mounting device 74 includes a base 92a and a pair of sidewalls 92b that are spaced apart to receive at least an end section of a standing seam 42. One or more seam fasteners 106 may be directed through a threaded hole 102 of the mounting device 74 and into the slot 90 to engage the standing seam 42 and secure the same against the opposing slot sidewall 92b. A cavity of any appropriate type may be on this opposing slot sidewall 92b to allow the aligned seam fastener 106 to deflect a corresponding portion of the standing seam 42 into this cavity, although such may not be required in all instances. In any case and in one embodiment, the seam fastener 106 only interfaces with an exterior surface of the standing seam 42. For instance, the end of the seam fastener 106 that interfaces with the standing seam 42 may be convex, rounded, or of a blunt-nosed configuration to provide a desirable interface with the standing seam 42.

Other mounting device configurations may be appropriate for mounting on standing seam 42 and that may be used in place of the mounting device 74 shown in FIG. 5. Various mounting device configurations are disclosed in U.S. Pat. Nos. 5,228,248; 5,483,772; 5,941,931; 5,694,721; 5,715,640; 5,983,588; 6,164,033; 6,718,718; 7,100,338; and 7,013,612, and which may be utilized by either of the mounting assemblies 70a, 70b.

Figure 6:
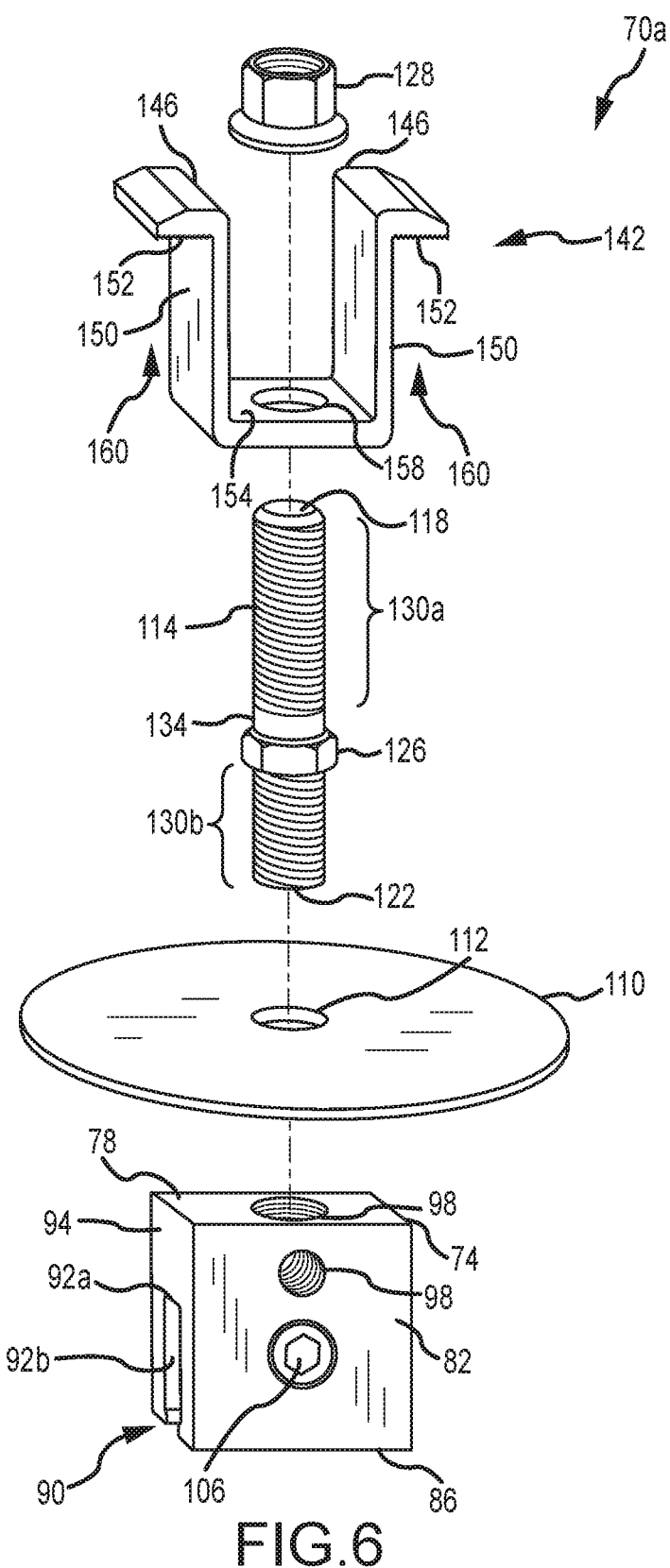
FIG. 6 is an exploded, perspective view of one of the adjustable mounting assemblies from FIG. 2.

The mounting assembly 70a that is used in the installation of a pair of adjacent solar cell modules 58 in FIG. 2, and that may use a mounting device 74, is illustrated in FIG. 6. The mounting assembly 70a includes a mounting device 74, along with a mounting plate 110, a clamping member 142, a stud 114, and a nut 128. The mounting plate 110 is disposed on the upper surface 78 of the mounting device 74, and includes a hole or aperture 112 that allows the stud 114 to pass therethrough. The mounting plate 110 may be utilized when it may be desirable to enhance the stability of the mounting assembly 70a, and in any case may be of any appropriate size, shape, configuration and/or type. The surface area of the mounting plate 110 is at least about 5 in$^2$ in one embodiment, and is at least about 7 in$^2$ in another embodiment. It may be possible to eliminate the mounting plate 110 from the mounting assembly 70a, for instance when the surface area of the upper surface 78 of the mounting device 74 is sufficiently large.

The stud 114 provides an interface between the clamping member 142 and the mounting device 74, and includes a first stud end 118 and an oppositely disposed second stud end 122. A nut 126 is disposed between the first stud end 118 and the second stud end 122, and is fixed to the stud 114 in any appropriate manner (e.g., welded). That is, the nut 126 does not move relative to the stud 114, such that the nut 126 and stud 114 will move together as a single unit. In one embodiment, the nut 126 is threaded onto the stud 114, and is then fixed in the desired location.

A first threaded section 130a extends from the first stud end 118 toward the second stud end 122, while a second threaded section 130b extends from the second stud end 122 toward the first stud end 118. An unthreaded section 134 is disposed between the fixed nut 126 and the first threaded section 130a in the illustrated embodiment. However, the first threaded section 130a could extend all the way to the fixed nut 126 (e.g., the entire stud 114 could be threaded). In one embodiment, the length of the first threaded section is at least about 1.5 inches.

The second stud end 122 may be directed through the hole 112 in the mounting plate 110 if being utilized, and in any case into a threaded hole 98 of the mounting device 74. It should be appreciated that the mounting device 74 could also be disposed in a horizontal orientation on a standing seam having a horizontally disposed end section versus the vertically disposed orientation of the end section of the standing seam 42, and that in this case the second stud end 122 would be directed into the threaded hole 98 on a side surface 82 of the mounting device 74 (e.g., the mounting plate 110 could then be disposed on such a side surface 82 if desired/required). In any case, the stud 114 may be tightened onto the mounting device 74 by having an appropriate tool engage the fixed nut 126 to rotate the stud 114 relative to the mounting device 74 and into a desired forcible engagement with the mounting plate 110 or with the corresponding surface of the mounting device 74 if the mounting plate 110 is not being used. In one embodiment, the fixed nut 126 is located along the length of the stud 114 such that the second stud end 122 does not extend into the slot 90 of the mounting device 74 when the stud 114 is tightened onto the mounting device 74. Having this stud end 122 extend into the slot 90 could potentially damage the standing seam 42.

The clamping member 142 includes a base 154 that is disposed on the fixed nut 26 of the stud 114. A hole 158 extends through the base 154 and is aligned with a threaded hole 98 of the mounting device 74. In the illustrated embodiment, the hole 156 in the clamping member 142 is not threaded such that the clamping member 142 may "slide" along the stud 114.

A pair of clamping legs 146 that are disposed in opposing relation extend upwardly from the base 154 in a direction that is at least generally away from the mounting device 74 when the mounting assembly 70a is installed, such that the base 154 and clamping legs 146 define an at least generally U-shaped structure. Each clamping leg 146 includes an extension 150 and an engagement section 152. The engagement sections 152 are disposed in a different orientation than the extensions 150, and function to provide a surface to engage and clamp a structure to the mounting assembly 70a. In the illustrated embodiment, the engagement sections 150 include teeth, serrations, or like to enhance the "grip" on the structure being clamped to the mounting assembly 70a. The clamping legs 146 may be of any appropriate size, shape, and/or configuration for clamping a structure to the mounting assembly 70a. Generally, a pocket 160 is defined between each engagement section 152 and the underlying mounting plate 110/mounting device 74 for receiving a structure to be clamped to the mounting assembly 70a.

Figure 7A:
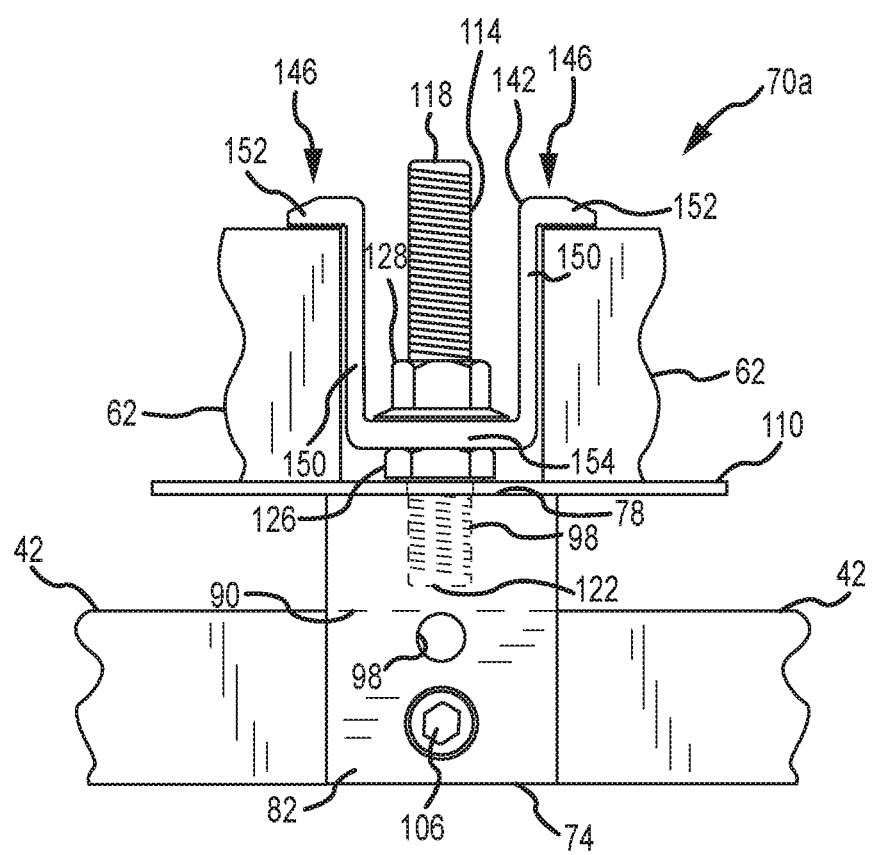
FIG. 7A is a side view of one of the adjustable mounting assemblies from FIG. 2, and which is engaging a pair of solar cell module frames.

FIG. 7A illustrates one of the mounting assemblies 70a from FIG. 2, and which again interfaces with a pair of solar cell modules 58. Installation of such a mounting assembly 70a could entail directing at least the upper portion of the standing seam 42 into the slot 90 of the mounting device 74. Thereafter, the mounting device 74 may be secured to the standing seam 42 using at least one seam fastener 106. Once again, the seam fastener 106 may be directed through the mounting device 74 and into the slot 90 to force a corresponding portion of the standing seam 42 against the opposing slot sidewall 92b.

The mounting plate 110 may be disposed on the upper surface 78 of the mounting device 74 such that its hole 112 is aligned with a threaded hole 98 on the mounting device 74 that will receive the stud 114. The second stud end 122 may then be directed through the hole 112 of the mounting plate 110 such that the stud 114 may be threaded to the mounting device 74 (e.g., using a wrench on the fixed nut 126 to clamp the mounting plate 110 between the fixed nut 126 and the mounting device 74). At this time, the lower surface of the fixed nut 126 engages the upper surface of the mounting plate 110 or a corresponding surface of the mounting device 74 if the mounting plate 110 is not used. As previously noted, and as illustrated in FIG. 7A, in one embodiment the second stud end 122 does not pass into the slot 90 of the mounting device 74. It should be appreciated that the mounting plate 110 and stud 114 could be installed on the mounting device 74 prior to its installation on the standing seam 42.

A frame 62 from one of the solar cell modules 58 may be positioned on one side of the mounting plate 110, while a frame 62 from another of the solar cell modules 58 may be positioned on the opposite side of the mounting plate 110. The clamping member 142 may or may not be positioned on the stud 114 at the time the solar cell module frames 62 are positioned on the mounting plate 110. In any case, the first stud end 118 may be directed through the hole 158 on the base 154 of the clamping member 142. At this time a portion of one solar cell module frame 62 will then be positioned between the mounting plate 110 and the engagement section 152 of one of the clamping legs 146, while a portion of another solar cell module frame 62 will then be positioned between the mounting plate 110 and the engagement section 152 of the other clamping leg 146. The nut 128 may then be threaded onto the first stud end 118 of the stud 114 until the engagement sections 152 of the clamping member 142 exert a desired force on the two solar cell module frames 62 (e.g., to clamp these frames 62 between the engagement sections 152 of the clamping member 142 and the mounting plate 110, or between the engagement sections 152 of the clamping member 142 and the mounting device 74 if the mounting plate 110 is not being used). That is, turning the nut 128 may move the clamping member 142 along the stud 114 and toward the mounting device 74 (e.g., by the clamping member 142 "sliding" along the stud 114) to generate the desired clamping action. It should be appreciated that the clamping member 142 and possibly the nut 128 could be positioned on the stud 114 at the time when the solar cell module frames 62 are disposed on the mounting plate 110, although this may require that the clamping member 142 be lifted to a degree at this time to accommodate positioning the frames 62 under the engagement sections 152 of the clamping member 142.

Figure 7B:
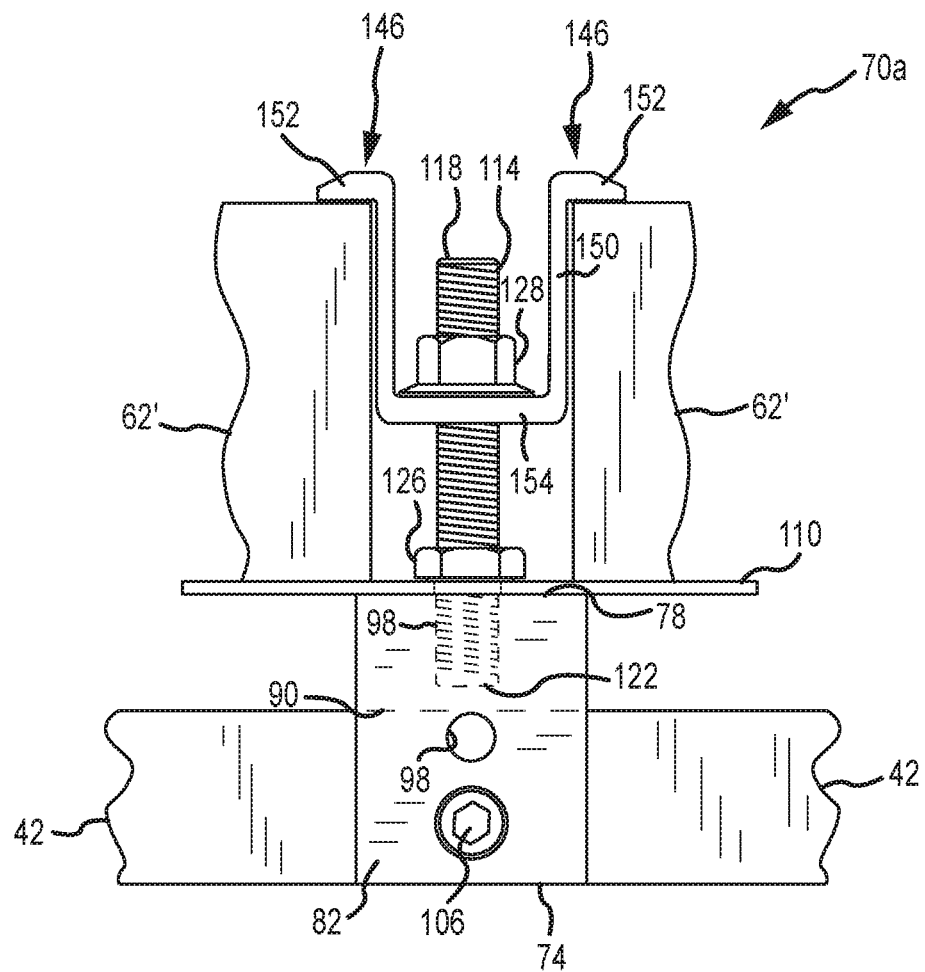
FIG. 7B shows the mounting assembly of FIG. 7A being used for solar cell module frames having a different thickness than those illustrated in FIG. 7A.

As evident by a review of FIG. 7A, the stud 114 may extend beyond the nut 128 in the installed configuration. Preferably the first threaded section 130a of the stud 114 is of a length that allows the mounting assembly 70a to be used to clamp structures of various thicknesses to the mounting assembly 70a. For instance, FIG. 7B illustrates a pair of solar cell module frames 62' being clamped to the mounting assembly 70a, where these frames 62' are thicker than the frames 62 presented in FIG. 7A. In one embodiment, the length of the first threaded section 130a is at least about 1.5 inches, and which accommodates using the mounting assembly 70a to clamp solar cell modules of a number of different thicknesses (e.g., the fixed nut 126 may be spaced from the first stud end 118 by a distance of at least about 1.5 inches, the first threaded section 130a may extend all the way to the fixed nut 126, or both).

Figure 7C:
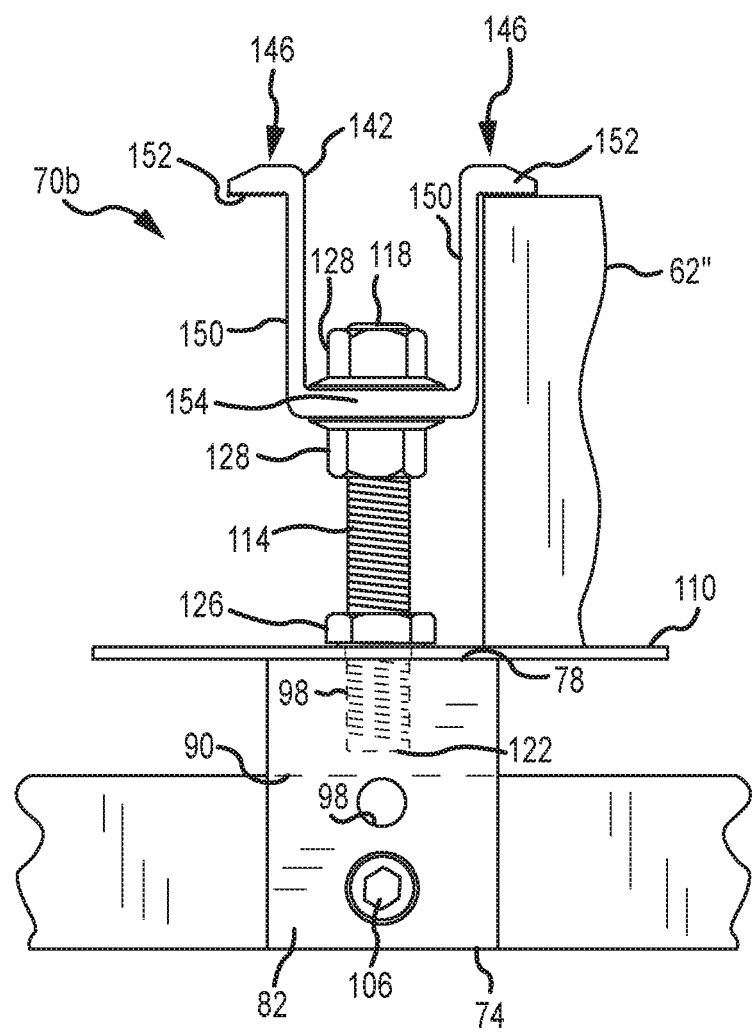
FIG. 7C is a side view of one of the adjustable mounting assemblies from FIG. 2 that is disposed adjacent to an edge of the building surface, and which is engaging a single solar cell module frame.

The above-described mounting assemblies 70a may be used to simultaneously engage the frame 62 of a pair of solar cell modules 58. In at least some cases, there may only be a need to engage a single solar cell 58, such as in the case of those solar cells 58 that are disposed closest to an edge 36 of the building surface 34 (FIG. 2). FIG. 7C illustrates a configuration for this situation, and which is identified by reference numeral 70b. Corresponding parts of the mounting assemblies 70a and 70b are identified by the same reference numeral. The only difference between the mounting assembly 70b and the mounting assembly 70a is that an additional nut 128 is used by the mounting assembly 70b. Therefore, the remainder of the discussion presented above also applies to the mounting assembly 70b.

Generally, one nut 128 is threaded onto the first stud end 118, followed by positioning a clamping member 142 over the first stud end 118 and onto the stud 114, then followed by a second nut 128 that is threaded onto the first stud end 118. The lower nut 128 may be threaded down a sufficient distance on the stud 114. Thereafter, the top nut 128 may be threaded to clamp a solar cell module frame 62" between the mounting plate 110 and the engagement section 152 of one of the clamping members 142. The lower nut 128 may then be threaded upwardly on the stud 118 to engage the underside of the base 154 of the clamping member 142.

Another embodiment of a mounting assembly, which may be used for mounting photovoltaic or solar cell modules to a building surface having a plurality of standing seams defined by a plurality of interconnected panels, is illustrated in FIGS. 8A-F and is identified by reference numeral 70c. Corresponding components between the mounting assembly 70c and the above-discussed mounting assembly 70a are identified by the same reference numerals. Those corresponding components between these two embodiments that differ in at least some respect are identified by the same reference numeral, but with a "single prime" designation in relation to the mounting assembly 70c.

The mounting assembly 70c of FIGS. 8A-F utilizes the above-discussed mounting device 74, clamping member 142, and stud 114. All of the features discussed above in relation to each of these components remain equally applicable to the mounting assembly 70c. The mounting assembly 70c does utilize a mounting plate 110' that is positioned on an upper surface 78 of the mounting device 74, and that is located between the clamping member 142 and the mounting device 74 in a dimension corresponding with the length dimension of the stud 114. However, the mounting place 110' is of a different configuration than the mounting plate 110 utilized by the mounting assembly 70a, and therefore the noted "single prime" designation is utilized.

The mounting plate 110' includes an upper surface 170 and an oppositely disposed lower surface 176. The upper surface 170 includes a plurality of grounding projections 172. The grounding projections 172 may be integrally formed with a remainder of the mounting plate 110' (e.g., the mounting plate 110' and grounding projections 172 may be of one-piece construction, such that the individual grounding projections 172 do not need to be separately attached to the mounting plate 110'). Any appropriate number of grounding projections 172 may be utilized. Each grounding projection 172 may be of any appropriate size, shape, and/or configuration. The various grounding projections 172 may be equally spaced from the stud 114, may be equally spaced about the stud 114, or both.

In one embodiment, the number of grounding projections 172 is selected and the grounding projections 172 are arranged such that at least one grounding projection 172 will engage each photovoltaic module being mounted to a building surface by the clamp assembly 70c, regardless of the angular position of the mounting plate 110' relative to the stud 114. "Angular position" does not mean that the mounting plate 110' is disposed at an angle relative to the upper surface 78 of the mounting device 74. Instead, "angular position" means a position of the mounting plate 110' that may be realized by rotating the mounting plate 110' relative to the stud 114 and/or the mounting device 74. Consider the case where the ends 94 of the mounting device 74 define the 12 o'clock and 6 o'clock positions. The mounting plate 110' may be positioned on the mounting device 74 with each of its grounding projections 172 being disposed at any angle relative to the 12 o'clock position (e.g., in the 1 o'clock position, in the 2 o'clock position, in the 8 o'clock position, etc), and yet at least one grounding projection 172 will engage each photovoltaic module being mounted to a building surface by the clamp assembly 70c. The "angle" of each such grounding projection 172 is the angle between first and second reference lines that are disposed within a common plane, the first reference line remaining in a fixed position relative to the mounting plate 110' and extending from the stud 114, for instance, to the noted 12 o'clock position. The second reference line may also extend from the stud 114 to a particular grounding projection 172, and thereby may rotate along with the mounting plate 110' as its angular position is adjusted relative to the stud 114 and/or mounting device 74.

The grounding projections 172 may facilitate establishing an electrical connection with and/or assisting in grounding one or more photovoltaic modules. The grounding projections 172 may be characterized as providing electrical continuity between adjacent photovoltaic modules that are positioned on the same mounting plate 110' (e.g., an electrical path may encompass the frame of one photovoltaic module, one or more grounding projections 172 engaged therewith, the mounting plate 110', one or more additional grounding projections 172, and the frame of another photovoltaic module engaged by such an additional grounding projection(s) 172). This may be referred to in the art as "bonding." In any case, the grounding projections 172 may be used in providing a grounding function for a corresponding photovoltaic module(s). The noted electrical connection provided by the grounding projections 172 may be used to electrically connect adjacent photovoltaic modules (e.g., those positioned on a common mounting plate 110'), and which may be used to provide an electrical path to ground a string or collection of photovoltaic modules.

The mounting device 110' also includes a raised structure 174 on its upper surface 170. The raised structure 174 may be disposed about the un-threaded hole 112 in the mounting plate 110' and through which the stud 114 passes. Generally and as will be discussed in more detail below, the raised structure 174 may be used to determine where a photovoltaic module should be positioned on the upper surface 170 of the mounting plate 110' to ensure that the clamping member 142 will adequately engage not only this photovoltaic module, but an adjacently disposed photovoltaic module as well. As such, the raised structure 174 may be characterized as a positional registrant or alignment feature for each an adjacent pair of photovoltaic modules being clamped by a common mounting assembly 70c.

The raised structure 174 may be integrally formed with a remainder of the mounting plate 110' (e.g., the mounting plate 110' and raised structure 174 may be of one-piece construction, such that the raised structure 174 does not need to be separately attached to the mounting plate 110'). The raised structure 174 may be characterized as being doughnut-shaped. The raised structure 174 may extend completely about the stud 114, the stud 114 may extend through a center of the raised structure 174, or both. The raised structure 174 may be circular in a plan view. This alleviates the requirement to have the mounting plate 110' be in a certain angular position on the upper surface 78 of the mounting device 74 to provide its positional registration or alignment function in relation to the photovoltaic modules to be clamped. An outer perimeter of the raised structure 174 and an outer perimeter of the mounting plate 110' may be concentrically disposed relative to the stud 114. The raised structure 174 may be centrally disposed relative to an outer perimeter of the mounting plate 110'.

The lower surface 176 of the mounting plate 110' includes a plurality of wiring tabs or clips 178. The wiring clips 178 may be integrally formed with a remainder of the mounting plate 110' (e.g., the mounting plate 110' and wiring clips 178 may be of one-piece construction, such that the individual wiring clips 178 do not need to be separately attached to the mounting plate 110'). For instance, the wiring clips 178 could be "stamped" from the body of the mounting plate 110'. In this regard, the mounting plate 110' includes an aperture 184 for each such wiring clip 178. Any appropriate number of wiring clips 178 may be utilized. The various wiring clips 178 may be equally spaced from the stud 114, may be equally spaced about the stud 114, or both.

In one embodiment, the number of wiring clips 178 is selected and the wiring clips 178 are arranged such that at least one wiring clip 178 should be available for holding/retaining one or more wires from/for each photovoltaic module being mounted to a building surface by the clamp assembly 70c, regardless of the angular position of the mounting plate 110' relative to the stud 114 and/or mounting device 74.

Each wiring clip 178 may be of any appropriate size, shape, and/or configuration. In the illustrated embodiment, each wiring clip 178 includes a first segment 180a that extends away from the lower surface 176 of the mounting plate 110', along with a second segment 180b that extends from a distal end of the first segment 180a. The second segment 180b may be disposed at least generally parallel with the lower surface 176 of the mounting plate 110'. In any case, the second segment 180b may include a recessed region 182 (e.g., a concave area) to facilitate retention of one or more wires and/or quick-connect leads.

A wiring clip 178 may be used the support and/or retain the quick-connect lead(s) associated with one of the photovoltaic modules being clamped by the corresponding mounting assembly 70c (e.g., by being positioned within the space between the second segment 180b of a given wiring clip 178 and the lower surface 176 of the mounting plate 110', for instance by resting in a concave portion of the second segment 180b in the form of the noted recessed region 182). Other wires could be directed into the space between the second segment 180b of a given wiring clip 178 and the lower surface 176 of the mounting plate 110'.

Another function is indirectly provided by the wiring clips 178. The aperture 184 associated with each wiring clip 178 provides a space through which an installer may direct cable or zip tie or the like to bundle together various wires that may be located at a lower elevation than the mounting plate 110' (e.g., wires underneath the mounting assembly 70c; wires underneath a photovoltaic module being clamped by the mounting assembly 70c; wires in a space between a pair of photovoltaic modules being clamped by the mounting assembly 70c).

Figure 8A:
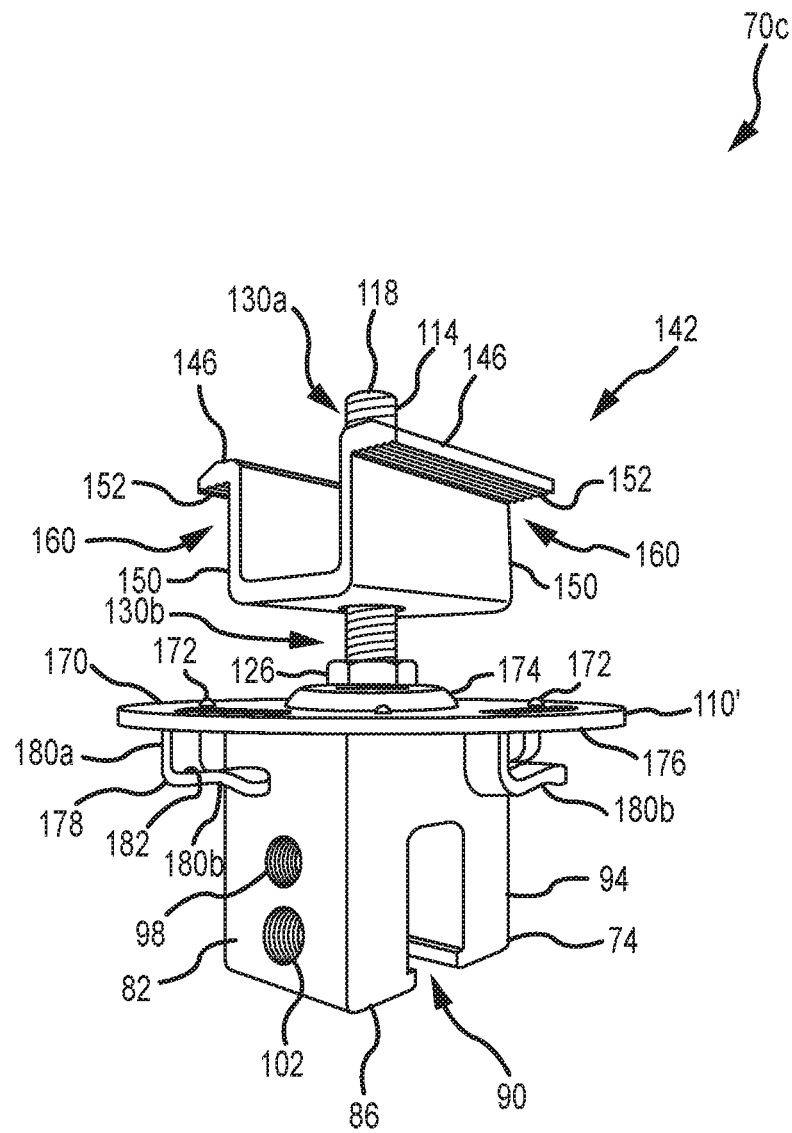
FIG. 8A is one side-based perspective view of another embodiment of a mounting assembly for photovoltaic modules.
Figure 8B:
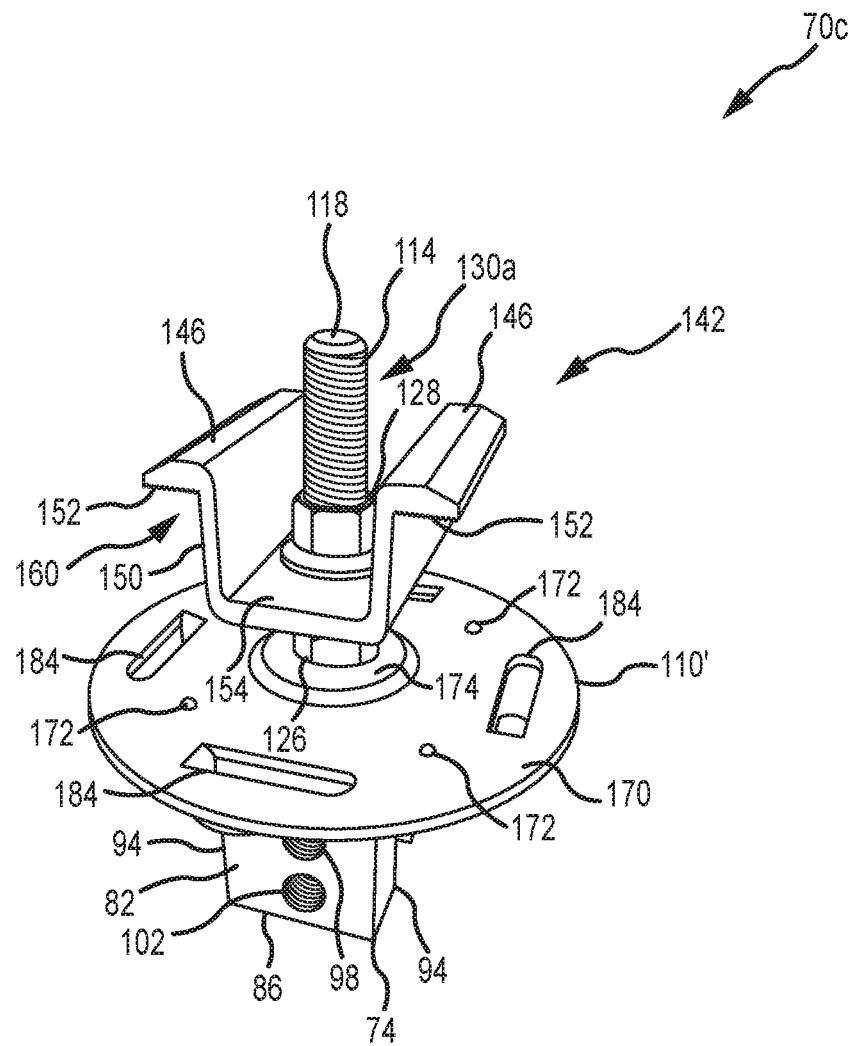
FIG. 8B is one top-based perspective view of the mounting assembly of FIG. 8A.
Figure 8C:
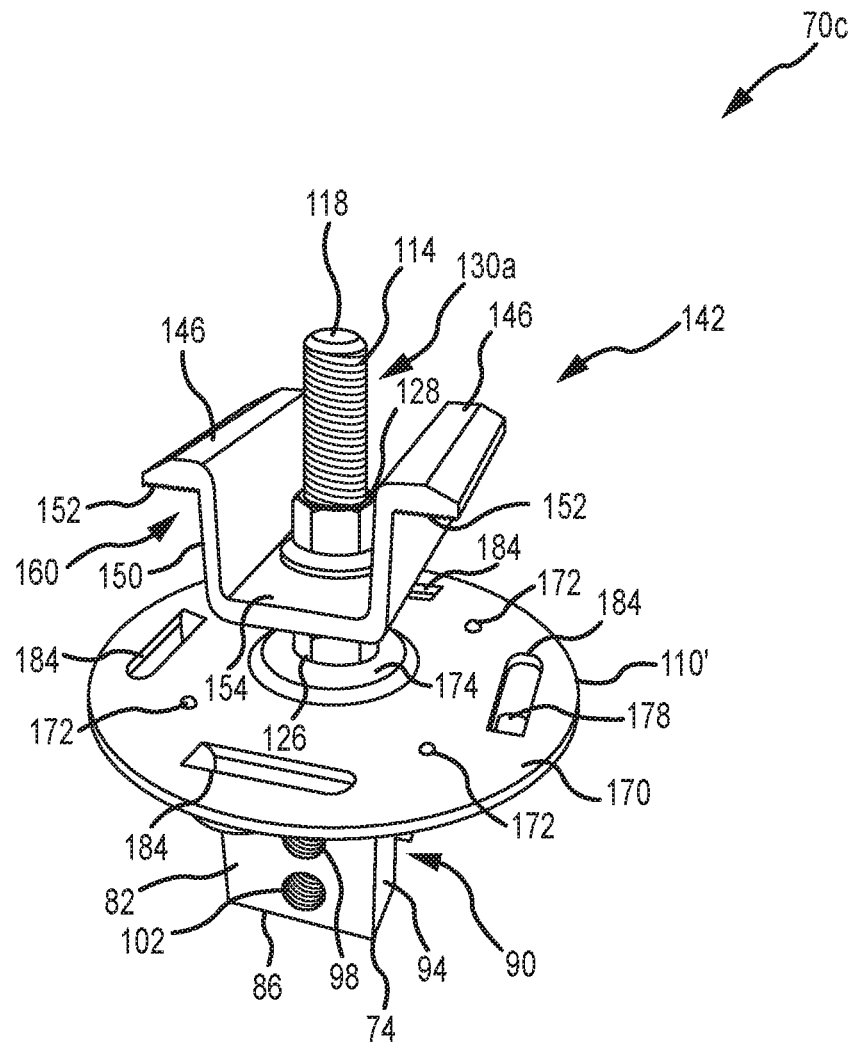
FIG. 8C is another one top-based perspective view of the mounting assembly of FIG. 8A.
Figure 8D:
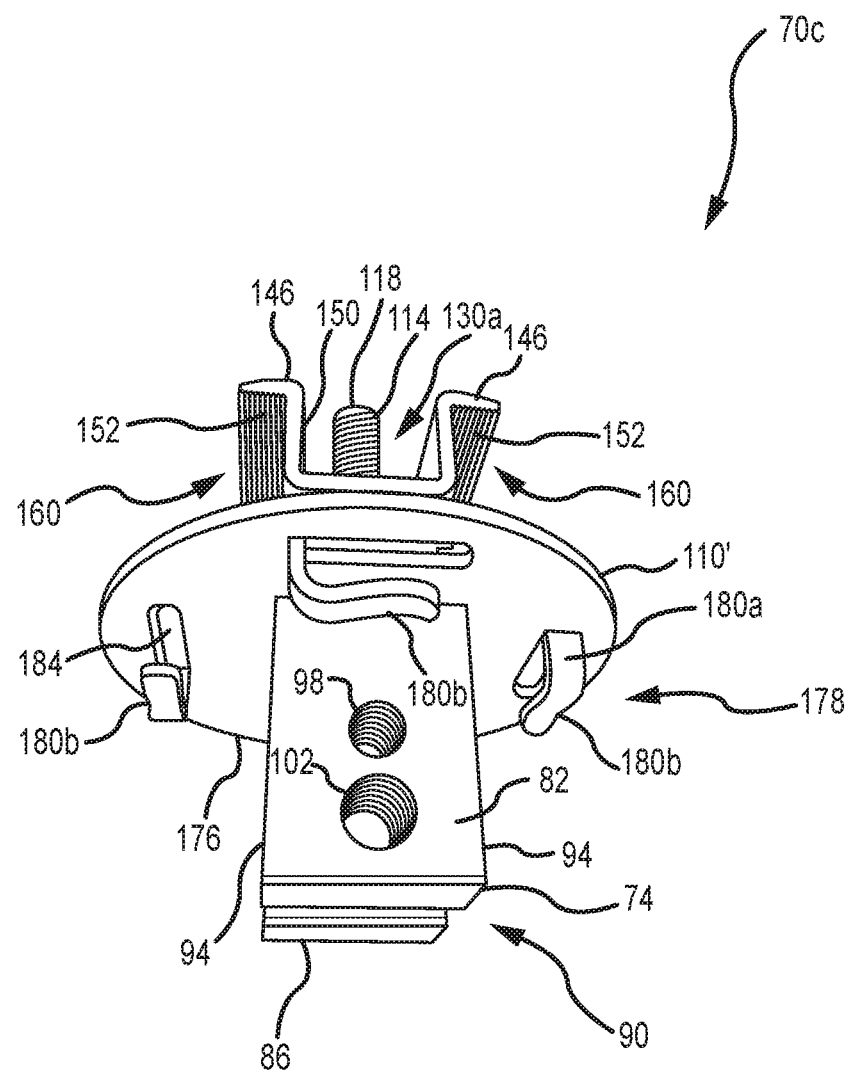
FIG. 8D is a bottom-based perspective view of the mounting assembly of FIG. 8A.
Figure 8E:
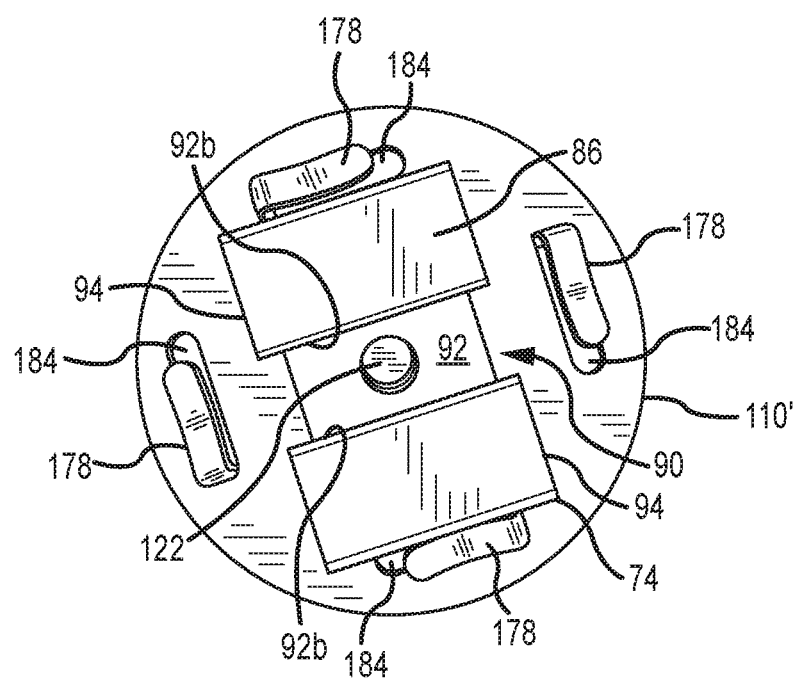
FIG. 8E is a plan view of a bottom of the mounting assembly of FIG. 8A.
Figure 8F:
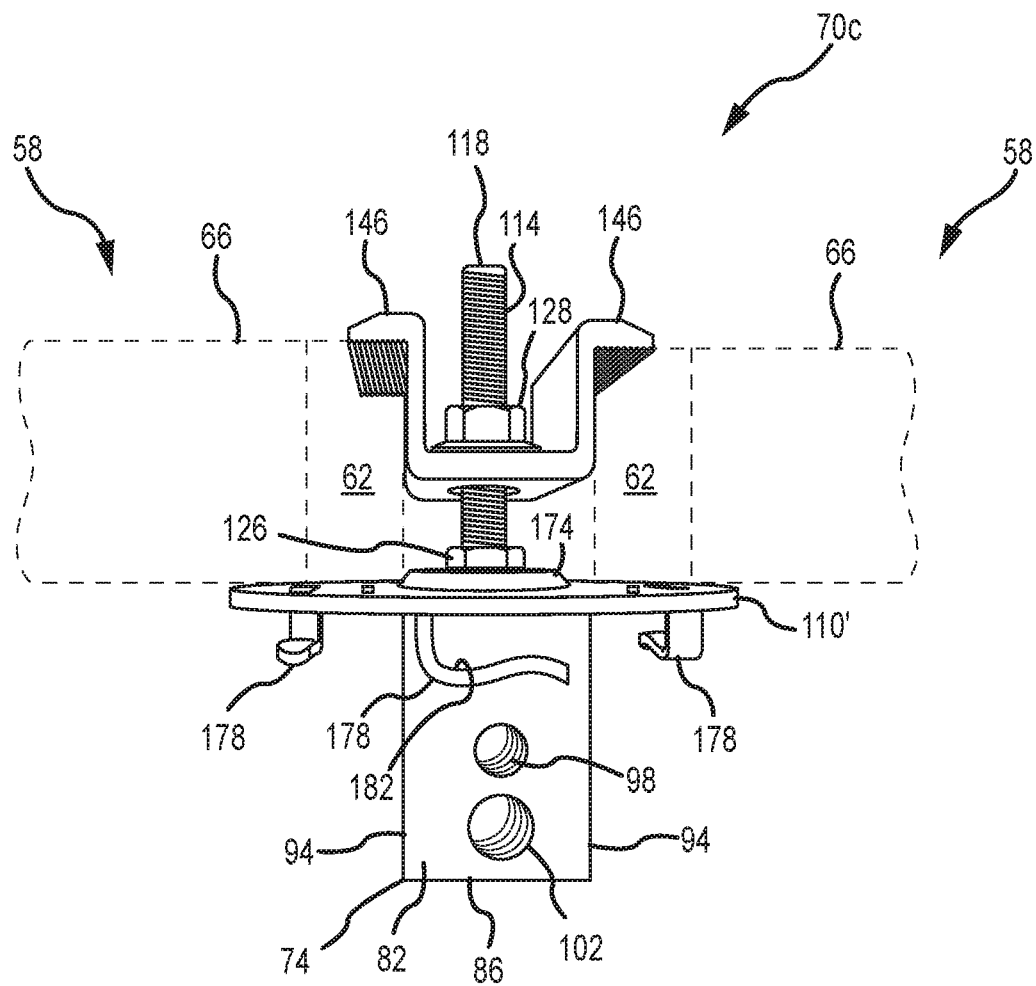
FIG. 8F is another side-based perspective view of the mounting assembly of FIG. 8A, and schematically illustrating the engagement of a pair of photovoltaic modules.

FIG. 8F schematically illustrates the positional registration/alignment function provided by the raised structure 174 of the mounting plate 110'. Here the frame 62 of one photovoltaic module 58 being clamped by the mounting assembly 70c abuts one portion on a perimeter of the raised structure 174, while the frame 62 of another photovoltaic module 58 being clamped by the mounting assembly 70c is disposed adjacent to (or possibly abutting with) an oppositely disposed portion on the perimeter of the raised structure 174. In one embodiment, the width or outer diameter of the raised structure 174 is the same as or slightly larger than the spacing between the two extensions 150 of the clamping member 142. In any case, the raised structure 174 should be sized such that when an adjacent pair of photovoltaic modules 58 are positioned to abut oppositely disposed portions on the perimeter of the raised structure 174, the clamping member 142 should be positionable on the stud 114 and should properly engage these photovoltaic modules.

At least one grounding projection 172 of the mounting plate 110' shown in FIG. 8F should be engaged with the frame 62 of one photovoltaic module 58 shown in FIG. 8F, and at least one other grounding projection 172 of this same mounting plate 110' should be engaged with the frame 62 of the other photovoltaic module 58 shown in FIG. 8F. This again provides electrical continuity between the two modules 58 shown in FIG. 8F—an electrical path exists from one module 58 to the other module 58 via the mounting plate 110' and each grounding projection 172 that is engaged with either of the modules 58.

Figure 9A:
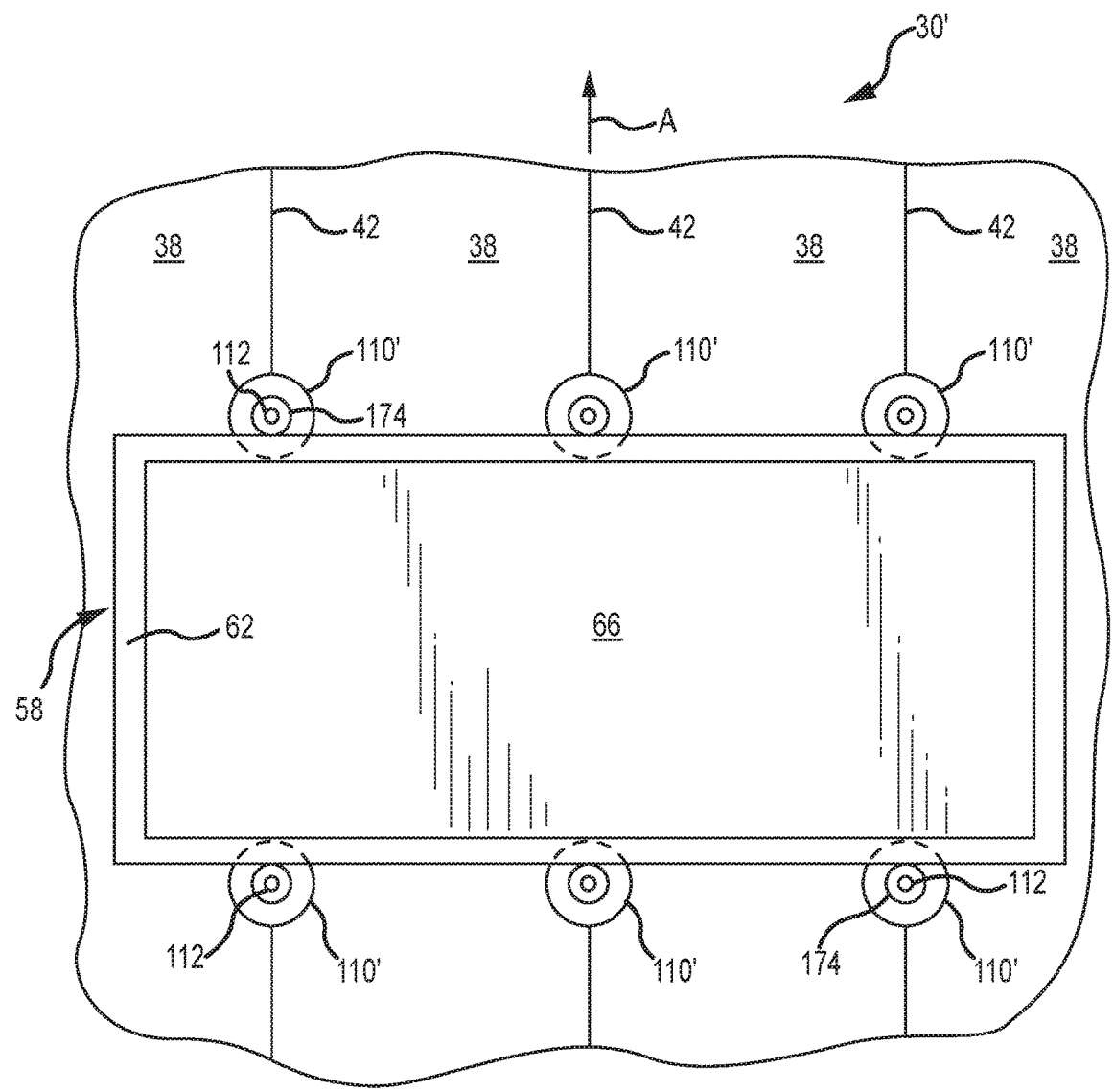
FIG. 9A is a plan view of one embodiment of a photovoltaic system using a plurality of the mounting assemblies of FIGS. 8A-F, and with the clamping members being removed to illustrate a positional registration function incorporated by the mounting plate of such mounting assemblies.

FIG. 9A illustrates the positional registration or alignment function provided by the mounting plate 110' incorporating a raised structure 174 (which thereby may be referred to as a PV module positional registrant). In FIG. 9A, the mounting devices 74 are attached to the standing seams 42 such that the frame 62 of the photovoltaic module 58 engages a portion on the outer perimeter of the raised structure 174. The clamping member 142 for each such mounting device 74 should not only be in proper position to adequately engage the frame 62 of the photovoltaic module 58 shown in FIG. 9A, but the clamping member 142 for each such mounting device 74 should also be in proper position to adequately engage the frame 62 of another photovoltaic module 58 that would be positioned in the uphill direction A (e.g., the arrow A indicating the direction of increasing elevation) from the illustrated photovoltaic module 58. The frame 62 of this "uphill" photovoltaic module 58 would likely engage an opposing portion of the raised structure 174 (or be disposed in closely spaced relation thereto). Any "downward drifting" of this uphill photovoltaic module 58 should be stopped by engaging the raised structure 174 of the "downhill" mounting assemblies 70c.

Figure 9B:
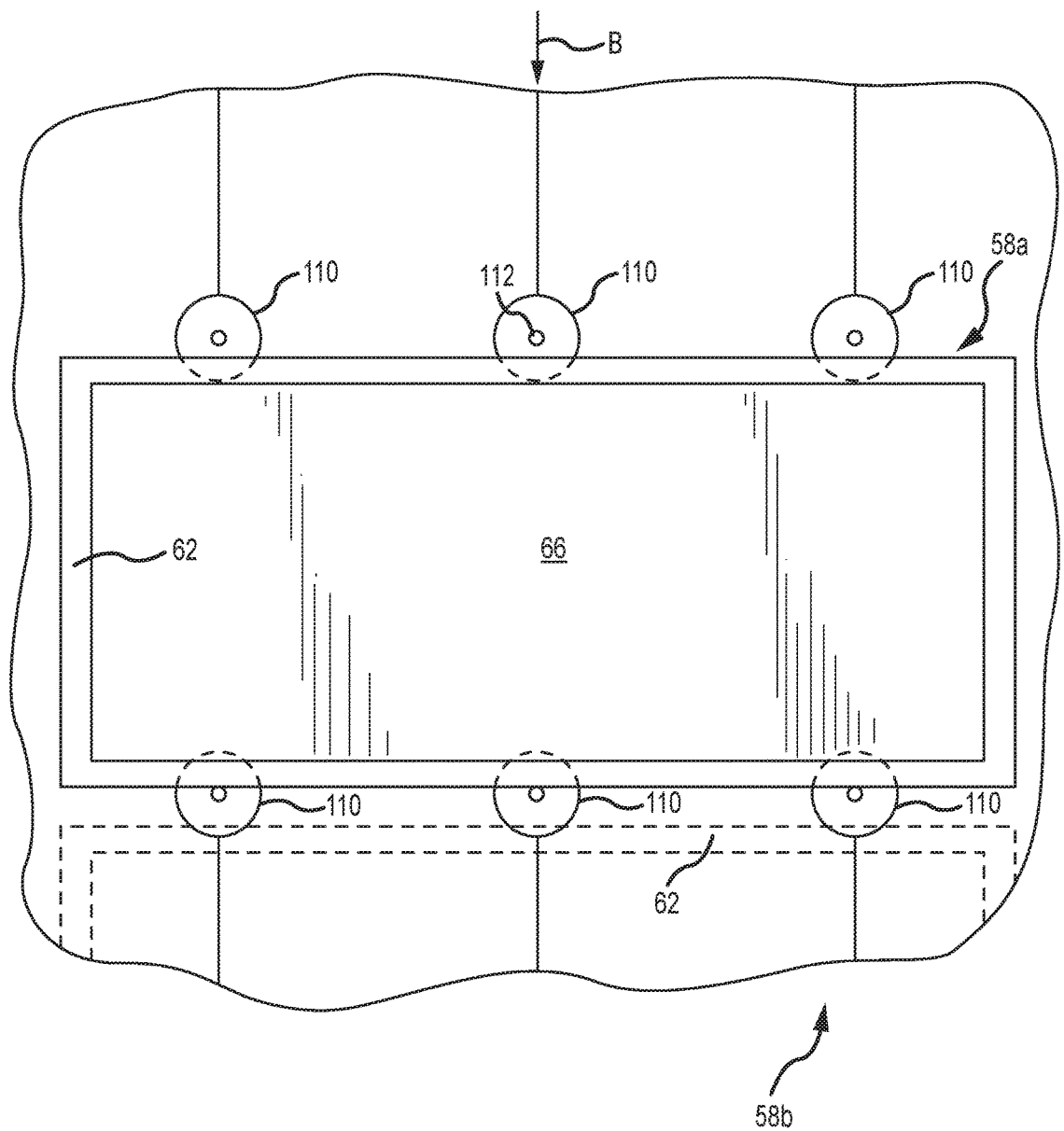
FIG. 9B is a plan view of a photovoltaic system using a plurality of the mounting assemblies of FIG. 6, and with the clamping members being removed therefrom to illustrate how a misaligned mounting assembly can affect the ability of the same to clamp onto one or more photovoltaic modules.

Now compare FIG. 9A to FIG. 9B. In FIG. 9B, the mounting assembly 70a has been used, and whose mounting plate 110 does not incorporate the raised structure 174 from the mounting plate 110' of FIGS. 8A-F. Here it can be seen that the uphill photovoltaic module 58a (the arrow B in FIG. 9B indicating the downhill direction, or direction of decreasing elevation) has been positioned relative to the three lower mounting devices 74 such that its frame 62 is quite close to the hole 112 of the three lower mounting plates 110 (through which the stud 114 is directed to threadably engage the mounting device 74). The three clamping members 142 associated with these three "downhill" mounting plates 110 now may not sufficiently engage the downhill photovoltaic module 58*b*.

Figure 10A:
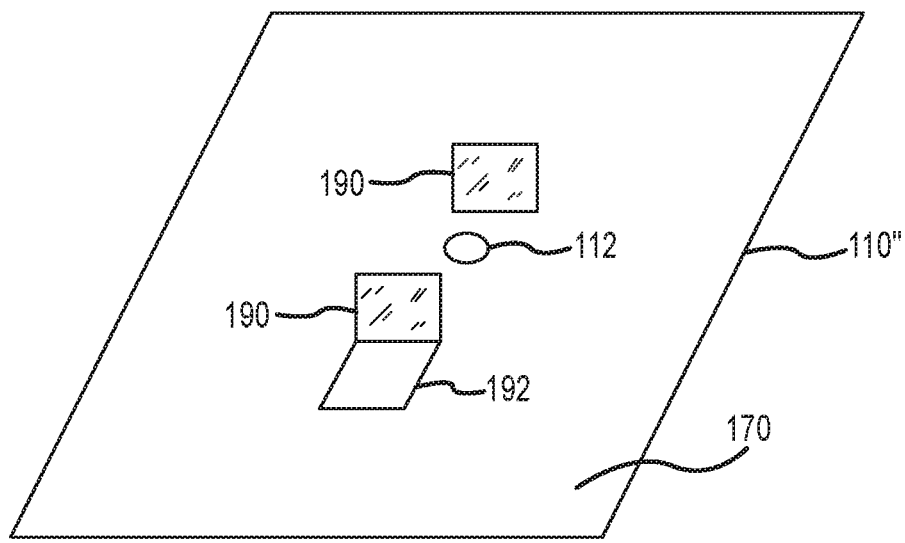
FIG. 10A is a perspective view of another embodiment of a mounting plate that incorporates a discrete pair of PV module positional registrants.
Figure 10B:
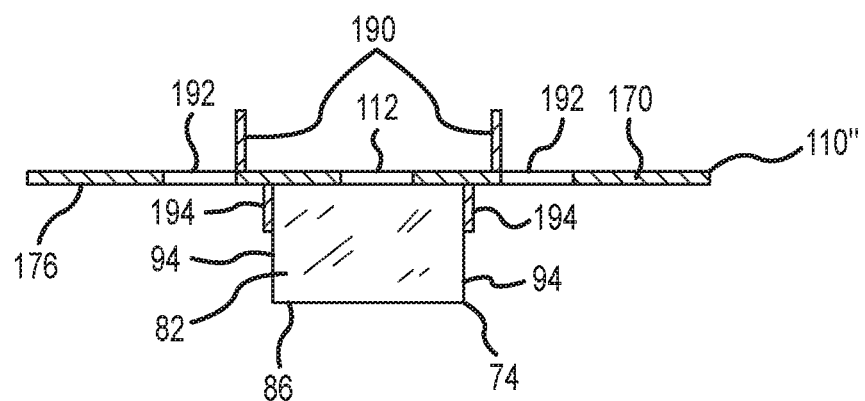
FIG. 10B is a side view of the mounting plate of FIG. 10 disposed on a mounting device, where the mounting plate includes a pair of mounting device positional registrants.

The mounting plate 110' from the mounting assembly 70*c* of FIGS. 8A-F uses a single raised structure 174 to provide a positional registration or alignment function for each of the two photovoltaic modules that may be clamped by a single mounting assembly 70*c*. Other types of positional registration or alignment features may be incorporated by a mounting plate. One representative embodiment is illustrated in FIGS. 10A-B in the form of a mounting plate 110". Generally, the mounting plate 110" may be used in place of the mounting plate 110' discussed above. Although not shown, it should be appreciated that the mounting plate 110" may also utilize the grounding projections 172 and/or wiring clips 178 (and their associated apertures 184).

The mounting plate 110" of FIGS. 10A and 10B differs from the mounting plate 110' of FIGS. 8A-F in a number of respects. One is the shape of the mounting plate 110'. Each of these mounting plates 110', 110" may be of any appropriate shape in relation to their respective outer perimeters (e.g., circular as in the case of the mounting plate 110; square as in the case of the mounting plate 110"; rectangular). Another is that the mounting plate 110" utilizes at least two discrete PV module positional registrants 190. Each of the PV module positional registrants 190 may be of any appropriate size, shape, and/or configuration. The PV module positional registrants 190 may be integrally formed with a remainder of the mounting plate 110" as shown where they have been stamped from the mounting plate 110" (creating corresponding apertures 192), or the PV module registrants 190 could be separately attached to the mounting plate 110". When the mounting plate 110" is positioned in the proper orientation on a mounting device 74, one of the PV module positional registrants 190 may be used to position one photovoltaic module on the mounting plate 110" (e.g., by this first photovoltaic module butting up against this first PV module positional registrant 190) such that it should be adequately engaged by the clamping member 142, and furthermore such that the other or second photovoltaic module to be positioned on the mounting plate 110" should also be adequately engaged by this same clamping member 142. In this regard, this second photovoltaic module may be positioned such that it butts up against the other or second of the PV module positional registrants 190 of the mounting plate 110".

As there are only two PV module positional registrants 190 in the illustrated embodiment of FIGS. 10A and 10B, the mounting plate 110" may need to be in a certain angular position or orientation on the mounting device 74 such that they provide a positional registration or alignment function for the two photovoltaic modules to be clamped by the associated mounting assembly. An installer could be required to place the mounting plate 110" onto the mounting device 74 in the correct angular position or orientation. Another option is for the mounting plate 110" to include one or more mounting device positional registrants 194 that facilitate the positioning of the mounting plate 110" onto the upper surface 78 of the mounting device 74 such that the PV module positional registrants 190 should be positioned to provide a positional registration or alignment function for the two photovoltaic modules to be clamped by the associated mounting assembly. In the illustrated embodiment, the mounting plate 110" includes a pair of mounting device positional registrants 194—a separate mounting device positional registrant 194 for each of the two opposite ends 94 of the mounting device 74 (e.g., one mounting device positional registrant 194 may engage one end 94 of the mounting device 74, and another mounting device positional registrant 194 may engage the opposite end 94 of the mounting device 74). A pair of mounting device positional registrants could be utilized by the mounting plate 110" and that engage the two opposite side surfaces 82 of the mounting device 74 to place the mounting plate 110" in the correct angular position relative to the mounting device 74. Yet another option would be to have at least one mounting device positional registrant for the mounting plate 110" that engages an end 94 of the mounting device 74 and at least one mounting device positional registrant for the mounting plate 110" that engages one of the side surfaces 82 of the mounting device 74. Any appropriate way of positionally registering the mounting plate 110" relative to the mounting device 74 may be utilized.

Figure 11:
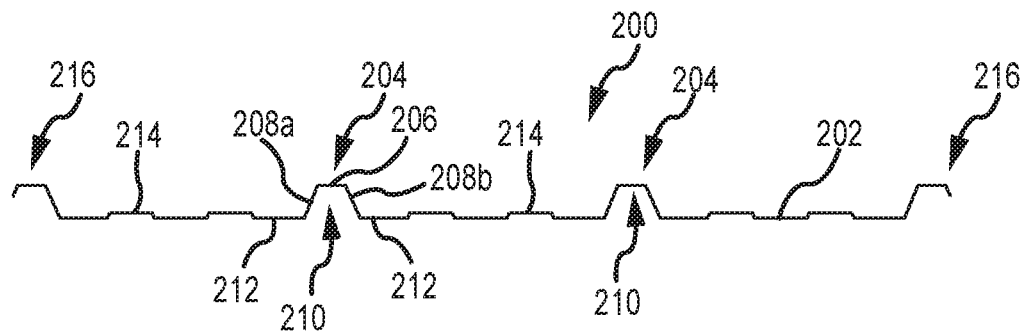
FIG. 11 is an end view of a representative trapezoidal rib panel.

Standing seam panels 38 were addressed above. Other types of panels are commercially available. Another example of a panel configuration is commonly referred to as a trapezoidal rib panel (e.g., formed from an appropriate metal alloy). A representative trapezoidal rib panel is illustrated in FIG. 11 and is identified by reference numeral 202. A plurality of these panels 202 may be assembled to define a building surface or a trapezoidal rib panel surface 200 (e.g., a roof or roofing surface). A given trapezoidal rib panel 202 may include one or more trapezoidal ribs 204 with a base section 212 positioned on each side thereof, and furthermore may include one or more minor ribs 214. A given trapezoidal rib panel 202 may in fact not use any minor ribs 214. In any case, an edge portion 216 of one trapezoidal rib panel 202 may be nested with an edge portion 216 of an adjacent trapezoidal rib panel 202 to collectively define a trapezoidal rib 204 as well.

Each trapezoidal rib 204 may include an upper rib wall 206 in the form of a flat or planar surface. Each trapezoidal rib 204 may also include a pair of sides 208*a*, 208*b*. The sides 208*a*, 208*b* are spaced from each other and are disposed in non-parallel relation. Typically the sides 208*a*, 208*b* of a trapezoidal rib 204 will be the mirror image of each other in relation to their respective orientations. In any case, the upper rib wall 206 and the two sides 208*a*, 208*b* collectively define a hollow interior or open space 210 for the trapezoidal rib 204.

One embodiment of a mounting device that is adapted for use with trapezoidal rib panels is illustrated in FIGS. 12A-D, and may be used to install various types of attachments on such trapezoidal rib panels. The mounting device shown in FIGS. 12A-D is in the form of a mounting bracket 220 that is of one-piece construction (e.g., no joint of any kind between any adjacent portions of the mounting bracket 220; the mounting bracket 220 is not an assembly of two or more separately-formed and separately-joined portions). In one embodiment, the mounting bracket 220 is in the form of extrusion to provide such a one-piece construction. The mounting bracket 220 may be formed from any appropriate material or combination of materials (e.g., an aluminum alloy; other metal alloys).

The mounting bracket 220 includes an upper wall or mounting surface 224 and a pair of side legs 228*a*, 228*b* that extend downwardly from the upper wall 224 when the mounting bracket 220 is installed on a trapezoidal rib 204. The upper wall 224 is the uppermost portion of the mounting bracket 220 when positioned on a trapezoidal rib 204, extends between a pair of open ends 222 of the mounting bracket 220, and is in the form of a single flat surface (rectangular in the illustrated embodiment). In one embodiment, the upper wall 224 provides a flat surface area, that is defined by a perimeter which in turn defines an area of at least 2.5 inches$^2$, to provide an appropriate surface for supporting attachments of any appropriate type (discussed below). In this regard, the upper wall 224 includes a mounting hole 226 that extends completely through this upper wall 224. Although a single mounting hole 226 is shown, multiple mounting holes could be incorporated by the upper wall 224 if required by a particular application or if otherwise desired.

A single mounting hole 226 is shown in the illustrated embodiment (e.g., located equidistantly from the two ends 222, although such may not be required in all instances). Multiple mounting holes could be incorporated by the upper wall 224 if required by a particular application or if otherwise desired. Each given mounting hole 226 may be threaded or unthreaded. In the case of a threaded mounting hole 226, a threaded attachment fastener (e.g., a threaded stud or bolt) could have its threads engaged with the threads of a particular mounting hole 226 to secure at least one attachment relative to the mounting bracket 220. An attachment fastener could also extend through a particular mounting hole 226 without having any type of threaded engagement with the mounting bracket 220, and a nut could be threaded onto an end of this attachment fastener (this end being disposed within an open space 250a of the mounting bracket 220, discussed below) to secure at least one attachment relative to the mounting bracket 220.

Any appropriate configuration may be utilized by each mounting hole 226 through the upper wall 224 of the mounting bracket 220. Representative configurations for each mounting hole 226 include circular or round. A given mounting hole could also be in the form of an elongated slot 226', as shown by dashed lines in FIG. 12C.

Figure 12A:
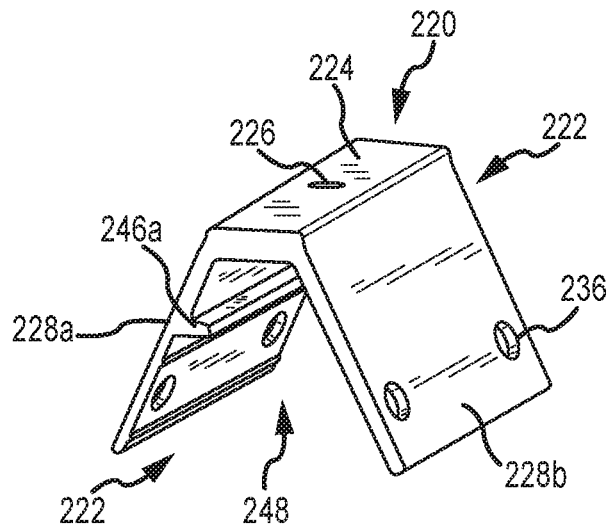
FIG. 12A is a perspective view of one embodiment of a mounting bracket for use with trapezoidal rib panels.
Figure 12B:
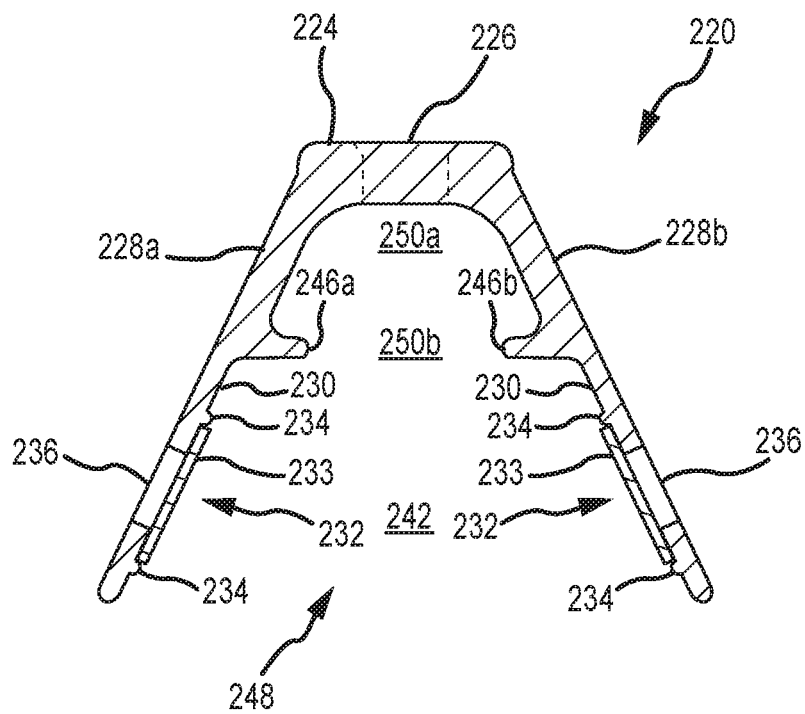
FIG. 12B is cross-sectional view of the mounting bracket of FIG. 12A.
Figure 12C:
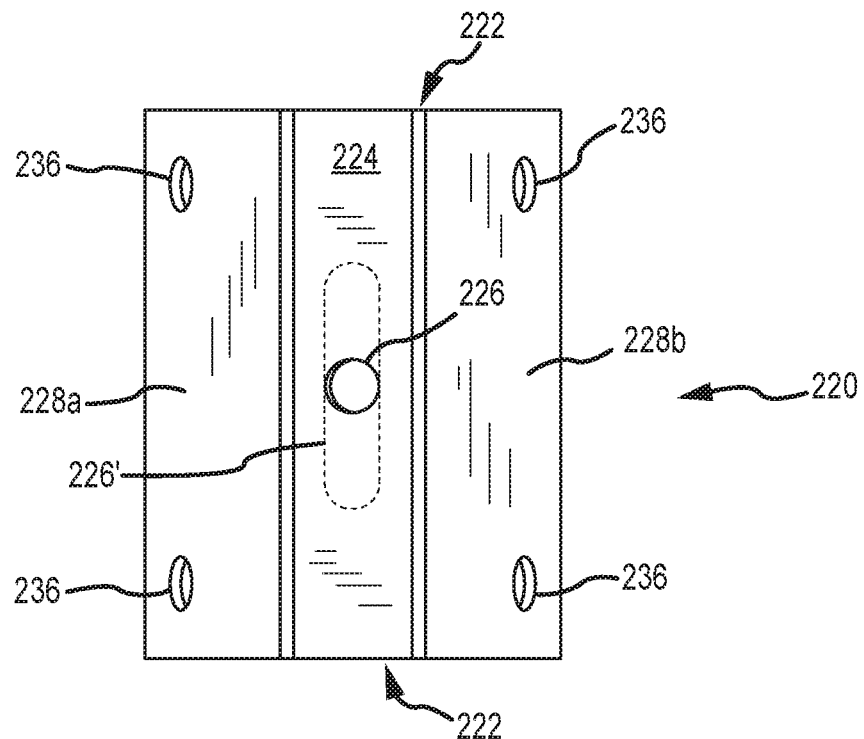
FIG. 12C is a top view of the mounting bracket of FIG. 12A.
Figure 12D:
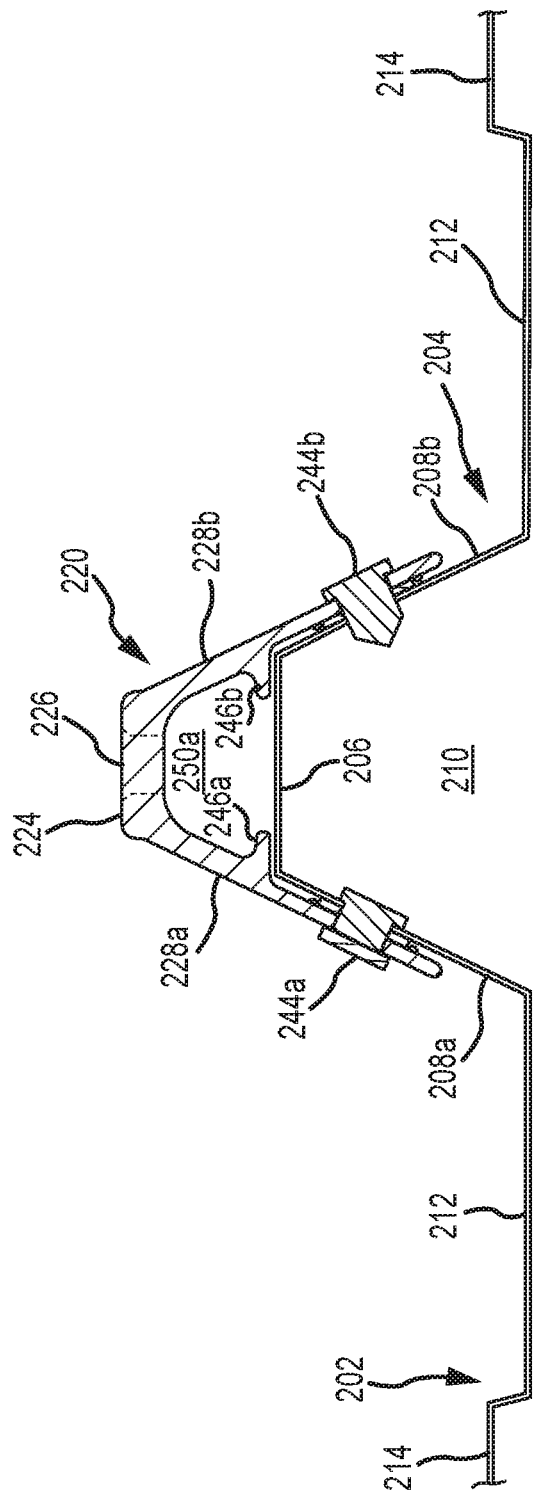
FIG. 12D is a cross-sectional view of the mounting bracket of FIG. 12A when installed on a trapezoidal rib of a trapezoidal rib panel.

The bracket side legs 228a, 228b are spaced from one another, and will typically be the mirror image of each other with regard to their respective orientations (e.g., an included angle between the underside of the upper wall 224 and the inside surface 230 each of the side legs 228, 228b being greater than 90° as shown). The bracket side leg 228a is positioned along an upper portion of the side 208a of a trapezoidal rib 204 (FIG. 12D), while the opposite bracket side leg 228b is positioned along an upper portion of the opposite side 208b of this same trapezoidal rib 204 (FIG. 12D). The bracket side legs 228a, 228b may be disposed in overlying relation with respect to any relevant portion of the corresponding side 208a, 208b of the trapezoidal rib 204. It should be appreciated that the bracket side legs 228a, 228b will typically be disposed in at least generally parallel relation to their corresponding side 208a, 208 of the trapezoidal rib 204.

At least part of the bracket side leg 228a may engage the side 208a of the trapezoidal rib 204, while at least part of the bracket side leg 228b may engage the side 208b of the trapezoidal rib 204. In the illustrated embodiment, each of the bracket side legs 228a, 228b includes an inner surface 230 that faces or projects toward the corresponding side 208a, 208b of the trapezoidal rib 204. In the illustrated embodiment, there may be two discrete zones of contact between each bracket side leg 228a, 228b and its corresponding side 208a, 208b of the trapezoidal rib 204. In this regard, each inner surface 230 includes a pair of rails, projections, or dimples 234 that may extend between the two open ends 222 of the mounting bracket 220. If the spacing between the two open ends 222 is characterized as the length dimension for the mounting bracket 220, each projection 234 may be extend along at least part of the length of the mounting bracket 220.

Each projection 234 may provide a discrete zone of contact (e.g., extending along a line or axial path) between the corresponding bracket side leg 228a, 228b and its corresponding side 208a, 208b of the trapezoidal rib 204. Generally, the use of the projections 234 reduces the area of contact between the mounting bracket 220 and the trapezoidal rib 204, which should reduce the potential for capillary entrapment (e.g., should reduce the potential of water "wicking" into interfacing surfaces of the mounting bracket 220 and trapezoidal rib 204, which could lead to the development of corrosion and premature failure of the building surface 200).

A gasket pocket or receptacle 232 is defined between the projections 234 on the inner surface 230 of each of the bracket side legs 228a, 228b. At least one fastener hole 236 extends through each of the bracket side legs 228a, 228b and intersects the corresponding gasket pocket 232. In the illustrated embodiment, there are two fastener holes 236 that are aligned with the gasket pocket 232 for each of the bracket side legs 228a, 228b. A gasket 233 of any appropriate type (e.g., an EPDM gasket) is disposed within each of the gasket pockets 232. The projections 234 on the inner surface 230 of the bracket side leg 228a confine the corresponding gasket 233 therebetween. Similarly, the projections 234 on the inner surface 230 of the bracket side leg 228b confine the corresponding gasket 233 therebetween.

In one embodiment, each gasket 233 is thicker than the depth of its corresponding gasket pocket 232 prior to the mounting bracket 220 being secured to the trapezoidal rib 204. As such, the gaskets 233 may be compressed between the mounting bracket 220 and the trapezoidal rib 204 as the mounting bracket 220 is secured to the trapezoidal rib 204. The above-described projections 234 may also provide the function of reducing the potential of these gaskets 233 being "over compressed" while securing the mounting bracket 220 to a trapezoidal rib 204.

Each gasket 233 may be installed within its corresponding gasket pocket 232 prior to installing the mounting bracket 220 on a trapezoidal rib 204. Any appropriate way of maintaining a gasket 233 within its corresponding gasket pocket 232 may be utilized (e.g., by being press fit within the corresponding gasket pocket 232; adhering a gasket 233 to the inner surface 230 of its corresponding gasket pocket 232). When the mounting bracket 220 is secured to the trapezoidal rib 204, the gasket 233 may compress to bring the above-noted projections 234 into contact with the corresponding side 208a, 208b of the trapezoidal rib 204. However, the projections 234 should still at least substantially confine the corresponding gasket 233 within its corresponding gasket pocket 232, and furthermore should reduce the potential for the gaskets 233 being over-compressed during installation as noted.

The mounting bracket 220 further includes a pair of rib offsetting members 246a, 246b that are disposed within a hollow interior 248 of the mounting bracket 220 (e.g., the partially enclosed space collectively defined by the upper wall 224 and the pair of bracket side legs 228a, 228b). Each rib offsetting member 246a, 246b is disposed in spaced relation to the upper wall 224 of the mounting bracket 220. One rib offsetting member 246a extends from the bracket side leg 228a toward, but not to, the opposite bracket side leg 228b. The other rib offsetting member 246b extends from the bracket side leg 228b toward, but not to, the opposite bracket side leg 228a.

The underside of each rib offsetting member 246a, 246b is positioned on the upper rib wall 206 of the trapezoidal rib 204 to dispose the upper wall 224 of the mounting bracket 220 above and in spaced relation to the upper rib wall 206 of the trapezoidal rib 204 (FIG. 12D). The hollow interior 248 of the mounting bracket 220 may be characterized as including a first open space 250a that is positioned above the rib offsetting members 246a, 246b (and below the upper wall 224 of the bracket 220), a second open space 250b between the opposing free ends of the rib offsetting members 246a, 246b, and a third open space or rib receptacle 242 that is positioned below the rib offsetting members 246a, 246b. That is, the two rib offsetting members 246a, 246b, and each of the bracket side legs 228a, 228b may be characterized as collectively defining the rib receptacle 242 (e.g., by defining the portion of the hollow interior 248 of the mounting bracket 220 in which a trapezoidal rib 204 may be disposed). At least an upper portion of a trapezoidal rib 204 may be disposed within the rib receptacle 242 of the mounting bracket 220 when the mounting bracket 220 is installed on such a trapezoidal rib 204 (e.g., FIG. 12D).

At least one fastener extends through the bracket side leg 228a (two being accommodated in the illustrated embodiment), through the gasket 233 in its corresponding gasket pocket 232, and terminates within the hollow interior 210 of the trapezoidal rib 204 when securing the mounting bracket 220 to a trapezoidal rib 204 (e.g., FIG. 12D). In the embodiment shown in FIG. 12D, the illustrated fastener for the bracket side leg 228a is in the form of a rivet 244a. At least one fastener also extends through the bracket side leg 228b (two being accommodated in the illustrated embodiment), through the gasket 233 in its corresponding gasket pocket 232, and also terminates within the hollow interior 210 of the trapezoidal rib 204 when securing the mounting bracket 220 to a trapezoidal rib 204 (e.g., FIG. 12D). In the embodiment shown in FIG. 12D, the illustrated fastener for the bracket side leg 228b is in the form of a sheet metal screw 244b. Any appropriate type/number of fasteners may be used to separately secure each bracket side leg 228a, 228b to the trapezoidal rib 204. As the upper wall 224 of the mounting bracket 220 is used as a supporting surface, no fasteners extend through the upper wall 224 of the mounting bracket 220 and through any portion of the trapezoidal rib 204. Moreover, all fasteners that are used to secure the mounting bracket 220 to the trapezoidal rib 204 terminate within the hollow interior 210 of the trapezoidal rib 204 (e.g., no fastener extends through the mounting bracket 220, through the trapezoidal rib panel 202, and into any underlying deck or supporting structure).

Figure 13:
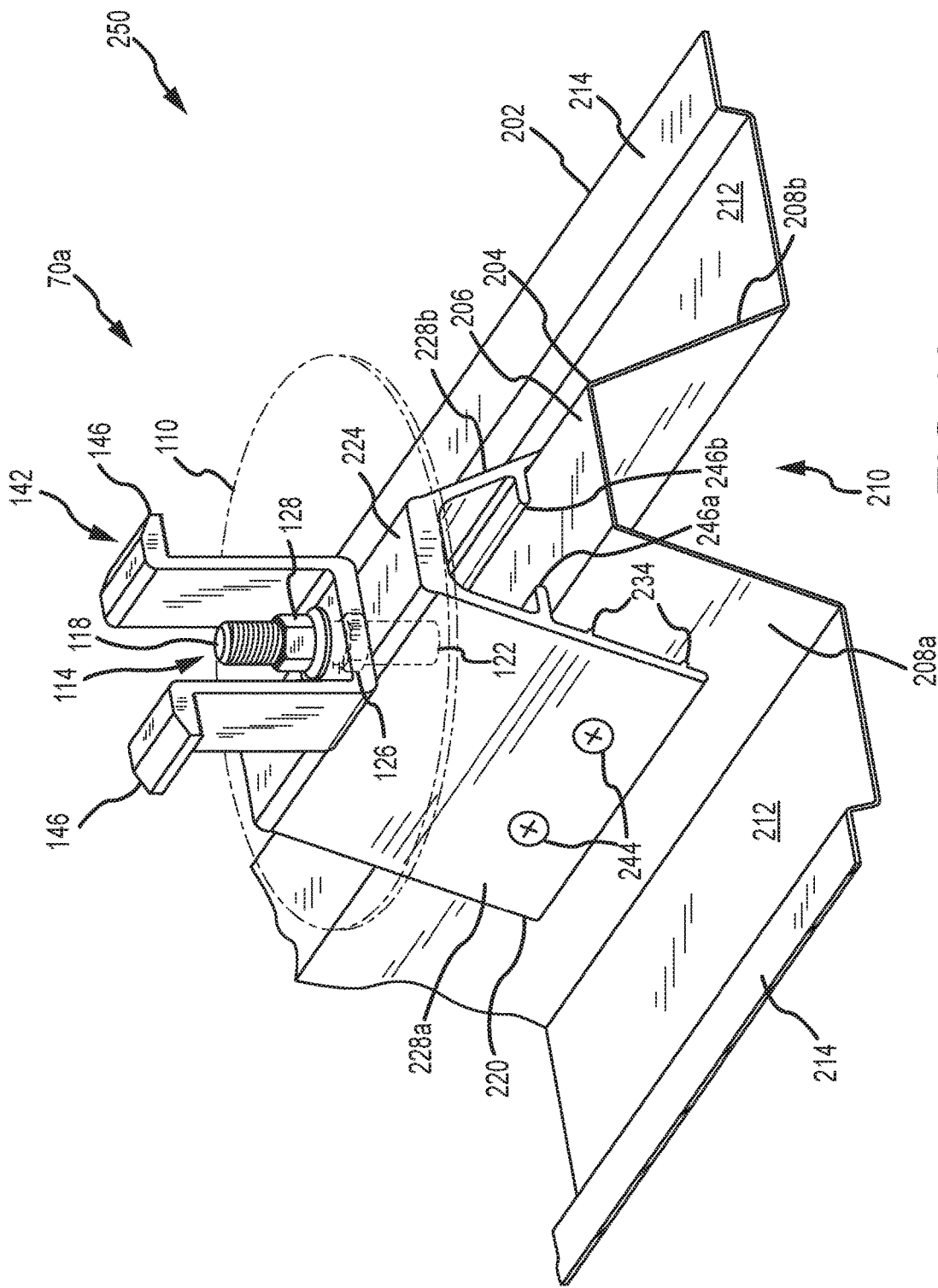
FIG. 13 is a perspective view of the mounting bracket of FIGS. 12A-D mounted on a trapezoidal rib of a trapezoidal rib panel, and with the mounting assembly 70a from FIGS. 7A-B being mounted on this mounting bracket.

Various types of attachments may be installed on a building surface defined by trapezoidal rib panels 202 using the above-described mounting bracket 220. One example is shown in FIG. 13, where a pair of fasteners 244 have been used to secure the bracket side leg 228a to the side 208a of the trapezoidal rib 204 in the above-noted manner, and where the bracket side leg 228b would be similarly secured to the side 208b of the trapezoidal rib 204. Here, the mounting assembly 70a (discussed above, and illustrated in FIG. 7A—the associated photovoltaic modules 58 not being shown in FIG. 13 for clarity) is installed on the mounting bracket 220 (i.e., the mounting bracket 220 may be used in place of the mounting device 74 for trapezoidal rib panel configurations and for the above-noted photovoltaic module applications, and in conjunction with each of the above-discussed mounting assemblies (e.g., mounting 70a-c)). The threaded stud 114 of the mounting assembly 70a is engaged with the mounting hole 226 (threaded in this example) on the upper wall 224 of the mounting bracket 220. The second stud end 122 is disposed within the hollow interior 248 of the mounting bracket 220 (e.g., the first open space 250a, and so as to not contact any structure of the mounting bracket 220). The mounting assemblies 70b, 70c discussed above may be similarly mounted to the mounting bracket 220 and at least generally in the above-discussed manner. It should be appreciated that the clamping member 142 may be rotated 90° from the position illustrated in FIG. 13 to accommodate installation of one or more photovoltaic modules 58 in the above-described manner.

The mounting assemblies 70a-c addressed above each may be characterized as an "attachment" when secured to the mounting bracket 220 in the above-noted manner (e.g., a mounting bracket 220 secured to a trapezoidal rib 202, and having an attachment that is secured relative to the mounting bracket 220, may be collectively characterized as an "attachment assembly 250", with such a representative attachment assembly 250 being shown in FIG. 13). Any photovoltaic module 58 that is engaged by any such mounting assembly 70a-c (when installed on a mounting bracket 220) may also be characterized as an attachment" that is secured relative to the mounting bracket 220 using an attachment fastener (e.g., threaded stud 114) that at least extends into a mounting hole 226 on the upper wall 224 of the mounting bracket 220, and collectively may be referred to as an "attachment assembly" as well.

Figure 14:
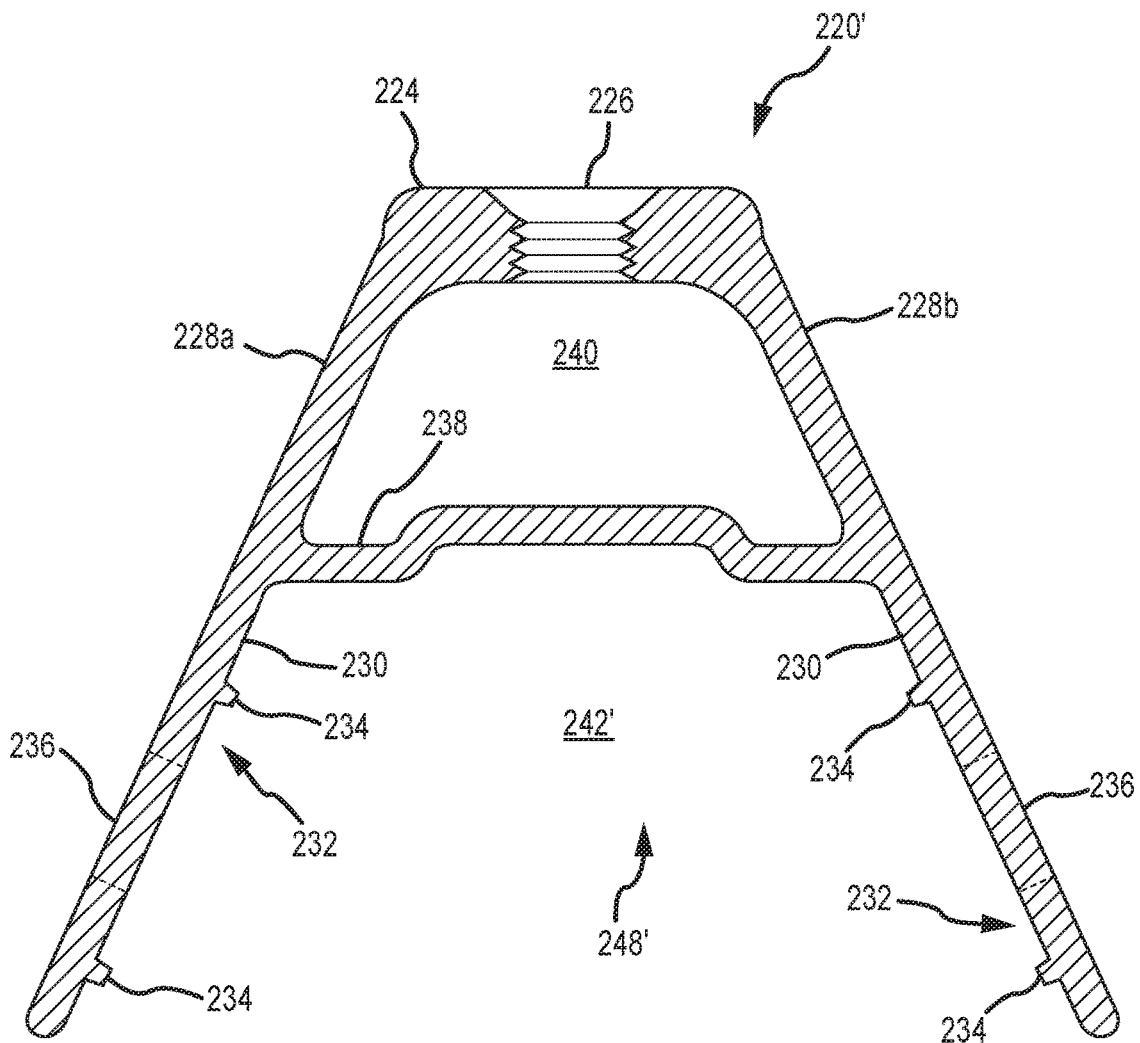
FIG. 14 is a cross-sectional view of a variation of the mounting bracket of FIG. 12A.

A variation of the mounting bracket 220 of FIGS. 12A-D is presented in FIG. 14. Corresponding components of these two embodiments are identified by the same reference numerals, and the discussion presented above remains applicable unless otherwise noted. Those corresponding components that differ in at least some respect are identified by a "single prime" designation. In the case of the mounting bracket 220' of FIG. 14, the two rib offsetting members 246a, 246b of the mounting bracket 220 of FIGS. 12A-D are replaced by a single rib offsetting member in the form of a cross member 238. This cross member 238 is disposed within the hollow interior 248' of the mounting bracket 220' (e.g., in the partially enclosed space collectively defined by the upper wall 224 and the pair of bracket legs 228a, 228b). This cross member 238 extends between the inner surfaces 230 of the two bracket side legs 228a, 228b. The cross member 238 is seated on the upper rib wall 206 of the trapezoidal rib 204 when the mounting bracket 220 is positioned on the trapezoidal rib 204. Although the entire underside of the cross member 238 could interface with the upper rib wall 206 of the rib 204, a central portion thereof may "bulge" away from the upper rib wall 206 of the rib 204 to address capillary entrapment.

The cross member 238 is disposed in spaced relation to the upper wall 224 of the mounting bracket 220'. An upper cavity or open space 240 (part of the hollow interior 248' of the mounting bracket 220') exists between the cross member 238 and the upper wall 224, and accommodates receipt of an attachment fastener that may extend through a mounting hole 226 to secure an attachment in position relative to the mounting bracket 220. In one embodiment, the upper wall 224 and the cross member 238 are separated by a distance of at least about ½ inch (e.g., the minimum vertical extent of the upper cavity 240 below the mounting hole 226 is about ½ inch ("vertical" being the dimension that is orthogonal to the upper wall 224)).

The cross member 238 and each of the bracket side legs 228a, 228b also collectively define a rib receptacle 242' (also part of the hollow interior 248' of the mounting bracket 220'). At least an upper portion of a trapezoidal rib 204 may be disposed within the rib receptacle 242' of the mounting bracket 220' when the mounting bracket 220' is installed on such a trapezoidal rib 204. The underside of at least part of the cross member 238 would be positioned on the upper rib wall 206 of the trapezoidal rib 204 to dispose the upper wall 224 of the mounting bracket 220' above and in spaced relation to the upper rib wall 206 of the trapezoidal rib 204. In the illustrated embodiment the portions of the cross member 238 that are adjacent to the bracket side legs 228a, 228b would be seated on the upper rib wall 206 of the trapezoidal rib 204, while the central portion of the cross member 238 would be spaced from the upper rib wall 206 of the trapezoidal rib 204, again to address capillary entrapment.

The mounting brackets 220, 220' provide a number of advantages for installing an attachment on a trapezoidal rib panel surface. Initially, photovoltaic modules may be installed on a trapezoidal rib panel surface with or without rails using the mounting brackets 220/220'. The mounting brackets 220/220' alleviate the need for any fastener to extend to any underlying deck or any other substrate (e.g., purlins) for the trapezoidal rib panel surface when securing the mounting brackets 220/220' to a trapezoidal rib on such a trapezoidal rib panel surface. This provides significant flexibility when installing PV modules on a trapezoidal rib panel surface.

Multiple mounting brackets 220/220' may be used to support a photovoltaic module above a trapezoidal rib panel surface without having these mounting brackets 220/220' directly anchored to an underlying substrate or support deck for the trapezoidal rib panel surface. A total of at least four of the mounting brackets 220/220' may be used to support a given photovoltaic module (two brackets 220/220' spaced along a first trapezoidal rib, and two brackets 220/220' spaced along a second trapezoidal rib that is appropriately spaced from the first trapezoidal rib). Where a photovoltaic module is characterized as having four edge portions (e.g., of a square or rectangular configuration), at least two mounting brackets 220/220' may support one edge portion of a given photovoltaic module, and at least two mounting brackets 220/220' may support an oppositely disposed edge portion of the same photovoltaic module. This allows the sheeting of the trapezoidal rib panel surface to itself support the photovoltaic modules (versus having to "anchor" supporting structures for the photovoltaic modules to the underlying deck or substrate for the trapezoidal rib panel surface).

Figure 15A:
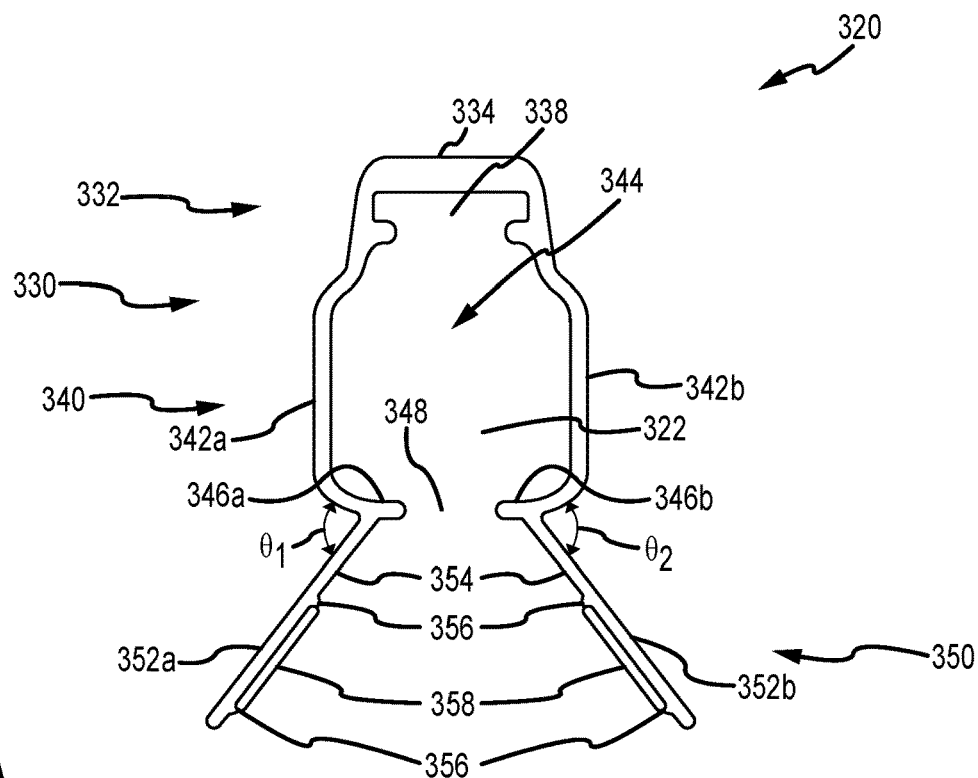
FIG. 15A is an end view of one embodiment of a trapezoidal rib mounting bracket having flexible legs.
Figure 15B:
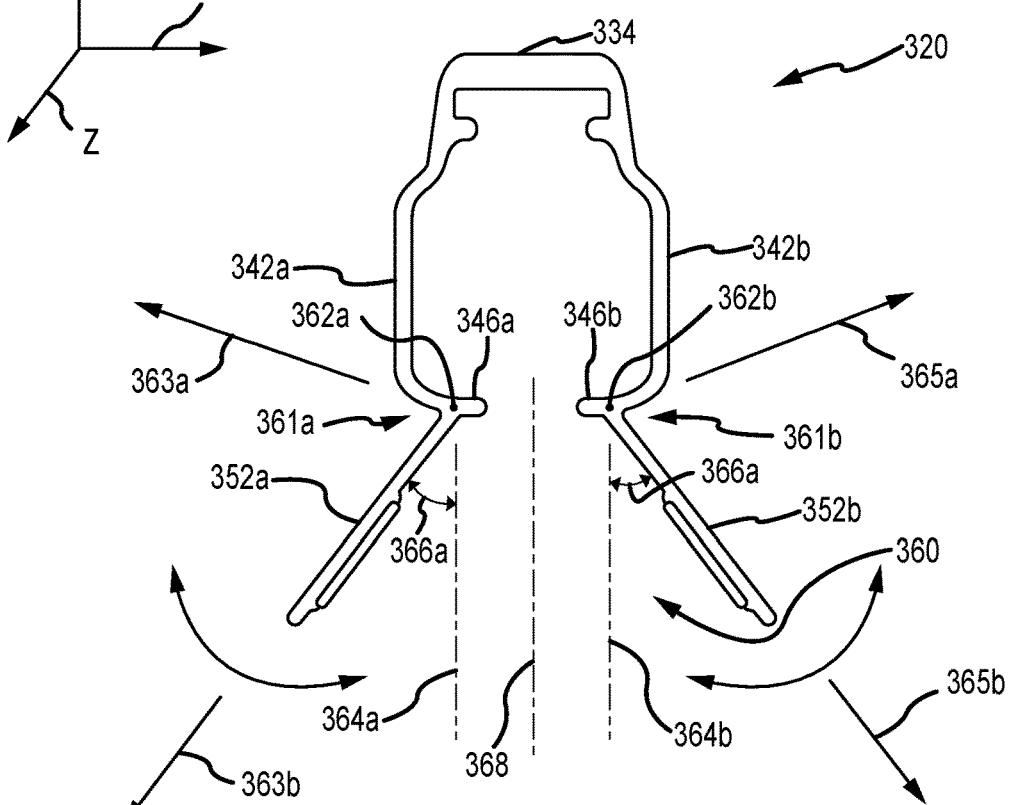
FIG. 15B is the same end view shown in FIG. 15A, but labeled to identify flex locations and directions for each of the legs.

FIGS. 15A and 15B illustrate another embodiment of a trapezoidal rib mounting bracket and that is identified by reference numeral 320, and which is a variation of the embodiments addressed above in relation to FIGS. 12A-12D and FIG. 14 (the discussion of corresponding features remaining applicable). The mounting bracket 320 includes a pair of open bracket ends 322 (only one being shown in FIGS. 15A and 15B) that are spaced along the length dimension of the mounting bracket 320, where this length dimension for the mounting bracket 320 coincides with the length or longitudinal extent of a trapezoidal rib on which the mounting bracket 320 may be positioned. Coordinates for discussing the mounting bracket 320 are shown in relation to FIGS. 15A and 15B. The length dimension of the mounting bracket 320 coincides with/is along the "z" axis (which would typically coincide with the pitch of a roofing surface when the mounting bracket 320 is in an installed configuration), the width or lateral dimension for the mounting bracket 320 is along the "x" axis (which would typically coincide with a constant elevation proceeding across a pitched roofing surface when the mounting bracket 320 is in an installed configuration), and the height dimension for the mounting bracket 320 is along the "y" axis.

The mounting bracket 320 includes an upper section 330 and a lower section 350. The upper section 330 may be characterized as including a first section 332 and a second section 340 that is disposed below the first section 332 when the mounting bracket 320 is disposed in an upright position (the position shown in FIGS. 15A and 15B, for instance when the ends of its legs 352a, 352b are disposed on a horizontal supporting surface or a horizontal reference plane). The second section 340 also adjoins a lower end of the first section 332.

The first section 332 for the upper section 330 of the mounting bracket 320 includes an upper wall 334 in the form of a flat or planar surface, and that defines an uppermost extreme for the mounting bracket 320 when disposed in its upright position. This upper wall 334 may include a mounting hole or aperture in accordance with the foregoing (e.g., FIGS. 12A-12D and FIG. 14), for instance a hole or slot that has its largest dimension extending in the length dimension for the mounting bracket 320. Such a mounting aperture may be used to secure an attachment relative to the mounting bracket 320 in accordance with the foregoing (e.g., FIGS. 12A-D and FIG. 14). In this regard, the first section 332 for the upper section 330 may include a receptacle 338 (the space directly below the underside of the upper wall 334). This receptacle 338 may receive a nut that is threadably attached to an end portion of a bolt (or other suitable threaded fastener) that may be used to secure an attachment relative to the mounting bracket 320 (with the shaft of the bolt extending through the upper wall 334).

The second section 340 for the upper section 330 includes a pair of sidewalls 342a, 342b that are spaced from one another (in the lateral or "x" dimension) and that are disposed in parallel relation. The width of the mounting bracket 320 at these sidewalls 342a, 342b is larger than the width of the entirety of the first section 332 for the upper section 330, with these widths being measured in the lateral or "x" dimension (e.g., the second section 340 for the upper section 330 is "bulged" in the lateral or "x" dimension (the left-to-right dimension in the view of FIGS. 15A and 15B) compared to the first section 332 for the upper section 330). An open space 344 exists between the sidewalls 342a, 342b of the upper section 330, and may be used to accommodate wires or cables, for instance for a photovoltaic application of the type described herein (e.g., the mounting bracket 320 may be used in place of the mounting bracket 220 shown in FIG. 13; one or more wires or cables may be directed through the open space 344 (along the length or "z" dimension of the mounting bracket 320) to accommodate electrical connection of adjacent photovoltaic modules, in which case it may be referred to as a wire management space 344). In one embodiment the vertical extent or height H (FIG. 16B) of this wire management space 344 is at least about 0.75" (measured in the height or "y" dimension) and including when the mounting bracket 320 is disposed in its upright position.

A pair of rib offsetting members 346a, 346b are disposed on a lowermost end of the upper section 330, with each rib offsetting member 346a, 346b extending from a lower end to its corresponding sidewall 342a, 342b. The rib offsetting member 346a extends toward, but not to, the rib offsetting member 346b. Similarly, the rib offsetting member 346b extends toward, but not to, the rib offsetting member 346a. That is, a space 348 extends between the rib offsetting member 346a and the rib offsetting member 346b. The above-noted wire management space 344 extends from the rib offsetting members 346a/346b to the underside of the receptacle 338. This (the wire management space 344) also disposes a photovoltaic module at a desired spacing relative to a roofing surface when the mounting bracket 320 is in an installed configuration.

The lower section 350 of the mounting bracket 320 is disposed below and adjoins a lower end of the above-described upper section 332 of the mounting bracket 320. A pair of legs 352a, 352b define the entirety of this lower section 350 for the illustrated embodiment. The legs 352a, 352b extend downwardly from the upper section 330 of the mounting bracket 320 in diverging relation to one another to define a rib receptacle 360 for receipt of at least an upper portion of a trapezoidal rib (the rib receptacle 360 also extends between the two open bracket ends 322 of the mounting bracket 320). Each leg 352a, 352b includes an inner surface 354, a pair of projections 356, and a gasket 358 at least generally in accordance with the embodiment of FIGS. 12A-D. The leg 352a intersects the rib offsetting member 346a at an intermediate location thereof—the rib offsetting member 346a proceeds past this intersection and in the direction of the rib offsetting member 346b (but not to the rib offsetting member 346b). Similarly, the leg 352b intersects the rib offsetting member 346b at an intermediate location thereof—the rib offsetting member 346b proceeds past this intersection and in the direction of the rib offsetting member 346a (but not to the rib offsetting member 346a). An acute angle $\theta_1$ (i.e., less than 90°; on the exterior of the mounting bracket 320) exists between the first leg 352a and the portion of the rib offsetting member 346a that extends from its intersection with the first leg 352a to its corresponding sidewall 342a in the illustrated embodiment. Similarly, an acute angle $\theta_2$ (i.e., less than 90°; on the exterior of the mounting bracket 320) exists between the second leg 352b and the portion of the rib offsetting member 346b that extends from its intersection with the second leg 352b to its corresponding sidewall 342b in the illustrated embodiment. Each rib offsetting member 346a, 346b is initially curved proceeding from its corresponding sidewall 342a, 342b in the illustrated embodiment.

Each of the legs 352a, 352b is flexibly deflectable relative to the upper section 330 to accommodate installation of the mounting bracket 320 on different trapezoidal rib profiles, different sizes of trapezoidal ribs, or both. This flexible deflection may be characterized as an elastic deflection of the legs 352a, 352b. In any case, the first leg 352a may be characterized as flexibly deflecting relative to the upper section 330 at least generally about a reference axis 362a that coincides with the intersection of the leg 352a and the upper section 330, while the second leg 352b may be characterized as flexibly deflecting relative to the upper section 330 at least generally about a reference axis 362b that coincides with the intersection of the leg 352b and the upper section 330. In one embodiment, these reference axes 362a, 362b are disposed at a common elevation when the mounting bracket 320 is disposed in its upright position, and these reference axes 362a, 362b extend in the "z" dimension for the mounting bracket 320. FIGS. 15A and 15B show what may be referred to as a static position for the mounting bracket 320, as a position of the legs 352a and 352b in the absence of an external force being applied to the legs 352a, 352b, as an unbiased position for the legs 352a, 352b, as a neutral position for the legs 352a, 352b, or the like. For instance, such a first position for the first leg 352a may be the position that the first leg 352a will attempt to move back toward after a deflecting force has been removed from the first leg 352a, while such a second position for the second leg 352b may be the position that the second leg 352b will attempt to move back toward after a deflecting force has been removed from the second leg 352b. From the first position for the first leg 352a shown in FIGS. 15A and 15B: 1) the first leg 352a may deflect at least 2° away from the second leg 352b; 2) the first leg 352a may deflect at least 2° toward the second leg 352b; 3) the first leg 352a may deflect up to about 5° away from the second leg 352b; and 4) the first leg 352a may deflect up to about 5° toward the second leg 352b. From the second position for the second leg 352b shown in FIGS. 15A and 15B: 1) the second leg 352b may deflect at least 2° away from the first leg 352a; 2) the second leg 352b may deflect at least 2° toward the first leg 352a; 3) the second leg 352b may deflect up to about 5° away from the first leg 352a; and 4) the second leg 352b may deflect up to about 5° toward the first leg 352a.

A reference plane 364a extends through the intersection between the first leg 352a and the rib offsetting member 346a, is vertically oriented when the mounting bracket 320 is disposed in an upright position on a horizontal supporting surface, and includes the length dimension for the mounting bracket 320 (e.g., only an edge of the reference plane 364a is visible in an end view of the mounting bracket 320 shown in FIG. 15B). A reference plane 364b extends through the intersection between the second leg 352b and the rib offsetting member 346b, is vertically oriented when the mounting bracket 320 is disposed in an upright position on a horizontal supporting surface, and includes the length dimension for the mounting bracket 320 (e.g., only an edge of the reference plane 364b is visible in an end view of the mounting bracket 320 shown in FIG. 15B). As such, the reference planes 364a, 364b are parallel to one another. An acute angle 366a (i.e., less than 90°) exists between the first leg 352a and its corresponding reference plane 364a. Similarly, an acute angle 366b (i.e., less than 90°) exists between the second leg 352b and its corresponding reference plane 364b. The reference planes 364a and 364b each may be characterized as occupying both the "y" and "z" dimensions for the mounting bracket 320, while being orthogonal to the "x" dimension for the mounting bracket 320.

As noted, the first leg 352a and the second leg 352b extend away from the upper section 330 of the mounting bracket 320 in diverging relation relative to one another. That is, the spacing between the first leg 352a and the second leg 352b progressively increases proceeding away from the upper section 330. A reference plane 368 that is parallel to the noted reference planes 364a, 364b is shown in FIG. 15B. As such, the reference plane 368 may be characterized as occupying both the "y" and "z" dimensions for the mounting bracket 320, while being orthogonal to the "x" dimension for the mounting bracket 320. Moreover, only an edge of the reference plane 368 is visible in an end view of the mounting bracket 320 shown in FIG. 15B.

The reference plane 368 may bisect the mounting bracket 320 in the lateral or "x" dimension (the left-to-right dimension shown in FIGS. 15A and 15B), but in any case is located somewhere between the first leg 352a and the second leg 352b (i.e., the first leg 352a and second leg 352b are disposed on opposite sides of the reference plane 368). Moreover, the reference plane 368 extends between the two open bracket ends 322 of the mounting bracket 320 (e.g., such that the reference plane 368 coincides with/contains the length dimension for the mounting bracket 320; such that the reference plane 368 is oriented so as to contain the pitch of a roofing surface when the mounting bracket 320 is in an installed configuration). The first leg 352a extends away from the upper section 330 in diverging relation to this reference plane 368 (e.g., as the spacing of the first leg 352*a* from the upper section 330 increases, so too does the spacing between the first leg 352*a* and the reference plane 368). The second leg 352*b* extends away from the upper section 330 in diverging relation to this reference plane 368 (e.g., as the spacing of the second leg 352*b* from the upper section 330 increases, so too does the spacing between the second leg 352*b* and the reference plane 368). The first leg 352*a* and the second leg 352*b* may be characterized as being oriented as the mirror image of one another.

A notch 361*a* is disposed on one side of the exterior of the mounting bracket 320 (e.g., an exterior notch 361*a*), while a notch 361*b* is disposed on the opposite side of the exterior of the mounting bracket 320 (e.g., an exterior notch 361*b*). The notches 316*a*, 361*b* are at least generally V-shaped. That is the notches 361*a*, 361*b* are spaced from one another in the lateral or "x" dimension for the mounting bracket 320. The notches 316*a*, 361*b* are at least generally V-shaped. The notches 361*a*, 361*b* each open, face, or project away from the reference plane 368—the notch 361*a* opens, faces, or projects away relative to one side of the reference plane 368 while the notch 361*b* opens, faces, or projects away relative to the opposite side of the reference plane 368. The notches 361*a*, 361*b* may also be characterized as opening, facing, or projecting away from one another, may be characterized as being disposed opposite of one another (e.g., disposed at a common elevation when the mounting bracket 320 is disposed in an upright position on a horizontal supporting surface), or both.

The notch 361*a* has a closed notch end and an open notch end, with a pair of walls extending from its closed notch end to its open notch end (e.g., to coincide with the depth of the notch 361*a*). Vector 363*a* represents the orientation of one of these walls (a portion of the rib offsetting member 346*a* that defines the notch 361*a* and that extends outwardly to its corresponding sidewall 342*a*) and proceeding from the closed notch end of the notch 361*a* to its open notch end, while vector 363*b* represents the orientation of the other of these walls (an upper portion of the leg 352*a* extending from the intersection with the rib offsetting member 346*a* in the illustrated embodiment) and proceeding from the closed notch end of the notch 361*a* to its notch open end. The notch 361*b* similarly has a closed notch end and an open notch end, with a pair of walls extending from its closed notch end to its open notch end (e.g., to coincide with the depth of the notch 361*b*). Vector 365*a* represents the orientation of one of these walls (a portion of the rib offsetting member 346*b* that defines the notch 361*b* and that extends outwardly to its corresponding sidewall 342*b*) and proceeding from the closed notch end of the notch 361*b* to its open notch end, while vector 365*b* represents the orientation of the other of these walls (an upper portion of the leg 352*b* extending from the intersection with the rib offsetting member 346*b* in the illustrated embodiment) and proceeding from the closed notch end of the notch 361*b* to its open notch end. The vectors 363*a* and 363*b* (associated with notch 361*a*) both extend away relative to a common first side of the reference plane 368, while the vectors 365*a* and 365*b* (associated with notch 361*b*) both extend away relative to a common second side of the reference plane 368, where the first and second sides of the reference plane 368 are opposite of one another.

Figure 15C:
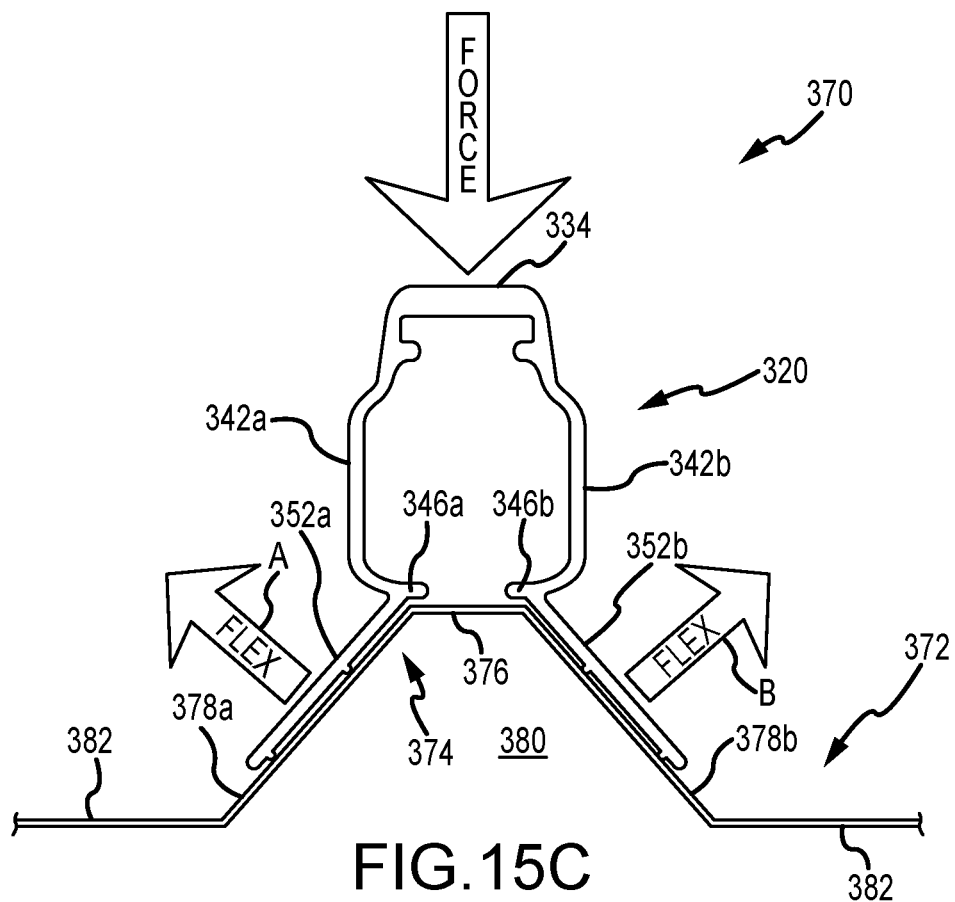
FIG. 15C is an end view of the mounting bracket of FIG. 15A positioned on one trapezoidal rib profile.
Figure 15D:
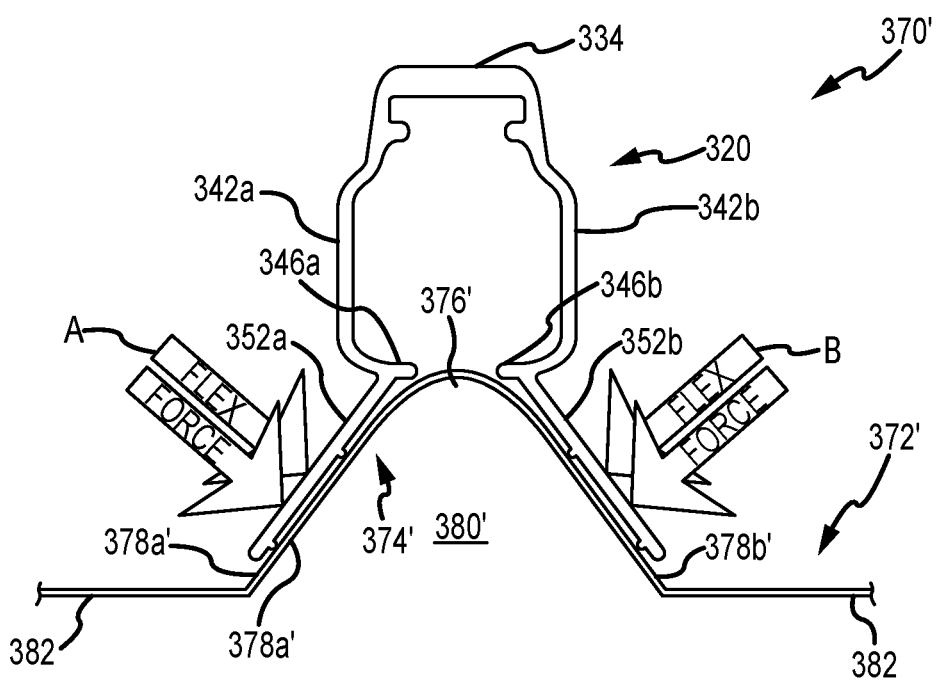
FIG. 15D is an end view of the mounting bracket of FIG. 15A positioned on another trapezoidal rib profile.

As noted, the flexible deflectability of the first leg 352*a* and the second leg 352*b* allows the mounting bracket 320 to be installed on different trapezoidal rib profiles and/or sizes, and that is illustrated by a comparison of FIGS. 15C and 15D. FIG. 15C may be referred to as an attachment assembly 370 that uses the above-noted mounting bracket 320 on one trapezoidal rib profile. In this regard, a metal panel 372 includes one or more trapezoidal ribs 374, with a base section 382 being disposed on at least one and typically on each side of the trapezoidal rib 374. The trapezoidal rib 374 includes an upper rib wall 376 (a flat surface) and a pair of sides or sidewalls 378*a*, 378*b* that define a hollow interior 380. The sidewalls 378*a*, 378*b* extend from the upper rib wall 376 in diverging relation to one another. The sidewalls 378*a*, 378*b* are oriented as the mirror image of one another.

Figure 15E:
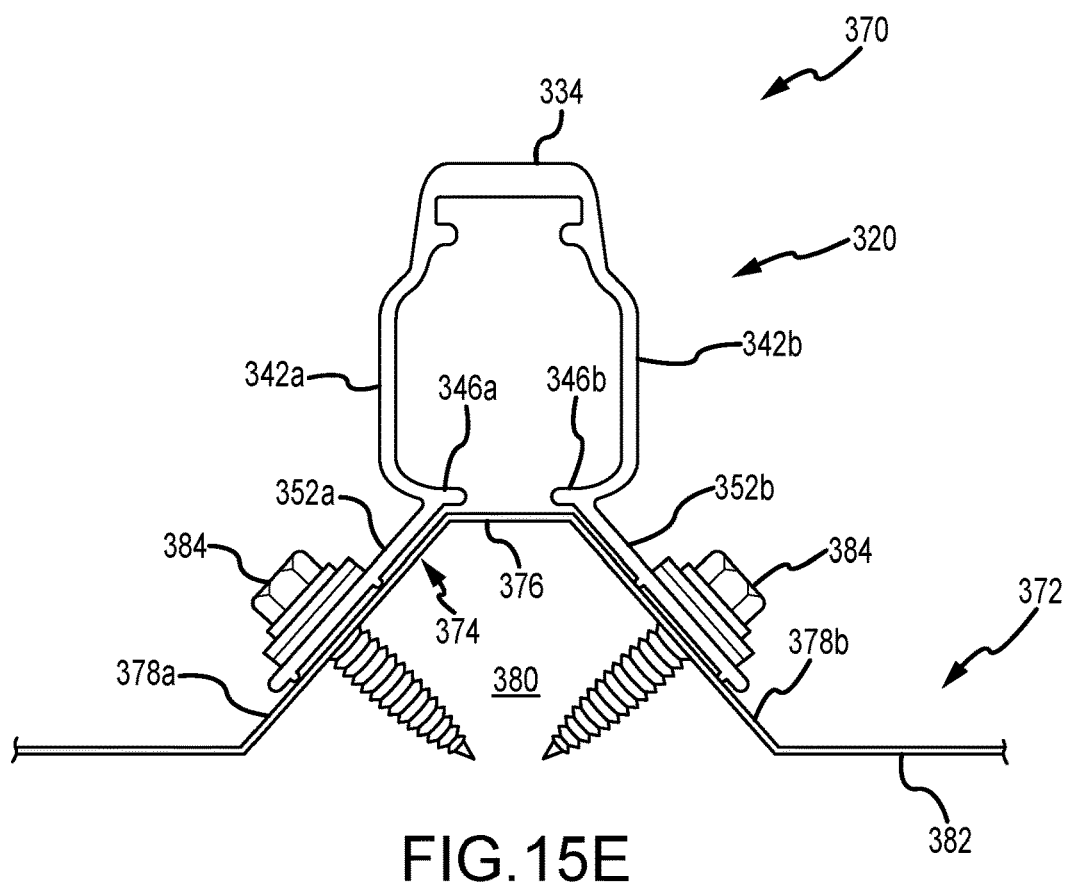
FIG. 15E is an end view of the mounting bracket of FIG. 15A being fastened to the trapezoidal rib profile of FIG. 15C.

Positioning the mounting bracket 320 on the trapezoidal rib 374 of FIG. 15C requires that the first leg 352*a* be flexibly deflected at least generally away from the second leg 352*b* (at least generally represented by arrow A in FIG. 15C), and that the second leg 352*b* be flexibly deflected at least generally away from the first leg 352*a* (at least generally represented by arrow B in FIG. 15C). Such a flexure may be characterized as "expanding" the lower section 350 of the mounting bracket 320. In any case, the noted flexing may be realized by exerting the noted force (in the direction of the underlying trapezoidal rib 374) on the upper wall 334 of the mounting bracket 320. Note that at least part of each of the rib offsetting members 346*a*, 346*b* (e.g., the portions that are contained within a common reference plane) will typically be positioned on the upper rib wall 376 of the trapezoidal rib 374 (although a small space could exist at this time). FIG. 15E shows that at least one panel fastener 384 (e.g. a threaded screw) may be directed through both the first leg 352*a* and the first sidewall 378*a* of the trapezoidal rib 374 to secure the first leg 352*a* to the trapezoidal rib 374, and that each such panel fastener 384 terminates within the hollow interior 380 of the trapezoidal rib 374. FIG. 15E further shows that at least one panel fastener 384 may be directed through both the second leg 352*b* and the second sidewall 378*b* of the trapezoidal rib 374 to secure the second leg 352*b* to the trapezoidal rib 374, and that each such panel fastener 384 terminates within the hollow interior 380 of the trapezoidal rib 374. Note that at least when each of the legs 352*a*, 352*b* have been individually secured to the trapezoidal rib 374 by one or more panel fasteners 384, the orientation of the first leg 352*a* will at least substantially match the orientation of the first sidewall 378*a* of the trapezoidal rib 374, and that the orientation of the second leg 352*b* will at least substantially match the orientation of the second sidewall 378*b* of the trapezoidal rib 374. It may be necessary to continue to exert the noted force on the upper wall 334 of the mounting bracket 320 (e.g., "pushing down" on the mounting bracket 320) until at least one panel fastener 384 has been directed through each of the first leg 352*a* and the second leg 352*b* and into the trapezoidal rib 374 in the noted manner.

FIG. 15D may be referred to as an attachment assembly 370' that uses the above-noted mounting bracket 320 on a different trapezoidal rib profile (e.g., compared to FIG. 15C). In this regard, a metal panel 372' includes one or more trapezoidal ribs 374', with a base section 382 being disposed on at least one and typically on each side of the trapezoidal rib 374'. The trapezoidal rib 374' includes an upper rib wall 376' (a curved surface) and a pair of sides or sidewalls 378*a*', 378*b*' that define a hollow interior 380'. The sidewalls 378*a*', 378*b*' extend from the upper rib wall 376' in diverging relation to one another. The sidewalls 378*a*', 378*b*' are oriented as the mirror image of one another.

Figure 15F:
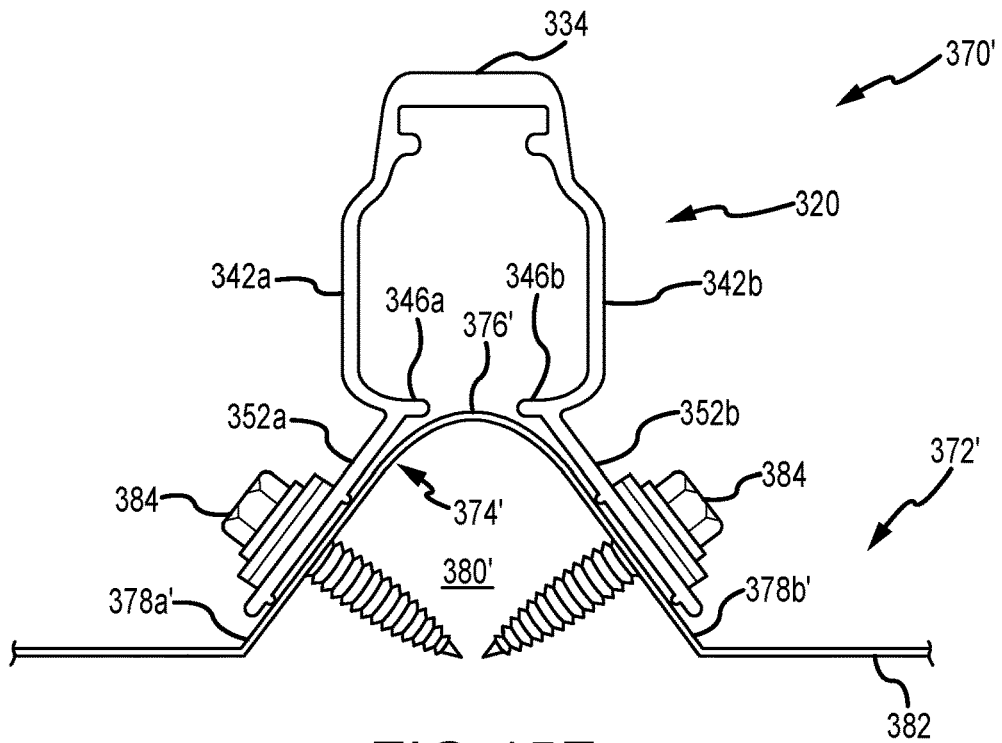
FIG. 15F is an end view of the mounting bracket of FIG. 15A being fastened to the trapezoidal rib profile of FIG. 15D.

Positioning the mounting bracket 320 on the trapezoidal rib 374' of FIG. 15D requires that the first leg 352*a* be flexibly deflected at least generally toward the second leg 352*b* (at least generally represented by arrow A in FIG. 15D), and that the second leg 352*b* be flexibly deflected at least away generally toward the first leg 352a (at least generally represented by arrow B in FIG. 15D). Such a flexure may be characterized as "contracting" the lower section 350 of the mounting bracket 320. Although each of the rib offsetting members 346a, 346b are illustrated as being slightly spaced from the upper rib wall 376' of the trapezoidal rib 374' in FIG. 15D, at least part of the rib offsetting members 346a, 346b (e.g., the portions that are contained within a reference plane) will typically be positioned on the upper rib wall 376'. FIG. 15F shows that at least one panel fastener 384 may be directed through both the first leg 352a and the first sidewall 378a' of the trapezoidal rib 374' to secure the first leg 352a to the trapezoidal rib 374', and that each such panel fastener 384 terminates within the hollow interior 380' of the trapezoidal rib 374'. FIG. 15F further shows that at least one panel fastener 384 may be directed through both the second leg 352b and the second sidewall 378b' of the trapezoidal rib 374' to secure the second leg 352b to the trapezoidal rib 374', and that each such panel fastener 384 terminates within the hollow interior 380 of the trapezoidal rib 374'. Note that at least when each of the legs 352a, 352b have been individually secured to the trapezoidal rib 374' by one or more panel fasteners 384, the orientation of the first leg 352a will at least substantially match the orientation of the first sidewall 378a' of the trapezoidal rib 374', and that the orientation of the second leg 352b will at least substantially match the orientation of the second sidewall 378b' of the trapezoidal rib 374'. Although the flexure directions represented by the arrows A and B in FIG. 15D will ultimately be required to dispose the mounting bracket 320 in the configuration shown in FIG. 15D, there are a number of options for applying the noted forces to the first leg 352a and the second leg 352b to achieve this flexing.

A first option would be to exert separate forces on the first leg 352a and the second leg 352b to cause the associated flexing until at least one panel fastener 384 has been directed through each of the first leg 352a and the second leg 352b and into the trapezoidal rib 374' in the noted manner. A second option would be to attach the first leg 352a to the trapezoidal rib 374' in the noted manner (i.e., using at least one panel fastener 384) but without flexing the first leg 352a and to then apply a force to the second leg 352b such that the same may be attached to the trapezoidal rib 374' in the noted manner (i.e., using at least one panel fastener 384), or vice versa. It should be appreciated that although one of the legs 352a, 352b may not be flexed for purposes of attaching the same to the trapezoidal rib 374' using at least one panel fastener 384 in the noted manner, a force will be exerted on this attached leg 352a, 352b (and the attached leg 352a, 352b will flex in the noted manner) when a force is exerted on the other of the first leg 352a or second leg 352b (and to flex the same in the noted manner) when positioning the same relative to the trapezoidal rib 374' such that it too may be attached to the trapezoidal rib 374' using at least one panel fastener 384 and in the noted manner.

In the case of the noted second option to realize the FIG. 15F installation, the first leg 352a may be attached to the sidewall 378a' of the trapezoidal rib 374' using at least one panel fastener 384 and without flexing the first leg 352a relative to the upper section 330. A force may be exerted on the mounting bracket 320 to "push" the second leg 352b toward the sidewall 378b' of the trapezoidal rib 374' (which could move the mounting bracket 320 at least generally about the trapezoidal rib 374' in a clockwise direction in the view shown in FIG. 15F). This will flex the second leg 352b relative to the upper section 330 and into position relative to the sidewall 378b' of the trapezoidal rib 374' such that the second leg 352b can then be secured thereto using at least one panel fastener 384. As the first leg 352a is already attached to the trapezoidal rib 374', this "pushing" of the second leg 352b toward the sidewall 378b' of the trapezoidal rib 374' in the noted manner will also exert a force on the first leg 352a that will flex the same relative to the upper section 330 of the bracket 320.

In the case of the noted second option to realize the FIG. 15F installation, the second leg 352b may be attached to the sidewall 378b' of the trapezoidal rib 374' using at least one panel fastener 384 and without flexing the second leg 352b relative to the upper section 330. A force may be exerted on the mounting bracket 320 to "push" the first leg 352a toward the sidewall 378a' of the trapezoidal rib 374' (which could move the mounting bracket 320 at least generally about the trapezoidal rib 374' in a counterclockwise direction in the view shown in FIG. 15F). This will flex the first leg 352a relative to the upper section 330 and into position relative to the sidewall 378a' of the trapezoidal rib 374' such that the first leg 352a can be secured thereto using at least one panel fastener 384. As the second leg 352b is already attached to the trapezoidal rib 374', this "pushing" of the first leg 352a toward the sidewall 378a' of the trapezoidal rib 374' in the noted manner will also exert a force on the second leg 352b that will flex the same relative to the upper section 330 of the bracket 320.

Figure 16A:
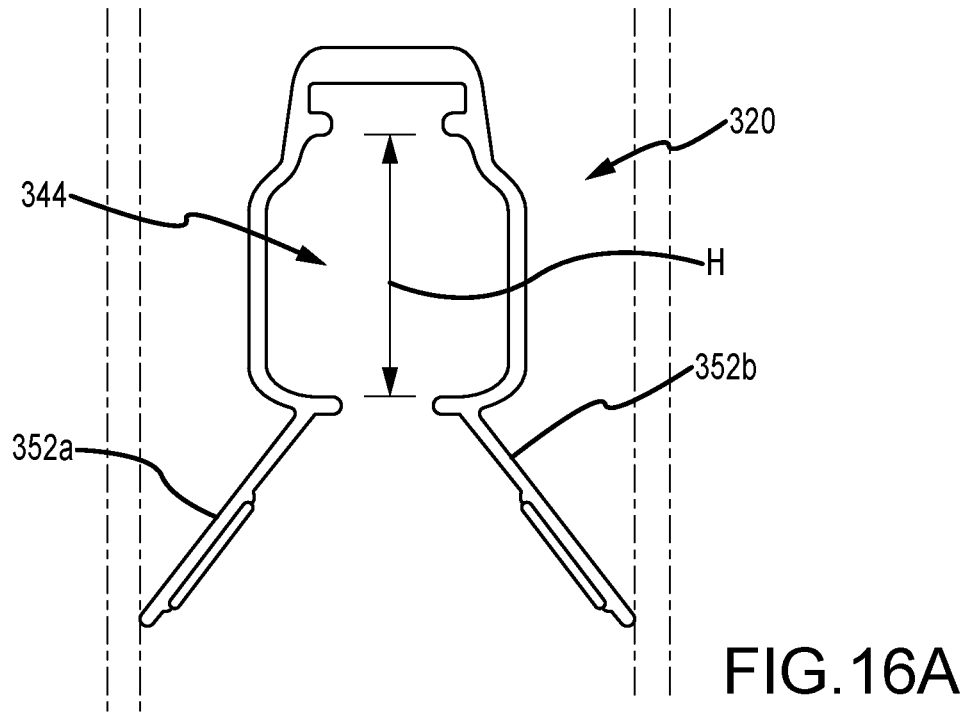
FIG. 16A is the same end view of the mounting bracket of FIG. 15A.
Figure 16B:
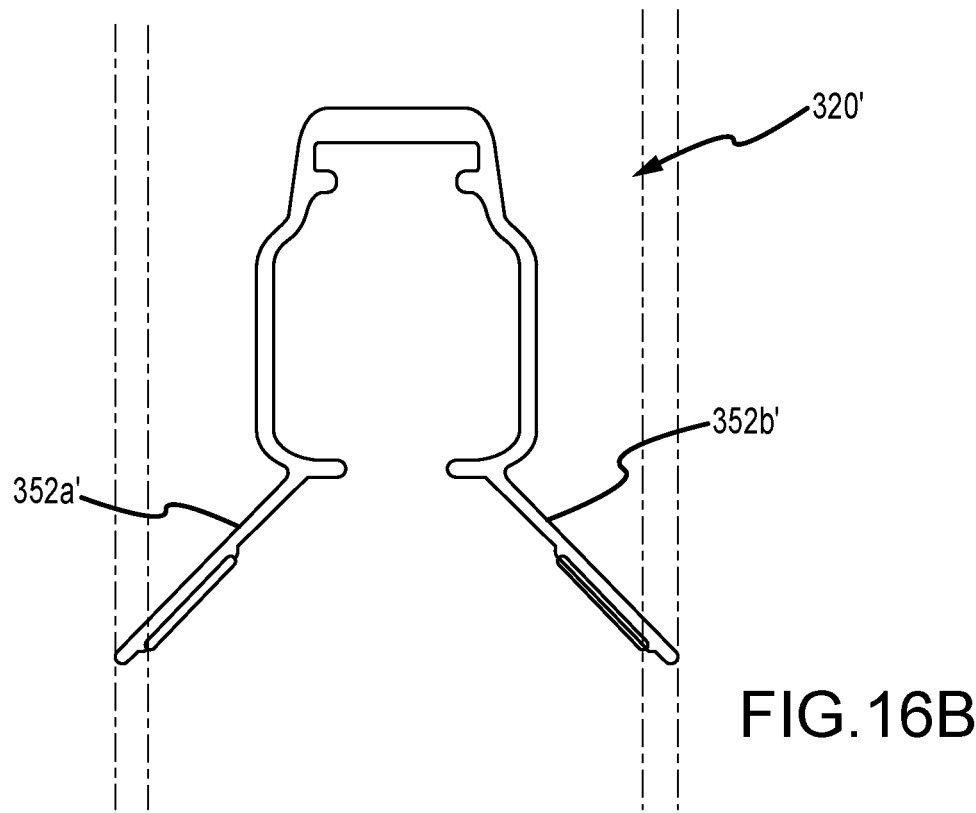
FIG. 16B is an end view of a variation of the mounting bracket shown in FIG. 16A.

FIG. 16A shows the mounting bracket 320 of FIGS. 15A-F, and that may be used with a certain range of trapezoidal rib profiles/sizes. FIG. 16B show a similar mounting bracket 320', but is configured to work with a different range of trapezoidal rib profiles/sizes. Note the different orientation of the legs 352a', 352b' of the mounting bracket 320' of FIG. 16B, compared to the orientation of the legs 352a, 352b of the mounting bracket 320 of FIG. 16A. The legs 352a', 352b' are "flatter" (mounting bracket 320'—FIG. 16B) compared to the legs 352a, 352b (mounting bracket 320—FIG. 16A).

Figure 17A:
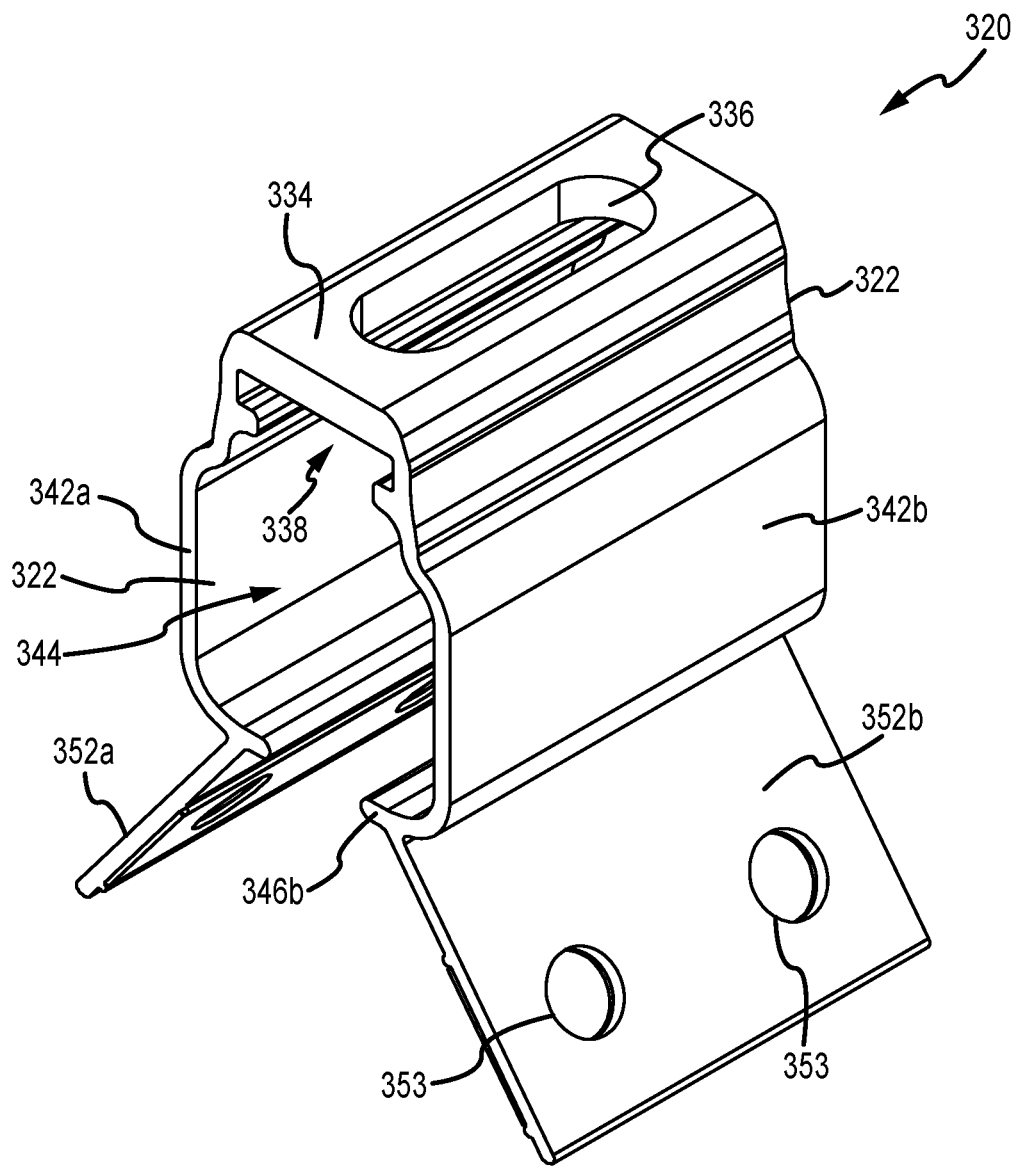
FIG. 17A is a perspective view of an embodiment of the mounting bracket of FIG. 15A.

FIG. 17A shows the mounting bracket 320 of FIG. 15A as incorporating a mounting slot 336 of the above-noted type. FIG. 17A also shows the mounting bracket 320 as incorporating a pair of holes 353 (un-threaded) in each of the legs 352a, 352b. A different panel fastener 384 may be directed through each of these holes 353 to secure the mounting bracket 320 relative to a panel on which the mounting bracket 320 is installed in the above-noted manner.

Figure 17B:
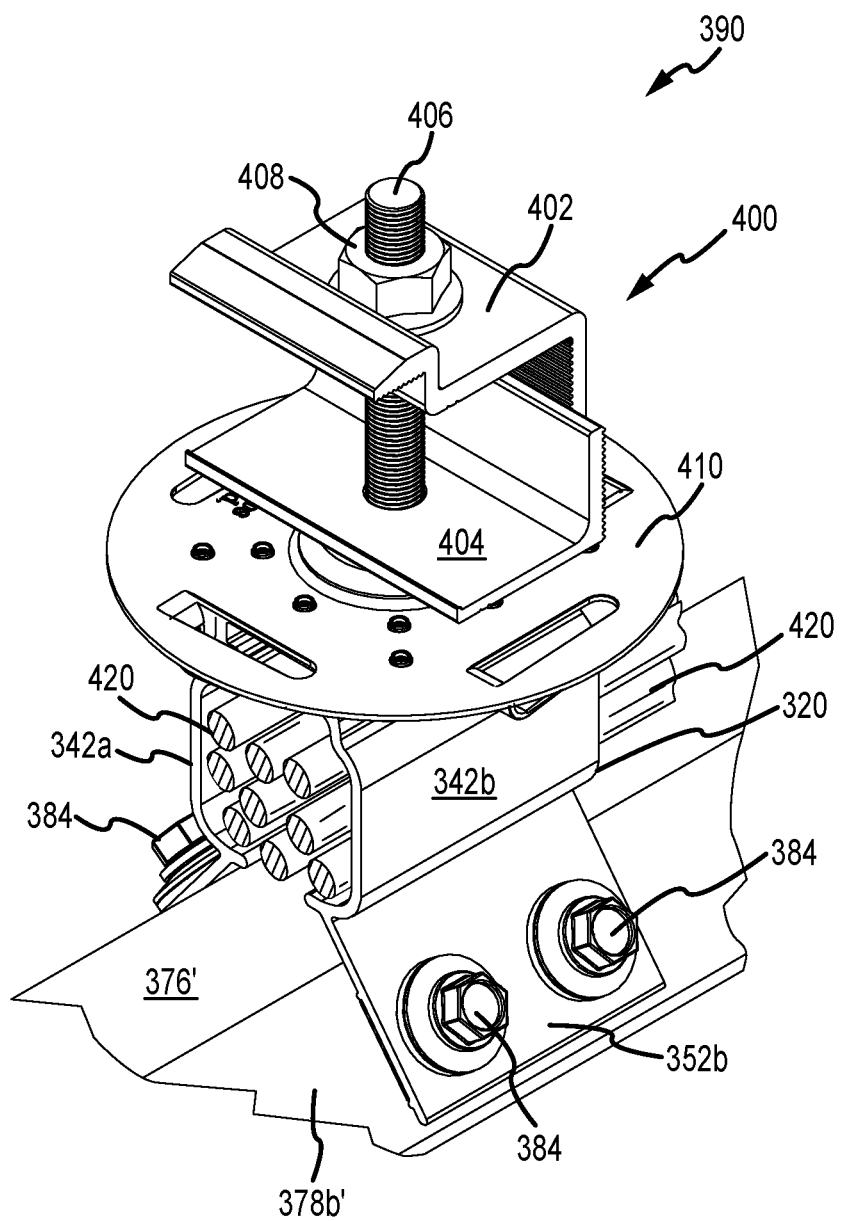
FIG. 17B is a perspective view of a PV module mounting assembly that uses the mounting bracket of FIG. 15A.

FIG. 17B presents a perspective view of a PV module mounting assembly 390 that uses a clamping member 400, a mounting plate 410, and the above-described mounting bracket 320. The mounting bracket 320 is installed on a panel 372' of a profile of the type illustrated in FIGS. 15D and 15F for the case of the PV module mounting assembly 390, although the PV module mounting assembly 390 may have course be used with other panel profiles on which the mounting bracket 320 may be installed. The mounting plate 410 is positioned on the upper wall 334 of the mounting bracket 320. The clamping member 400 presented in FIG. 17B is in the form of an edge clamp for the case of the PV module mounting assembly 390, but as noted the above-described clamping member 142 could also be used in combination with the mounting bracket 320. The clamping member 400 is described in more detail in U.S. Pat. No. 8,925,263, which issued on Jan. 6, 2015, and the entire disclosure of which is incorporated by reference herein.

The clamping member 400 includes an upper bracket 402 and a lower bracket 404 which may be adjusted relative to one another to accommodate PV modules of different thicknesses. A threaded clamping fastener 406 extends through the upper bracket 402, through the lower bracket 404, and into the receptacle 338 of the mounting bracket 320. A nut 408 may be threaded onto the shaft of the threaded clamping fastener 406 to engage an upper surface of the upper bracket 402. A nut may be disposed within the receptacle 338 of the mounting bracket 320 to threadably engage an opposite end portion of the shaft of the threaded clamping fastener 406. Another option is for the threaded clamping fastener 406 to be in the form of a bolt, where the bolt head may then be positioned within the receptacle 338 and where the nut 408 shown in FIG. 17B may then be threaded onto its opposite end (that protrudes through the upper bracket 402). In any case, a PV module may be captured and clamped between a head 402a of the upper bracket 402 and the mounting plate 410 via the threaded clamping fastener 406. FIG. 17B also shows PV module cables 420 that may directed through the wire management space 344 of the mounting bracket 320 in accordance with the foregoing.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

What is claimed is:

1. An attachment assembly, comprising:
   a trapezoidal rib; and
   a mounting bracket positioned on the trapezoidal rib and comprising:
   an upper section comprising an upper wall;
   a lower section adjoining and extending below the upper section, wherein the lower section comprises first and second legs that each extend downwardly from the upper section in diverging relation to one another, wherein from a first position the first leg is flexibly deflectable at least 2° away from the second leg and at least 2° toward the second leg, and wherein from a second position the second leg is flexibly deflectable at least 2° away from the first leg and at least 2° toward the first leg;
   a rib receptacle;
   first and second open bracket ends that are spaced from one another along a length dimension of the mounting bracket, wherein the rib receptacle extends between the first and second legs and also extends between the first and second open bracket ends, wherein the first leg of the mounting bracket is positioned alongside a first side of the trapezoidal rib, the second leg of the mounting bracket is positioned alongside a second side of the trapezoidal rib, and the upper wall of the mounting bracket is spaced from an upper rib wall of the trapezoidal rib; and
   a first exterior notch on a first side of the mounting bracket, and a second exterior notch on a second side of the mounting bracket, wherein the first and second sides of the mounting bracket are opposite one another, and wherein the first and second exterior notches are opposite of one another;
   at least one first fastener that extends through the first leg of the mounting bracket, through the first side of the trapezoidal rib, and terminates in a hollow interior of the trapezoidal rib; and
   at least one second fastener that extends through the second leg of the mounting bracket, through the second side of the trapezoidal rib, and terminates in the hollow interior of the trapezoidal rib.

2. The attachment assembly of claim 1, wherein the first position for the mounting bracket is an unbiased position for the first leg and the second position for the mounting bracket is an unbiased position for the second leg.

3. The attachment assembly of claim 1, wherein from the first position the first leg of the mounting bracket is flexibly deflectable up to about 5° away from the second leg and up to about 5° toward the second leg, and wherein from the second position the second leg of the mounting bracket is flexibly deflectable up to about 5° away from the first leg and up to about 5° toward the first leg.

4. The attachment assembly of claim 1, wherein the first leg of the mounting bracket is flexibly deflectable at least generally about a first reference axis that coincides with the length dimension of the mounting bracket, and wherein the second leg of the mounting bracket is flexibly deflectable at least generally about a second reference axis that is parallel to the first reference axis.

5. The attachment assembly of claim 1, wherein the upper section of the mounting bracket comprises first and second sections, wherein the first section comprises the upper wall and is of a first width, wherein the second section is positioned below the first section when the mounting bracket is in an upright position on a horizontal supporting surface and comprises a second width that is greater than the first width, and wherein a lower end of the second section comprises at least one rib offsetting member.

6. The attachment assembly of claim 5, wherein the first section further comprises a receptacle disposed below the upper wall.

7. The attachment assembly of claim 5, wherein the second section of the upper section comprises a pair of sidewalls that are spaced from one another in parallel relation.

8. The attachment assembly of claim 5, wherein the at least one rib offsetting member comprises first and second rib offsetting members that are spaced from one another, wherein the first leg extends from the first rib offsetting member, and wherein the second leg extends from the second rib offsetting member.

9. The attachment assembly of claim 8, wherein the first rib offsetting member extends past an intersection with the first leg in the direction of the second rib offsetting member and terminates prior to reaching the second rib offsetting member, wherein the second rib offsetting member extends past an intersection with the second leg in the direction of the first rib offsetting member and terminates prior to reaching the first rib offsetting member, and wherein an open space extends between the first and second rib offsetting members.

10. The attachment assembly of claim 1, wherein the upper section of the mounting bracket further comprises first and second sidewalls and at least one rib offsetting member, wherein the first and second sidewalls are located between the upper wall and the at least one rib offsetting member in a vertical dimension when the mounting bracket is in an upright position on a horizontal supporting surface, wherein the first and second sidewalls are disposed in parallel relation and are separated by a spacing that is greater than a width of the upper section, and wherein each of the first and second legs extend from the at least one rib offsetting member.

11. The attachment assembly of claim 1, wherein a first portion of a lower end of the upper section of the mounting bracket merges with the first leg at a first location, wherein a second portion of the lower end of the upper section merges with the second leg at a second location, wherein a first acute angle exists between the first leg and the first portion of the lower end of the upper section, the first notch comprising the first acute angle, and wherein a second acute angle exists between the second leg and the second portion of the lower end of the upper section, the second notch comprising the second acute angle.

12. The attachment assembly of claim 1, wherein the mounting bracket further comprises a first rib offsetting member and a second rib offsetting member that are separated by an open space.

13. The attachment assembly of claim 1, wherein the upper wall of the mounting bracket defines an uppermost extreme of the mounting bracket when positioned on the trapezoidal rib, wherein an entirety of the upper wall is in the form of a single flat surface that incorporates a mounting aperture, and wherein the single flat surface has a perimeter that defines an area of at least 2.5 in.$^2$.

14. The attachment assembly of claim 1, wherein the mounting bracket comprises a wire management space that is open, and wherein a vertical extent of the wire management space is at least about 0.75" when the mounting bracket is disposed in an upright position on a horizontal supporting surface.

15. An attachment assembly, comprising:
a trapezoidal rib comprising an upper rib wall; and
a mounting bracket positioned on the trapezoidal rib and comprising:
an upper section comprising an upper wall and a lower end that are oppositely disposed, wherein the lower end is in contact with or in proximity to the upper rib wall;
a lower section adjoining and extending below the upper section, wherein the lower section comprises first and second legs that each extend downwardly from the lower end of the upper section in diverging relation to one another, wherein from a first position the first leg is flexibly deflectable at least 2° away from the second leg and at least 2° toward the second leg, wherein from a second position the second leg is flexibly deflectable at least 2° away from the first leg and at least 2° toward the first leg, wherein a first acute angle on a first exterior side of the mounting bracket is defined between intersecting portions of the first leg and the lower end of the upper section, and wherein a second acute angle on a second exterior side of the mounting bracket is defined between intersecting portions of the second leg and the lower end of the upper section;
a rib receptacle;
first and second open bracket ends that are spaced from one another along a length dimension of the mounting bracket, wherein the rib receptacle extends between the first and second legs and also extends between the first and second open bracket ends, wherein the first leg of the mounting bracket is positioned alongside a first side of the trapezoidal rib, the second leg of the mounting bracket is positioned alongside a second side of the trapezoidal rib, and the upper wall of the mounting bracket is spaced from the upper rib wall of the trapezoidal rib;
at least one first fastener that extends through the first leg of the mounting bracket, through the first side of the trapezoidal rib, and terminates in a hollow interior of the trapezoidal rib; and
at least one second fastener that extends through the second leg of the mounting bracket, through the second side of the trapezoidal rib, and terminates in the hollow interior of the trapezoidal rib.

16. The attachment assembly of claim 15, wherein the first position for the mounting bracket is an unbiased position for the first leg and the second position for the mounting bracket is an unbiased position for the second leg.

17. The attachment assembly of claim 15, wherein from the first position the first leg of the mounting bracket is flexibly deflectable up to about 5° away from the second leg and up to about 5° toward the second leg, and wherein from the second position the second leg of the mounting bracket is flexibly deflectable up to about 5° away from the first leg and up to about 5° toward the first leg.

18. The attachment assembly of claim 15, wherein the first leg of the mounting bracket is flexibly deflectable at least generally about a first reference axis that coincides with the length dimension of the mounting bracket, and wherein the second leg of the mounting bracket is flexibly deflectable at least generally about a second reference axis that is parallel to the first reference axis.

19. The attachment assembly of claim 15, wherein the upper section of the mounting bracket comprises first and second sections, wherein the first section comprises the upper wall, wherein the second section is located between the first section and the lower section, wherein the second section comprises the lower end, and wherein a maximum width of the second section is larger than a maximum width of the first section.

20. The attachment assembly of claim 19, wherein the first section further comprises a receptacle disposed below the upper wall.

21. The attachment assembly of claim 19, wherein the upper wall of the mounting bracket defines an uppermost extreme of the mounting bracket when positioned on the trapezoidal rib, wherein an entirety of the upper wall is in the form of a single flat surface that incorporates a mounting aperture, and wherein the single flat surface has a perimeter that defines an area of at least 2.5 in.$^2$.

22. The attachment assembly of claim 19, wherein the second section further comprises first and second sidewalls, wherein the first and second sidewalls are located between the upper wall and the lower end, and wherein the first and second sidewalls are disposed in parallel relation and are separated by a spacing that is greater than a width of an entirety of the upper section.

23. The attachment assembly of claim 22, wherein the second section further comprises a wire management space that is open and that is located between the first and second sidewalls, wherein a vertical extent of the wire management space is at least about 0.75" and with the vertical extent being in a dimension that is parallel to the first and second sidewalls.

24. The attachment assembly of claim 19, wherein the lower end comprises first and second rib offsetting members that are spaced from one another, wherein the first leg extends from the first rib offsetting member, and wherein the second leg extends from the second rib offsetting member.

25. The attachment assembly of claim 24, wherein the first rib offsetting member extends past an intersection with the first leg in the direction of the second rib offsetting member and terminates prior to reaching the second rib offsetting member, wherein the second rib offsetting member extends past an intersection with the second leg in the direction of the first rib offsetting member and terminates prior to reaching the first rib offsetting member, and wherein an open space extends between the first and second rib offsetting members.

26. A mounting bracket, comprising:
an upper section comprising an upper wall;
a lower section adjoining and extending below the upper section, wherein the lower section comprises first and second legs that each extend downwardly from the upper section in diverging relation to one another to define a rib receptacle, wherein from a first position the first leg is flexibly deflectable at least 2° away from the second leg and at least 2° toward the second leg, and wherein from a second position the second leg is flexibly deflectable at least 2° away from the first leg and at least 2° toward the first leg;
first and second open bracket ends that are spaced from one another along a length dimension of the mounting bracket, wherein the rib receptacle extends between the first and second legs and also extends between the first and second open bracket ends; and
a first exterior notch on a first side of the mounting bracket, and a second exterior notch on a second side of the mounting bracket, wherein the first and second sides of the mounting bracket are opposite one another, and wherein the first and second exterior notches are opposite one another.

27. The mounting bracket of claim 26, further comprising:
at least one first fastener extending perpendicularly through the first leg of the mounting bracket; and
at least one second fastener extending perpendicularly through the second leg of the mounting bracket.

28. The mounting bracket of claim 26, wherein the upper section further comprises a first sidewall connecting the first leg to the upper wall, and a second sidewall connecting the second leg to the upper wall.

29. The mounting bracket of claim 28, further comprising a first rib offsetting member extending from the first sidewall toward the second sidewall, and a second rib offsetting member extending from the second sidewall toward the first sidewall, wherein a free end of the first rib offsetting member is spaced from a free end of the second rib offsetting member.

30. The mounting bracket of claim 29, wherein the first leg extends from the first rib offsetting member and the second leg extends from the second rib offsetting member.

31. The mounting bracket of claim 29, wherein the upper wall, the first sidewall, the second sidewall, the first rib offsetting member, the second rib offsetting member, the first leg, and the second leg are integrally formed.

32. The mounting bracket of claim 26, wherein the upper wall comprises a mounting aperture.

* * * * *